(12) United States Patent
Sun et al.

(10) Patent No.: US 12,367,006 B2
(45) Date of Patent: Jul. 22, 2025

(54) DISPLAY METHOD, ELECTRONIC DEVICE, AND SYSTEM

(71) Applicant: Huawei Technologies Co., Ltd., Shenzhen (CN)

(72) Inventors: Xilin Sun, Shenzhen (CN); Min Liu, Nanjing (CN); Jie Li, Shenzhen (CN); Yinzhu Cheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/551,782

(22) PCT Filed: Mar. 29, 2022

(86) PCT No.: PCT/CN2022/083717
§ 371 (c)(1),
(2) Date: Sep. 21, 2023

(87) PCT Pub. No.: WO2022/206762
PCT Pub. Date: Oct. 6, 2022

(65) Prior Publication Data
US 2024/0201932 A1     Jun. 20, 2024

(30) Foreign Application Priority Data

Mar. 31, 2021  (CN) .......................... 202110350010.8
Apr. 30, 2021  (CN) .......................... 202110486127.9

(51) Int. Cl.
*G06F 3/14* (2006.01)
*G09G 5/14* (2006.01)

(52) U.S. Cl.
CPC .......... *G06F 3/1454* (2013.01); *G06F 3/1423* (2013.01); *G09G 5/14* (2013.01); *G09G 2370/16* (2013.01)

(58) Field of Classification Search
CPC .... G06F 3/1454; G06F 3/1423; G06F 3/0482; G06F 3/0481; G06F 3/04817;
(Continued)

(56) References Cited

U.S. PATENT DOCUMENTS 9,924,018 B2 * 3/2018 Won .................. H04M 1/72412
2012/0092277 A1 * 4/2012 Momchilov ............ G06F 3/038
345/173
(Continued)

FOREIGN PATENT DOCUMENTS

CN    105589506 A    5/2016
CN    110515576 A    11/2019
(Continued)

*Primary Examiner* — Dong Hui Liang
(74) *Attorney, Agent, or Firm* — Slater Matsil, LLP

(57) ABSTRACT

A method includes: a first electronic device displaying a first interface, and sending first information to a second electronic device, where the first information includes one or more interface elements on the first interface and tag information of the interface elements; and the second electronic device displaying a second interface based on the tag information of the one or more interface elements on the first interface, where the second interface includes a first display window and a second display window, at least some interface elements of the one or more interface elements on the first interface are displayed in the first display window, the second display window displays a display interface associated with a first interface element, and the at least some interface elements include the first interface element.

19 Claims, 36 Drawing Sheets

(58) Field of Classification Search
CPC .............. G06F 3/0484; G06F 3/04842; G06F 3/04886; G06F 3/14; G06F 3/048; G06F 9/451; G06F 9/452; G06F 2203/04803; G09G 2354/00; G09G 5/14; G09G 5/12; G09G 2370/16; G09G 2370/04; G09G 2340/04; G09G 2340/0492

See application file for complete search history.

(56) References Cited

U.S. PATENT DOCUMENTS

| | | | |
|---|---|---|---|
| 2014/0279235 A1* | 9/2014 | Sandholm | G06Q 30/0613 705/26.41 |
| 2016/0182603 A1* | 6/2016 | Chung | H04L 67/025 715/740 |
| 2018/0336373 A1* | 11/2018 | Deenadayal | G06T 5/70 |
| 2019/0095654 A1* | 3/2019 | Wang | G06F 21/84 |
| 2020/0076876 A1* | 3/2020 | Zhang | G06F 21/32 |
| 2022/0156029 A1* | 5/2022 | Lee | H04N 21/436 |
| 2022/0291892 A1* | 9/2022 | Gu | G09G 3/001 |
| 2023/0229375 A1* | 7/2023 | Niu | G06F 3/1423 345/589 |

FOREIGN PATENT DOCUMENTS

| | | |
|---|---|---|
| CN | 112261466 A | 1/2021 |
| CN | 115145518 A | 10/2022 |

\* cited by examiner

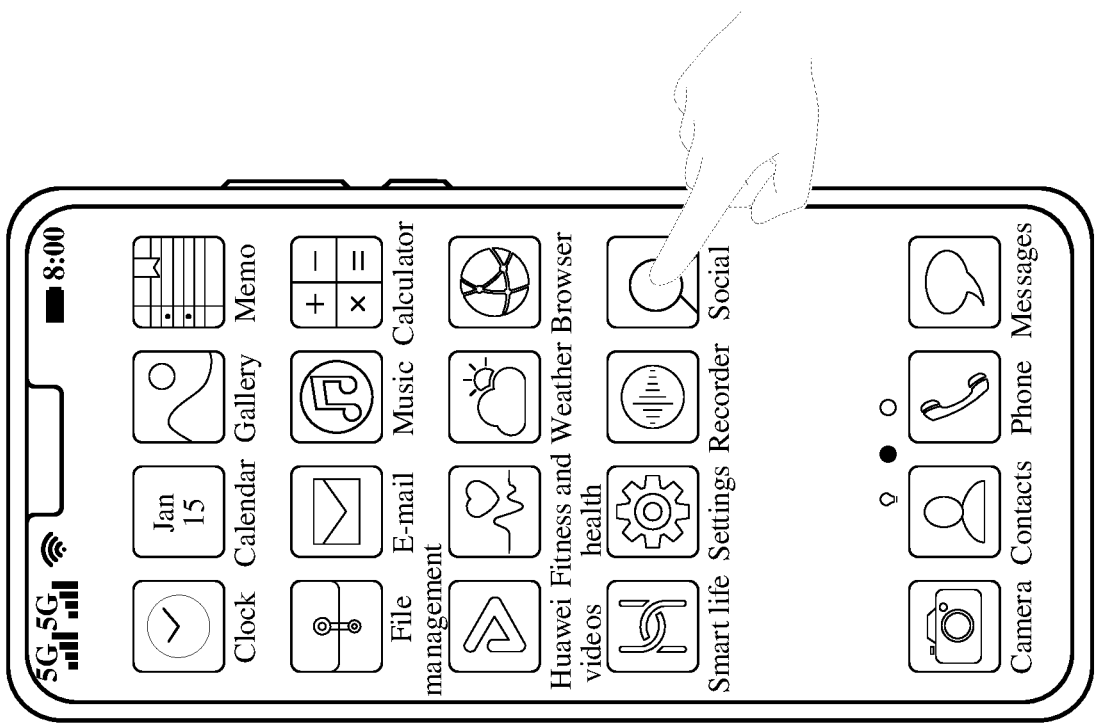
FIG. 3(a)1

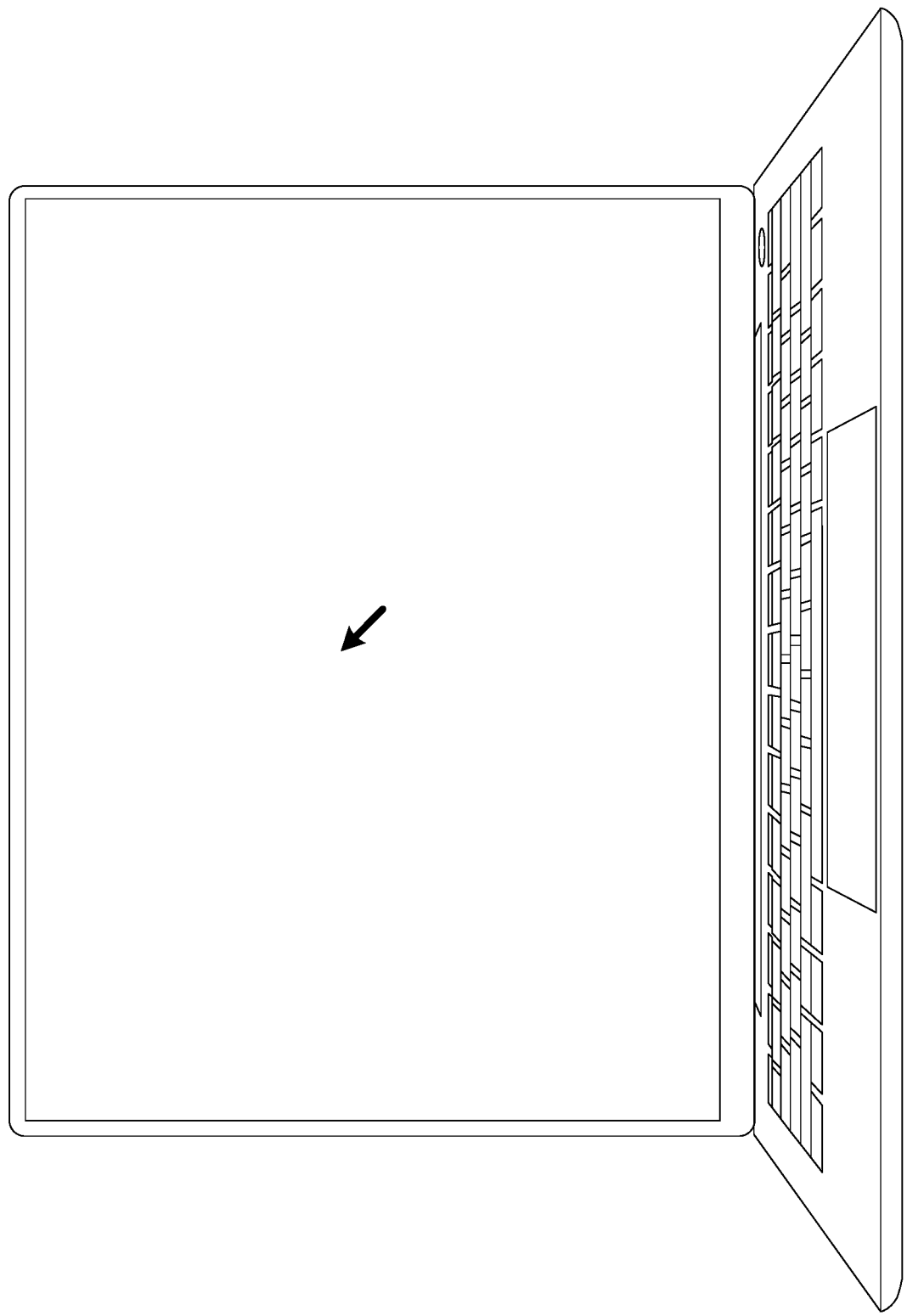
FIG. 3(a)2

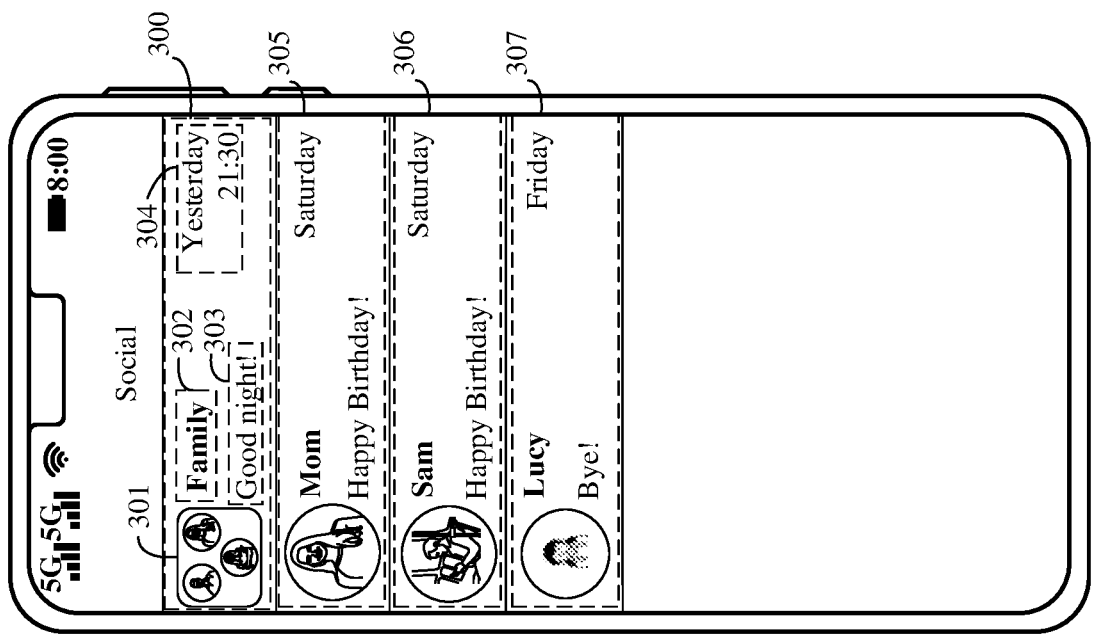
FIG. 3(b)1

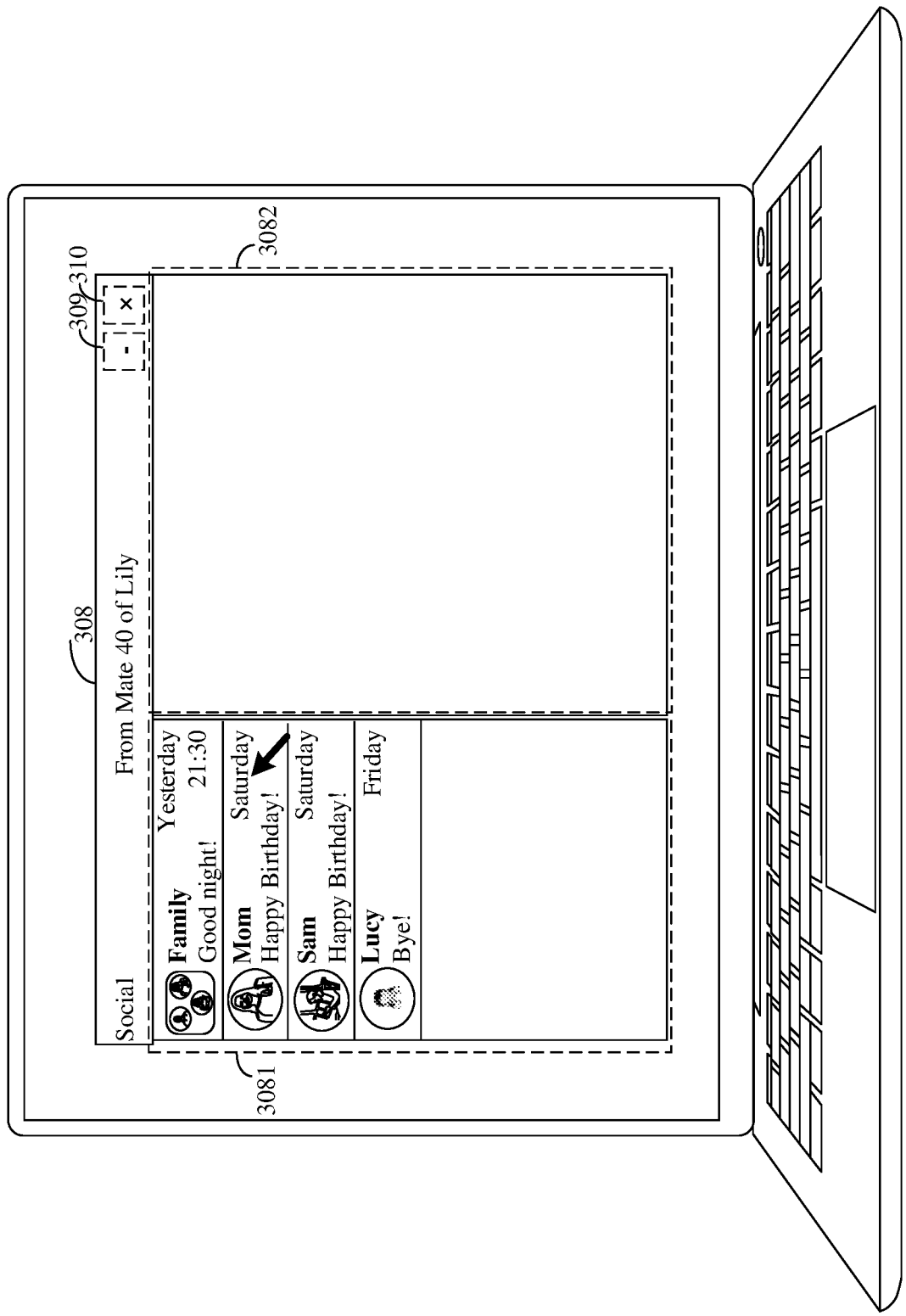
FIG. 3(b)2

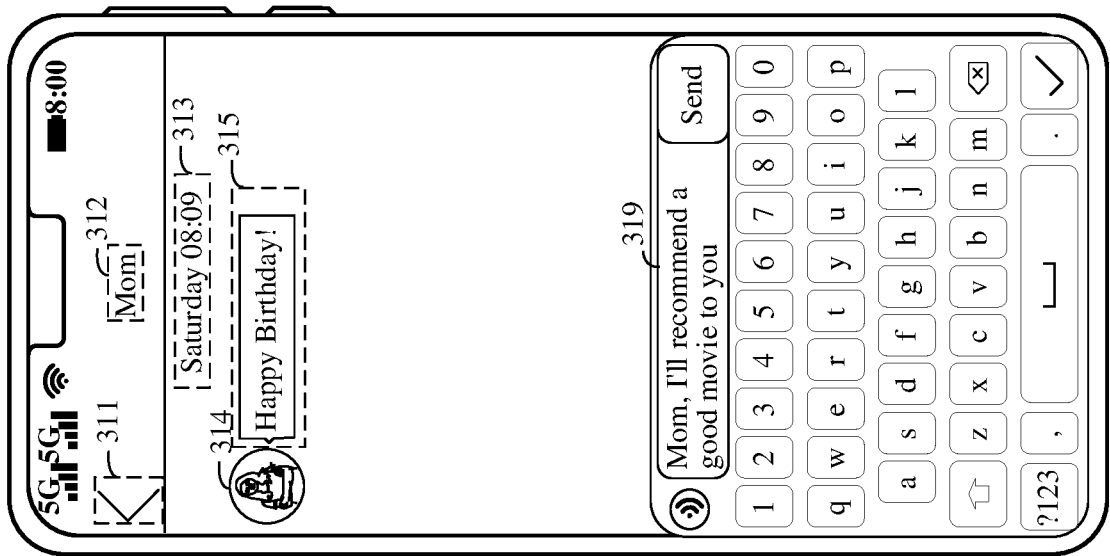
FIG. 3(c)1

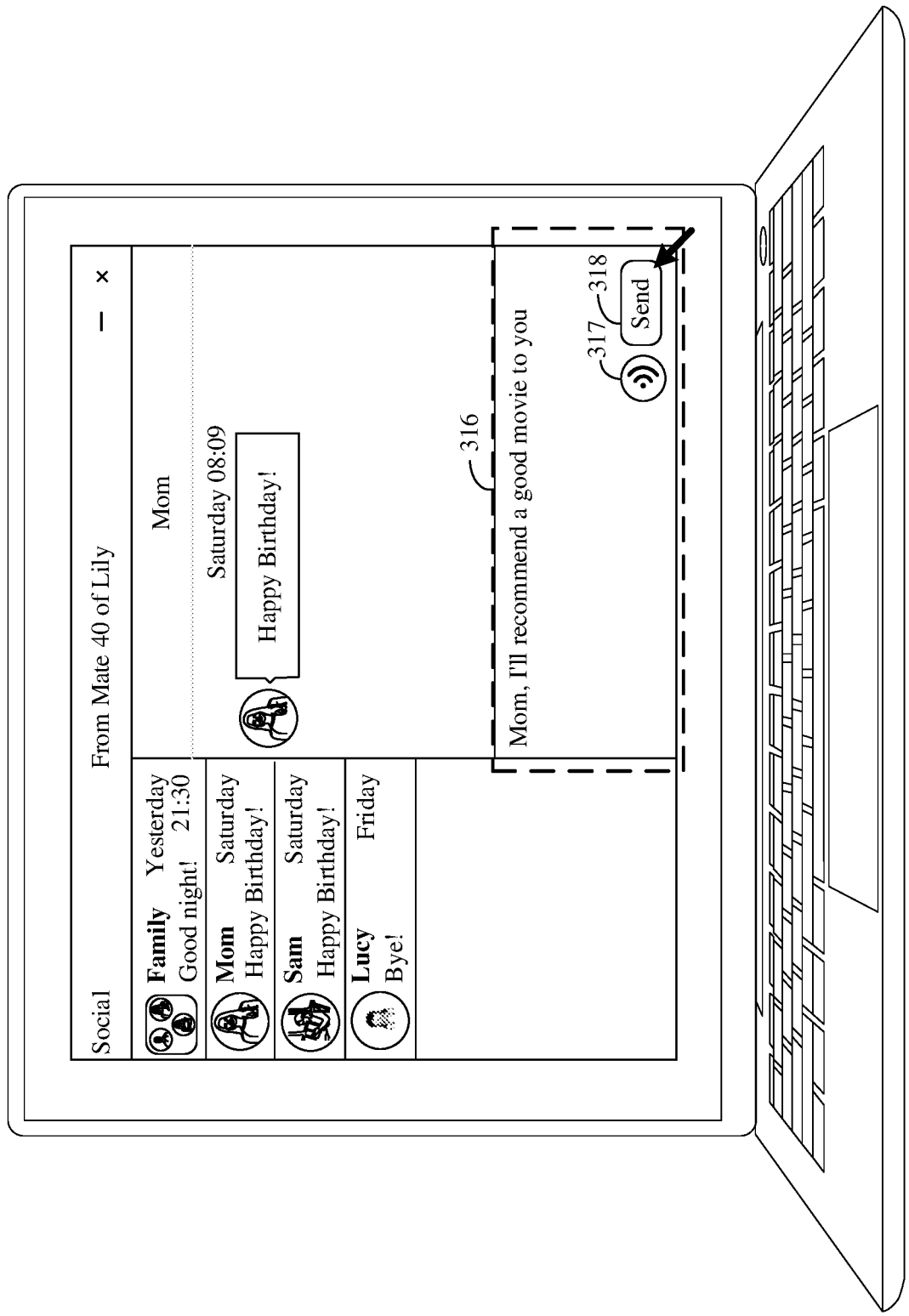
FIG. 3(c)2

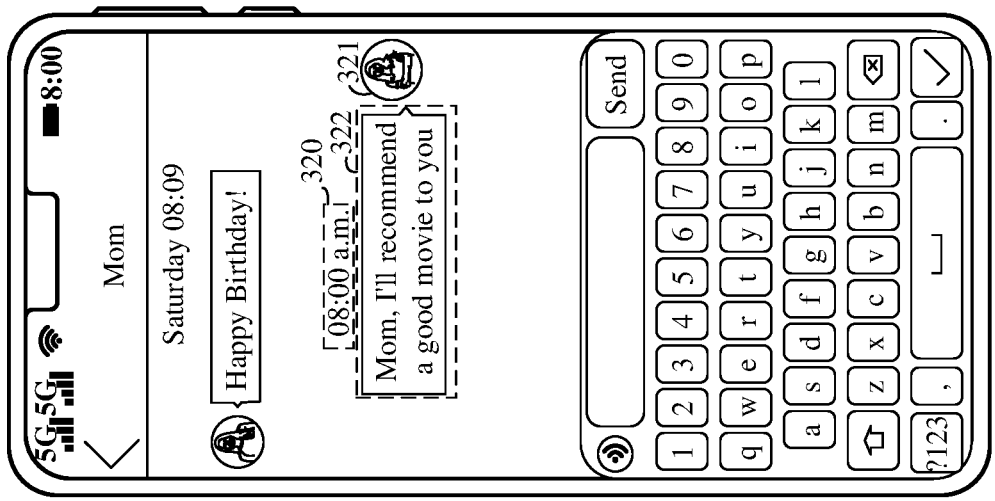
FIG. 3(d)1

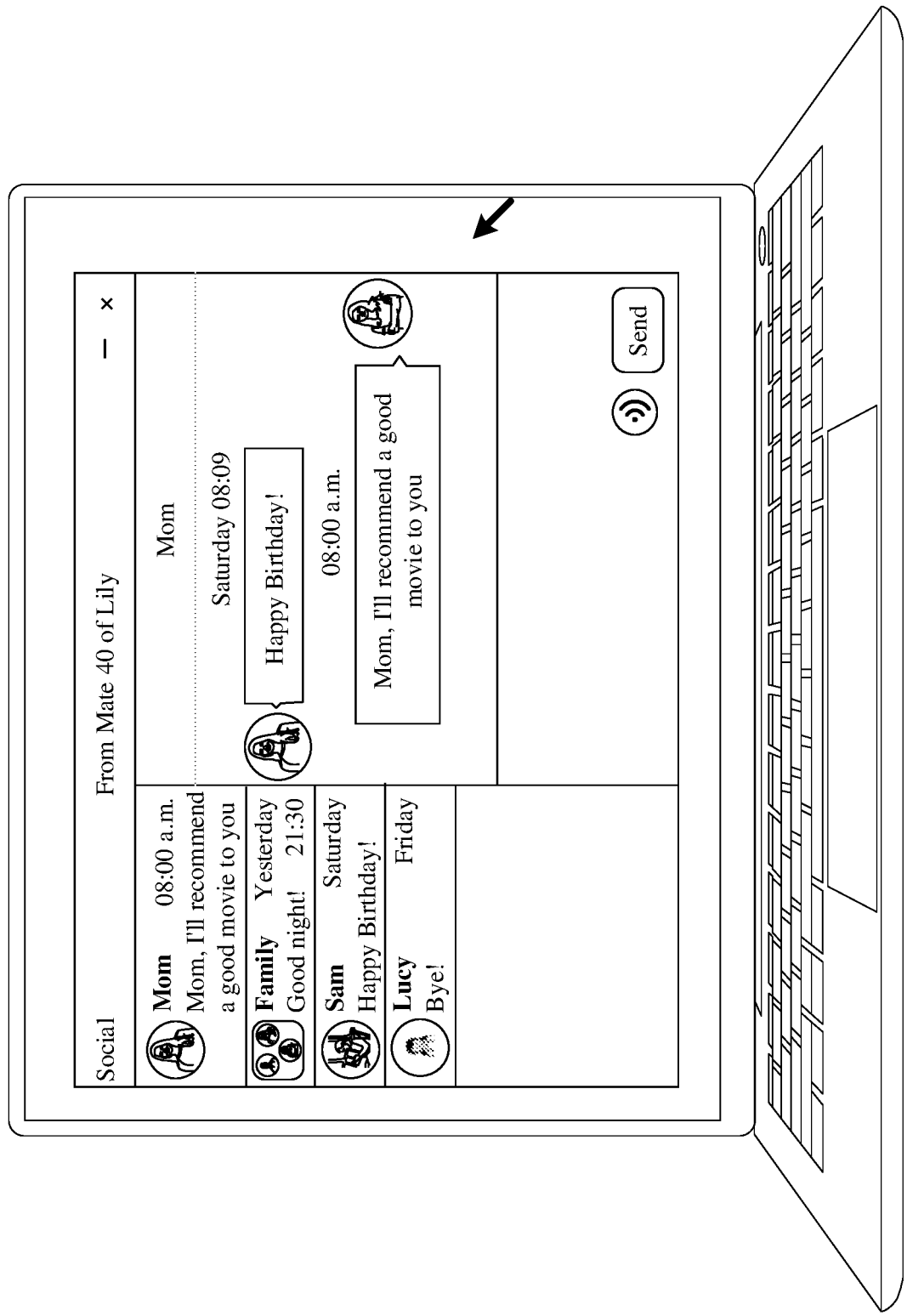
FIG. 3(d)2

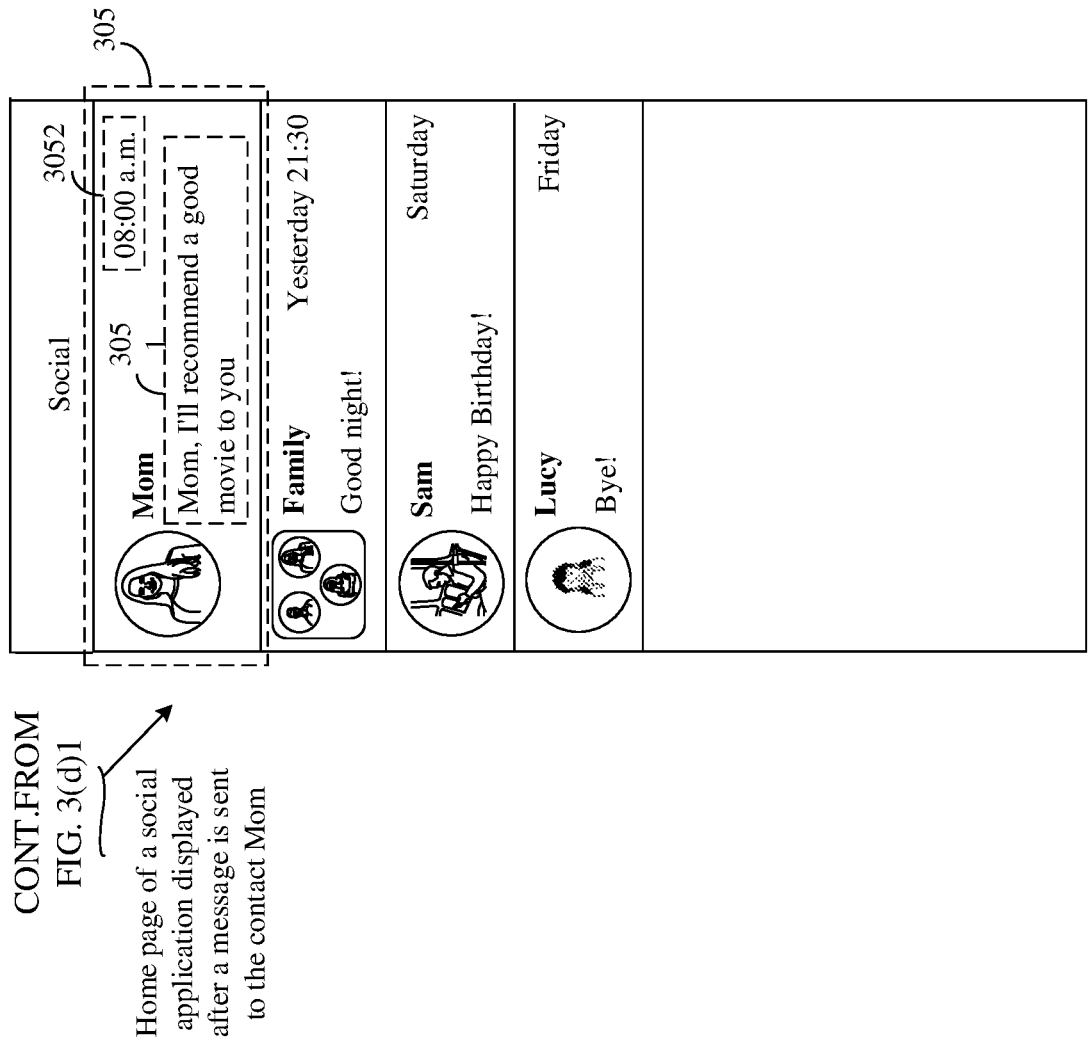
FIG. 3(d)3

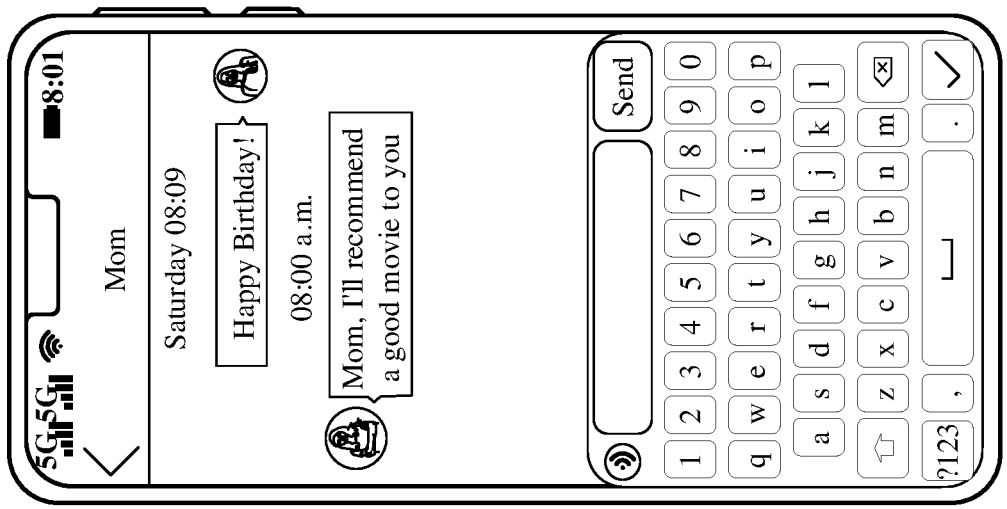
FIG. 3(e)1

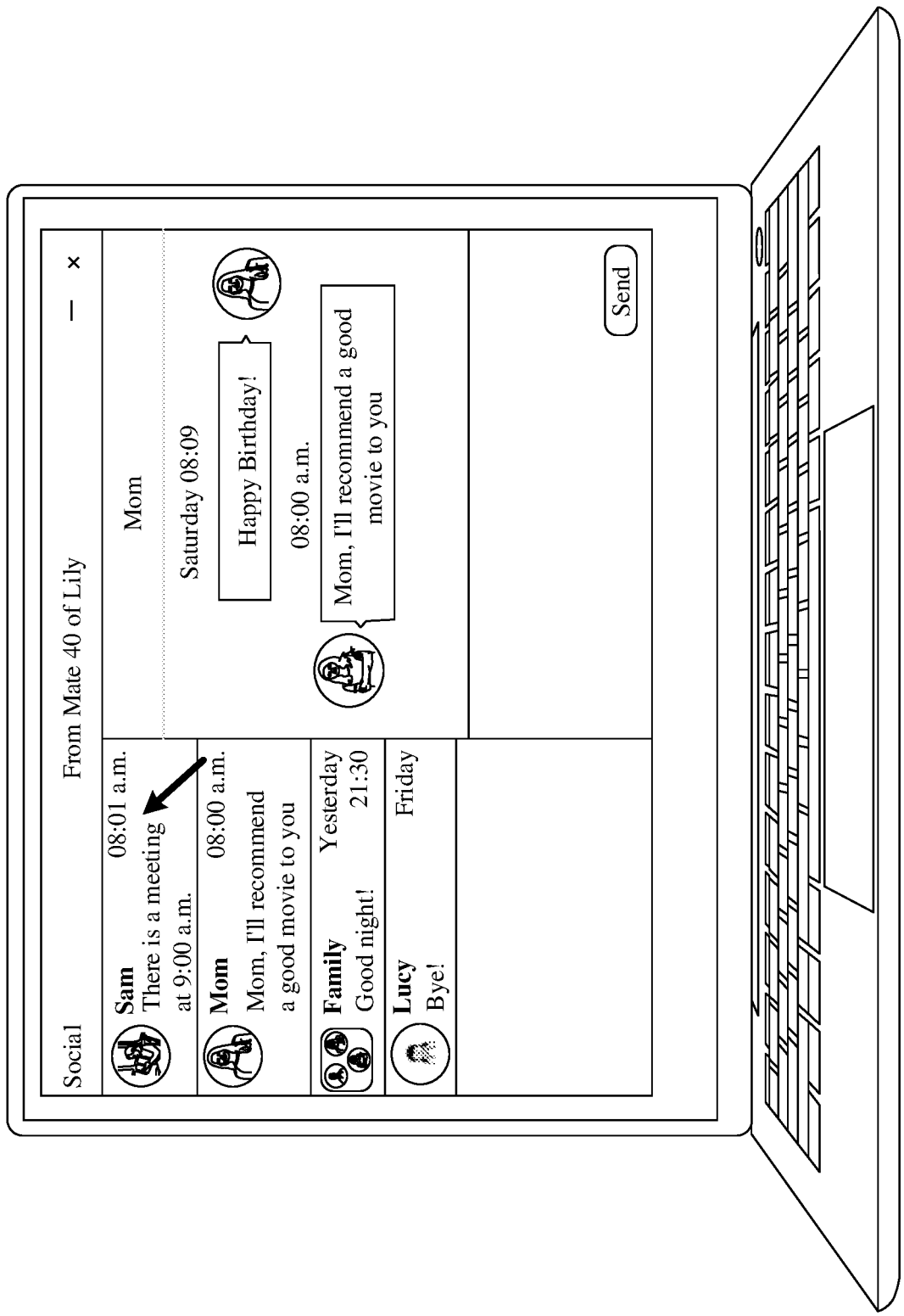
FIG. 3(e)2

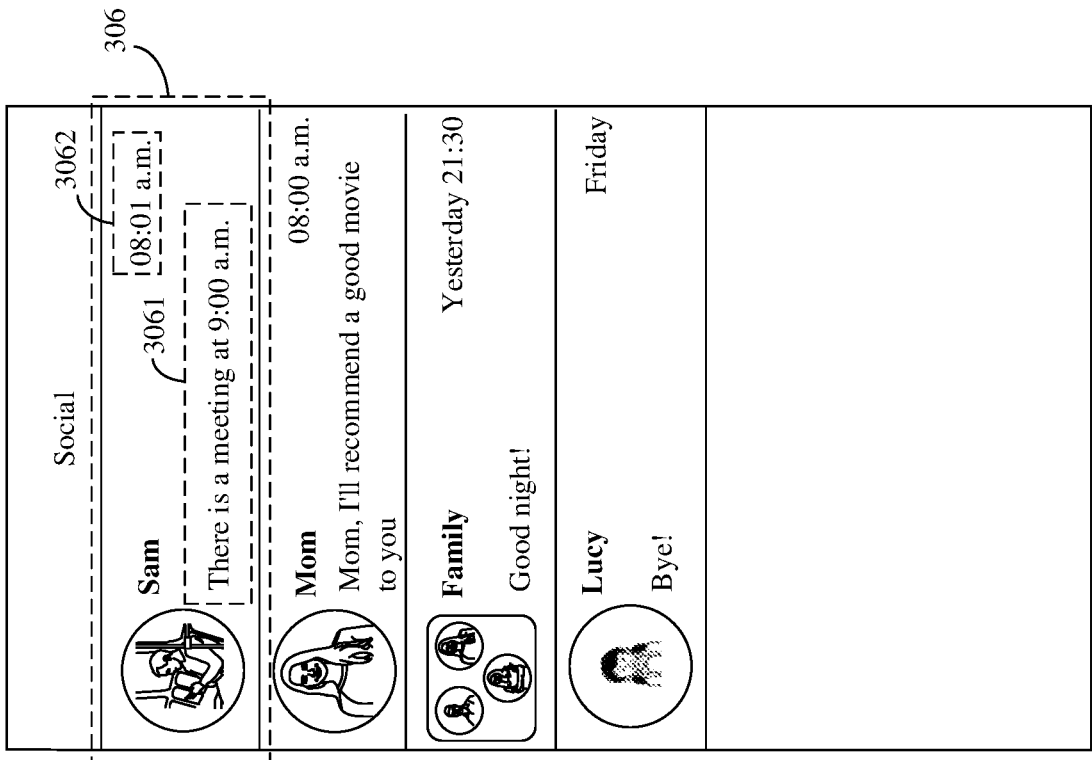
FIG. 3(e)3

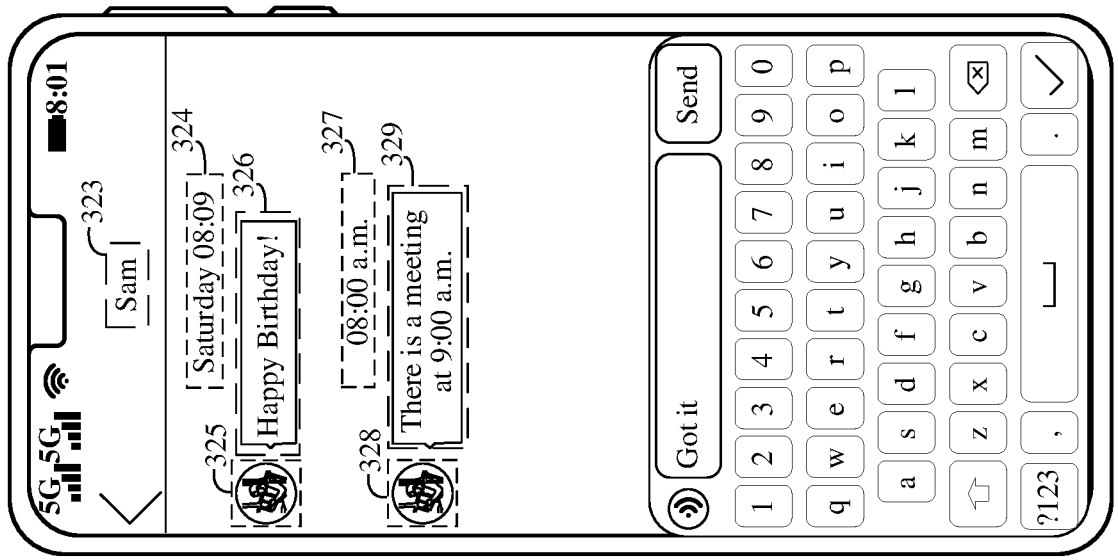
FIG. 3(f)1

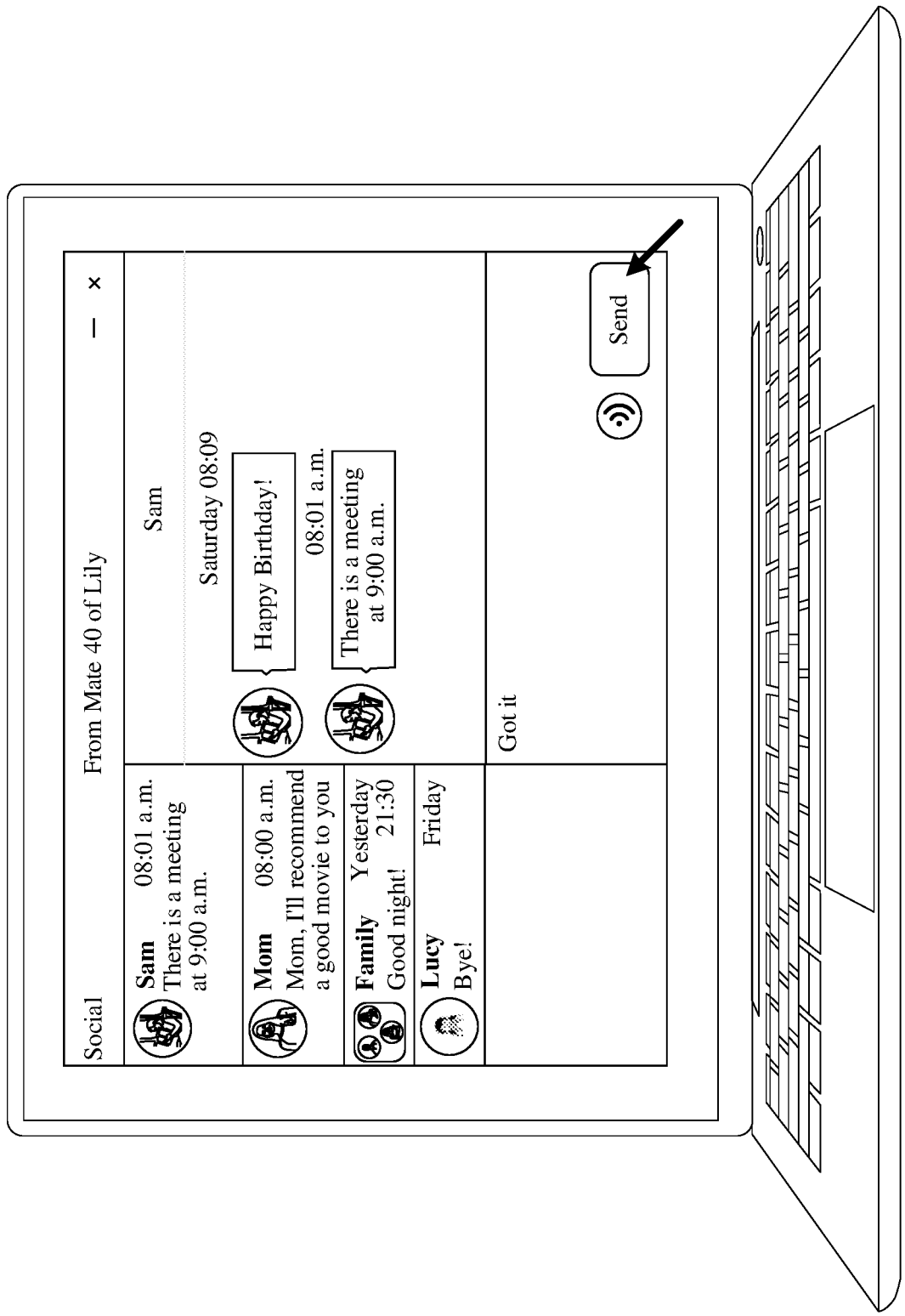
FIG. 3(f)2

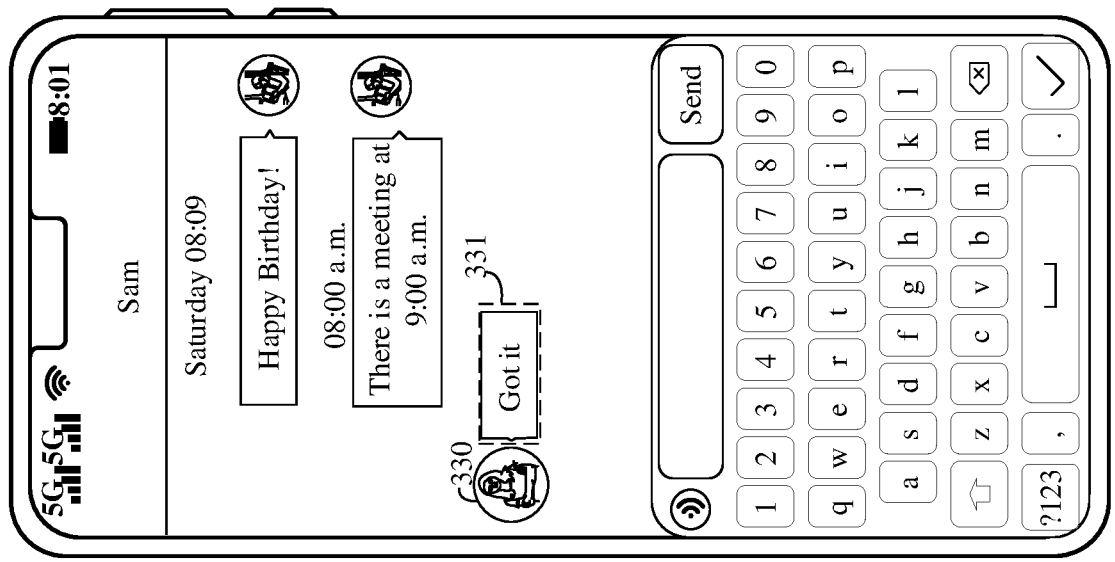
FIG. 3(g)1

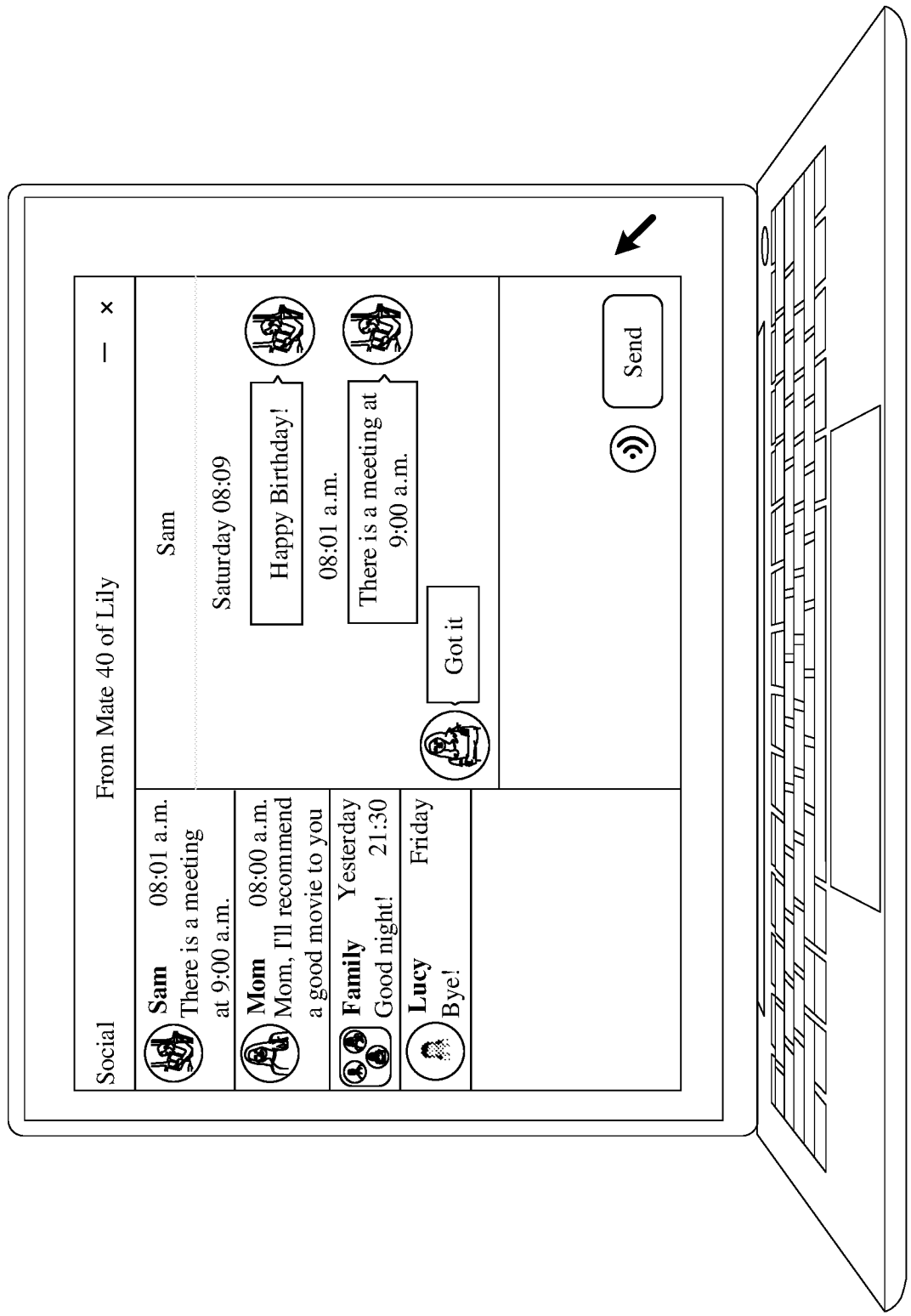
FIG. 3(g)2

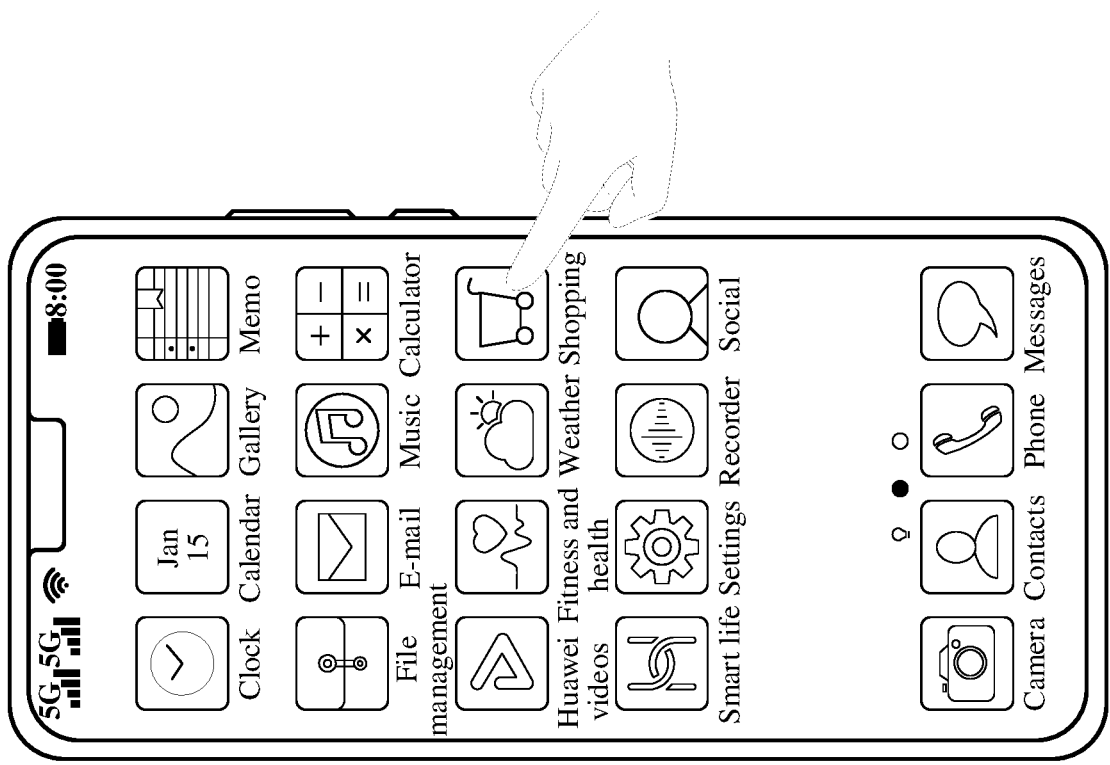
FIG. 4(a)1

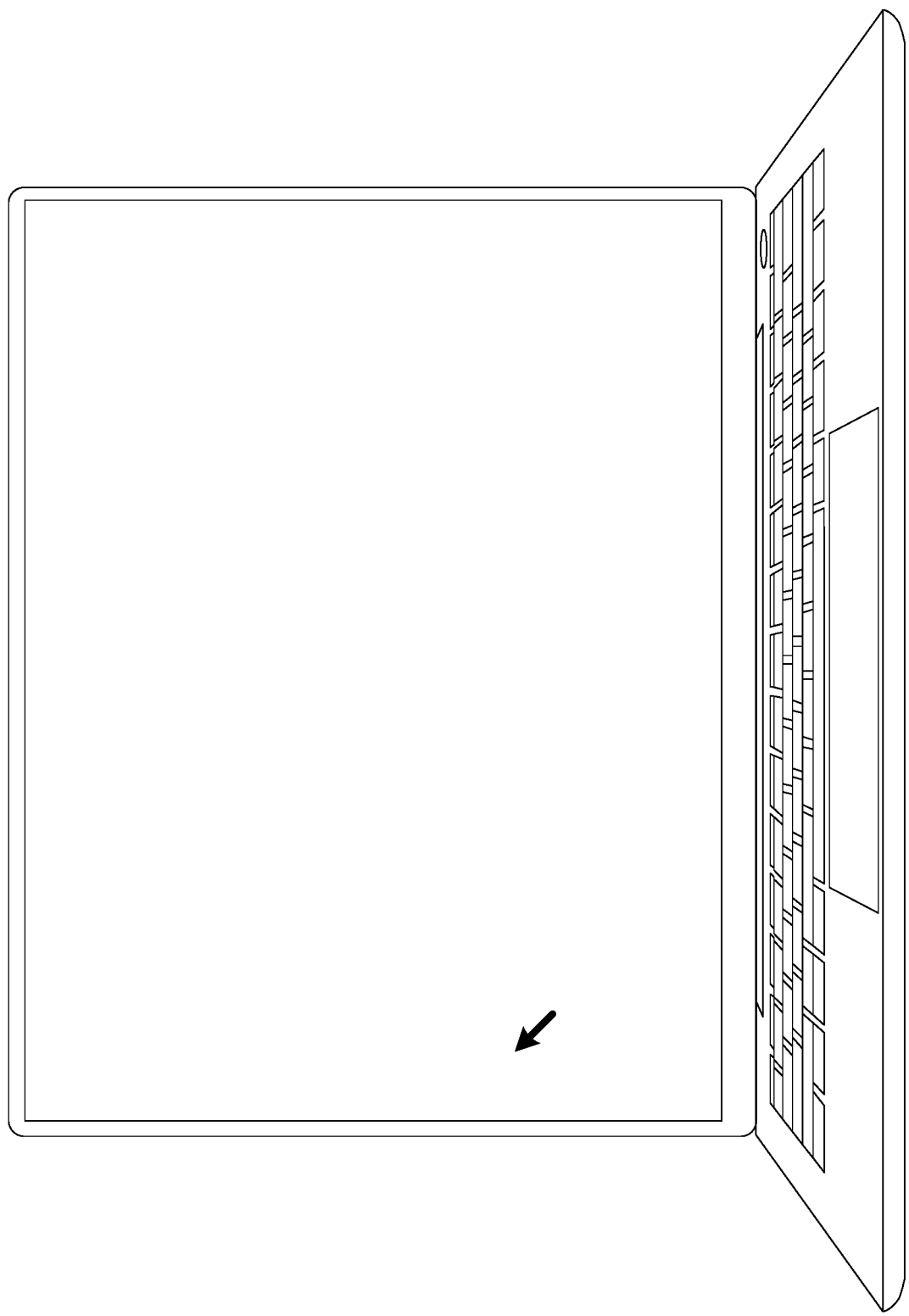
FIG. 4(a)2

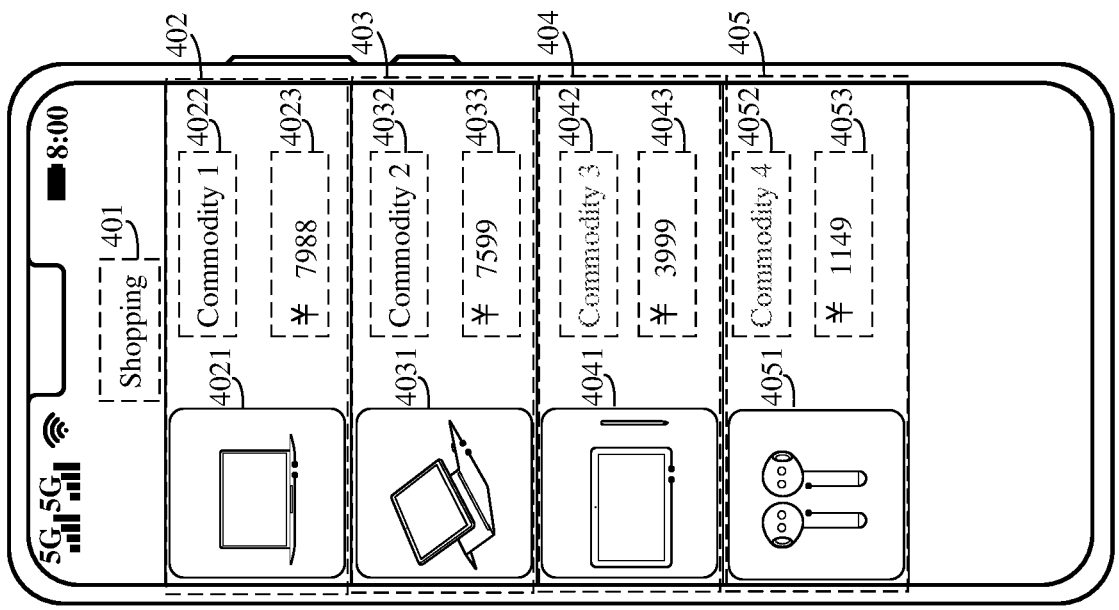
FIG. 4(b)1

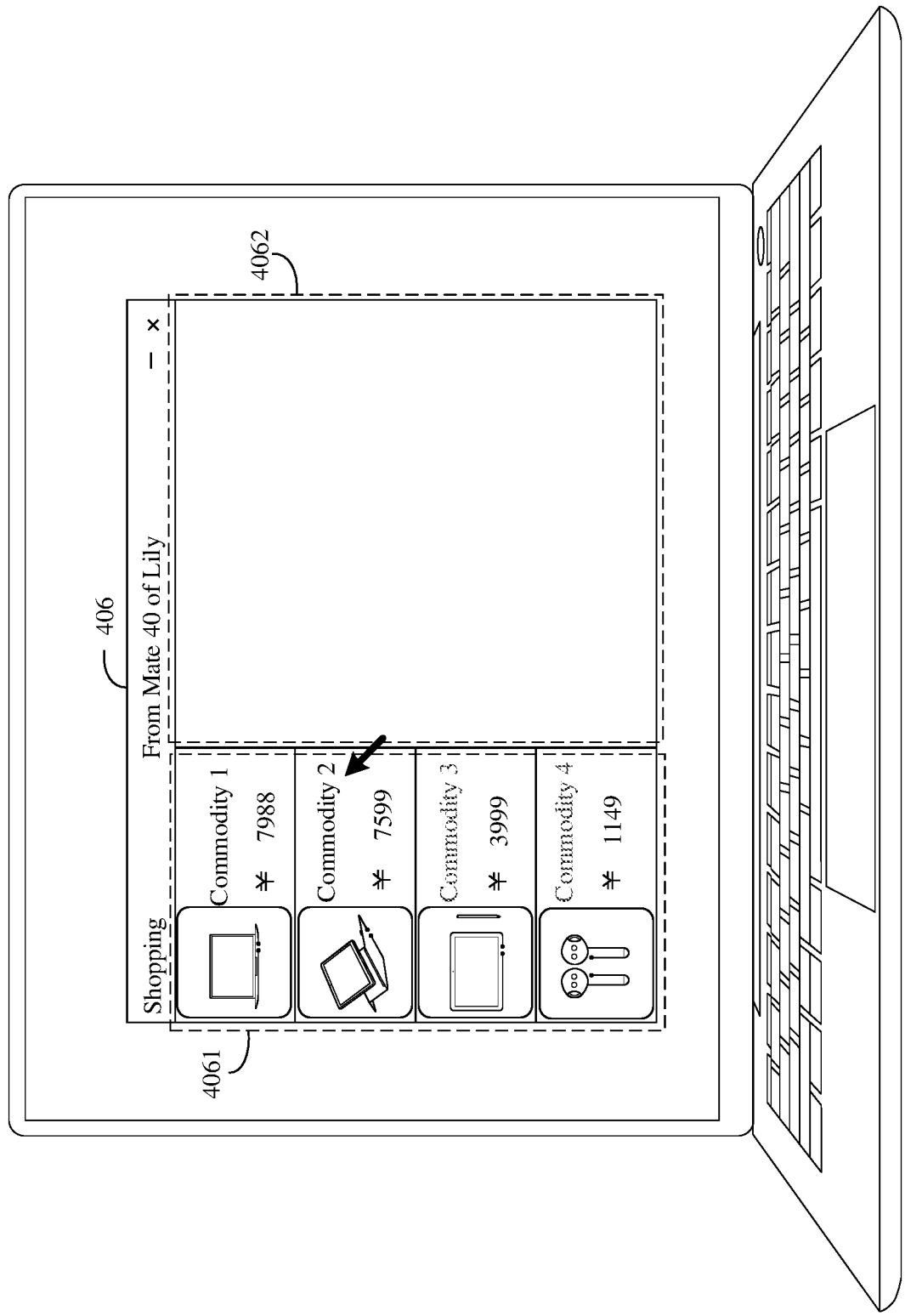
FIG. 4(b)2

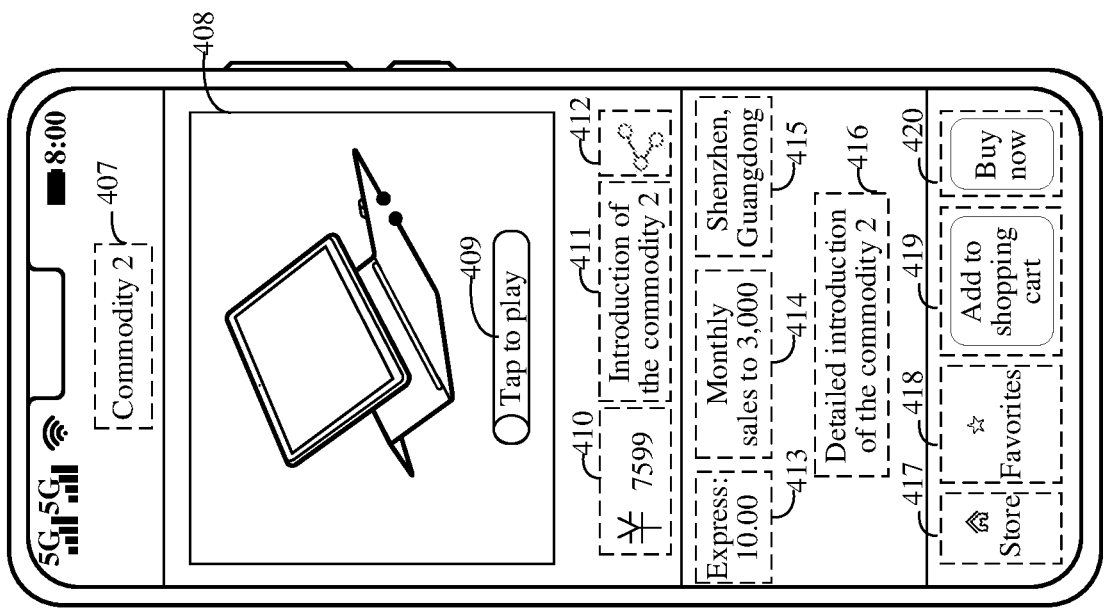
FIG. 4(c)1

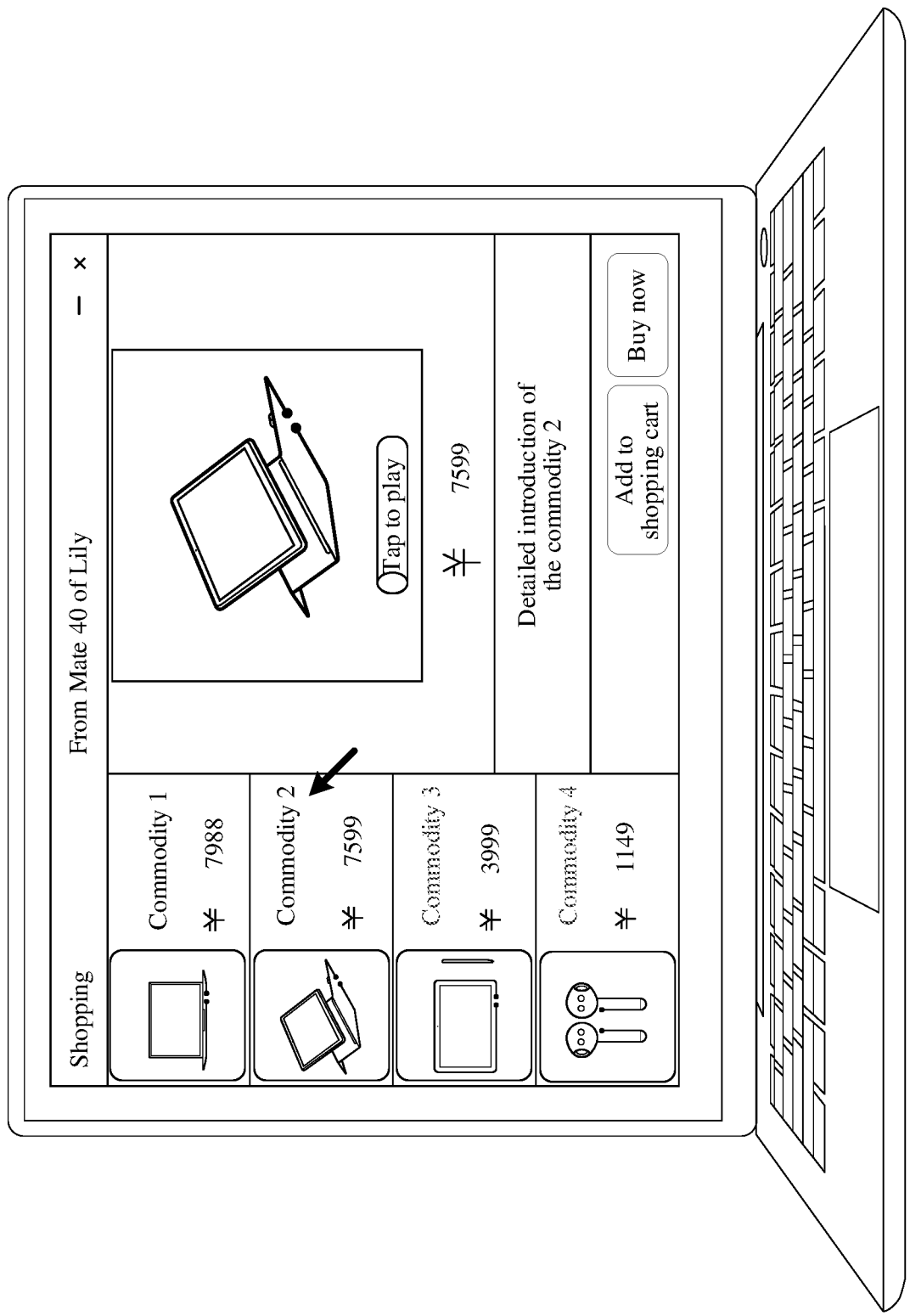
FIG. 4(c)2

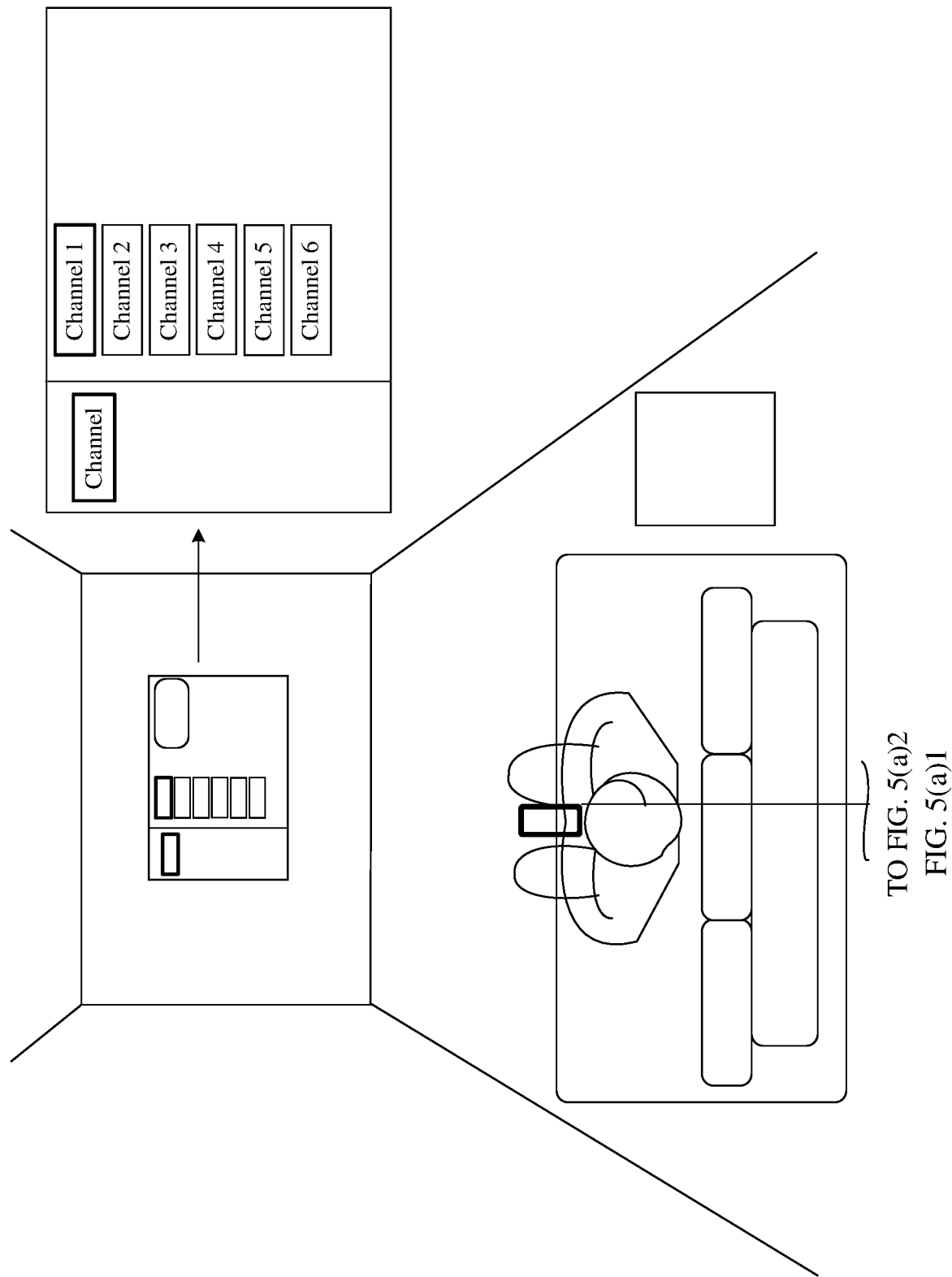

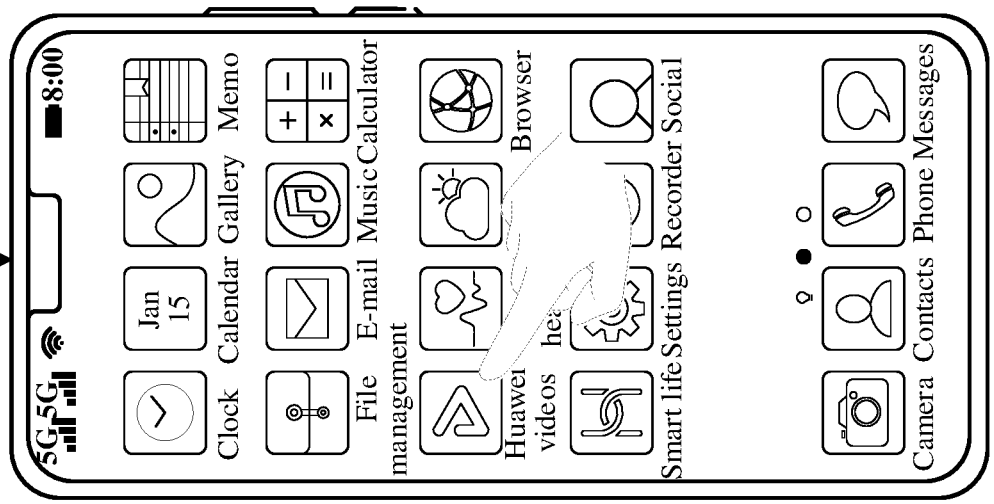
FIG. 5(a)2

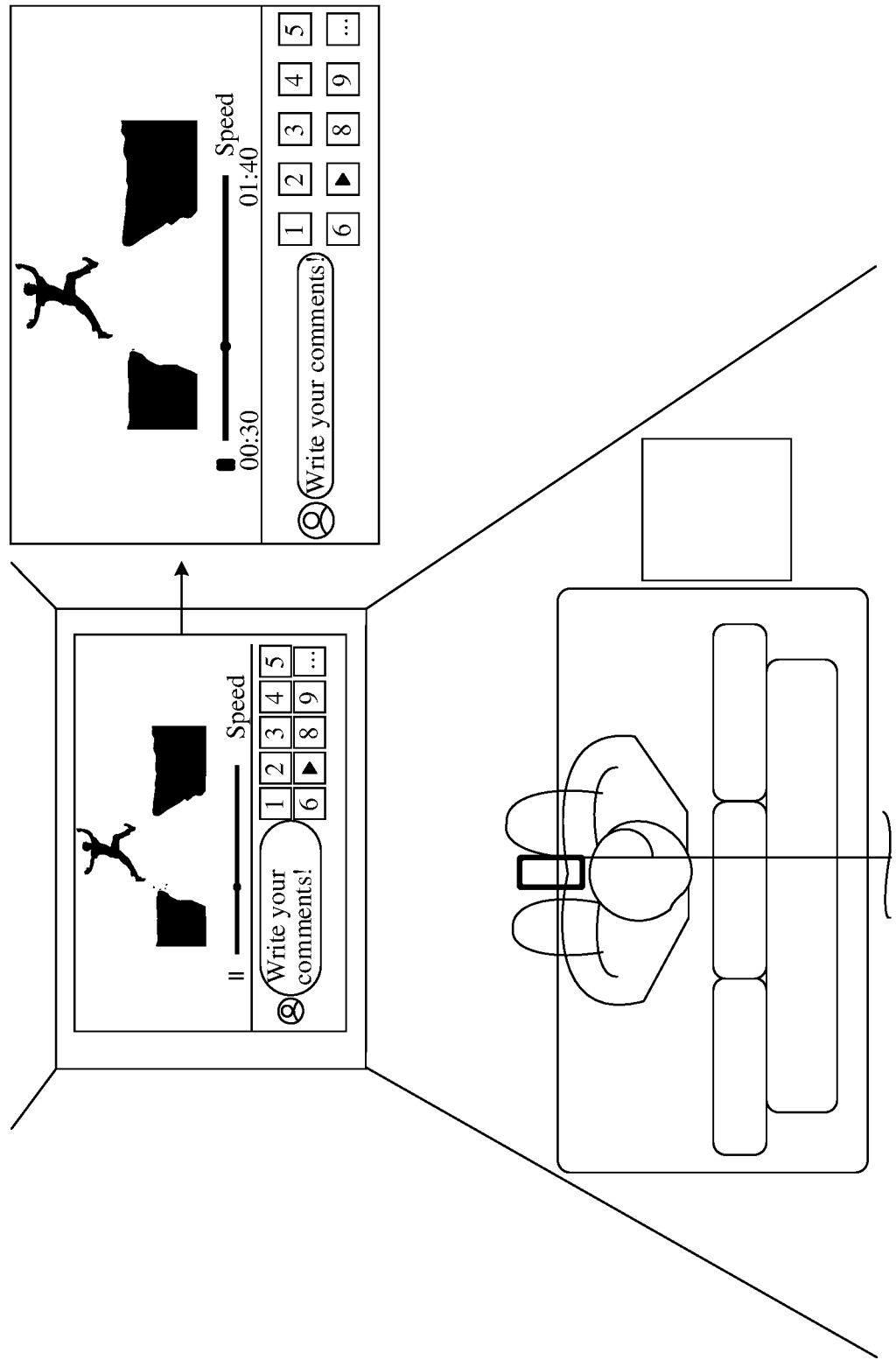

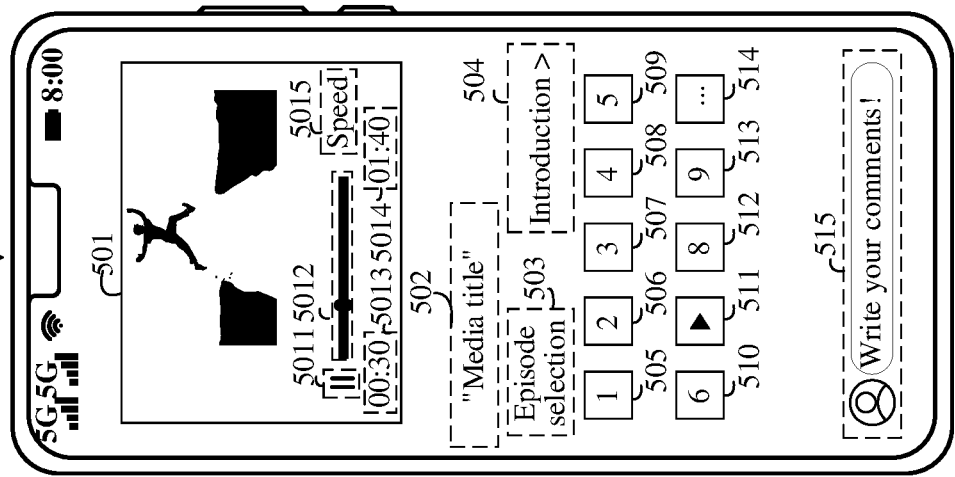
FIG. 5(b)2

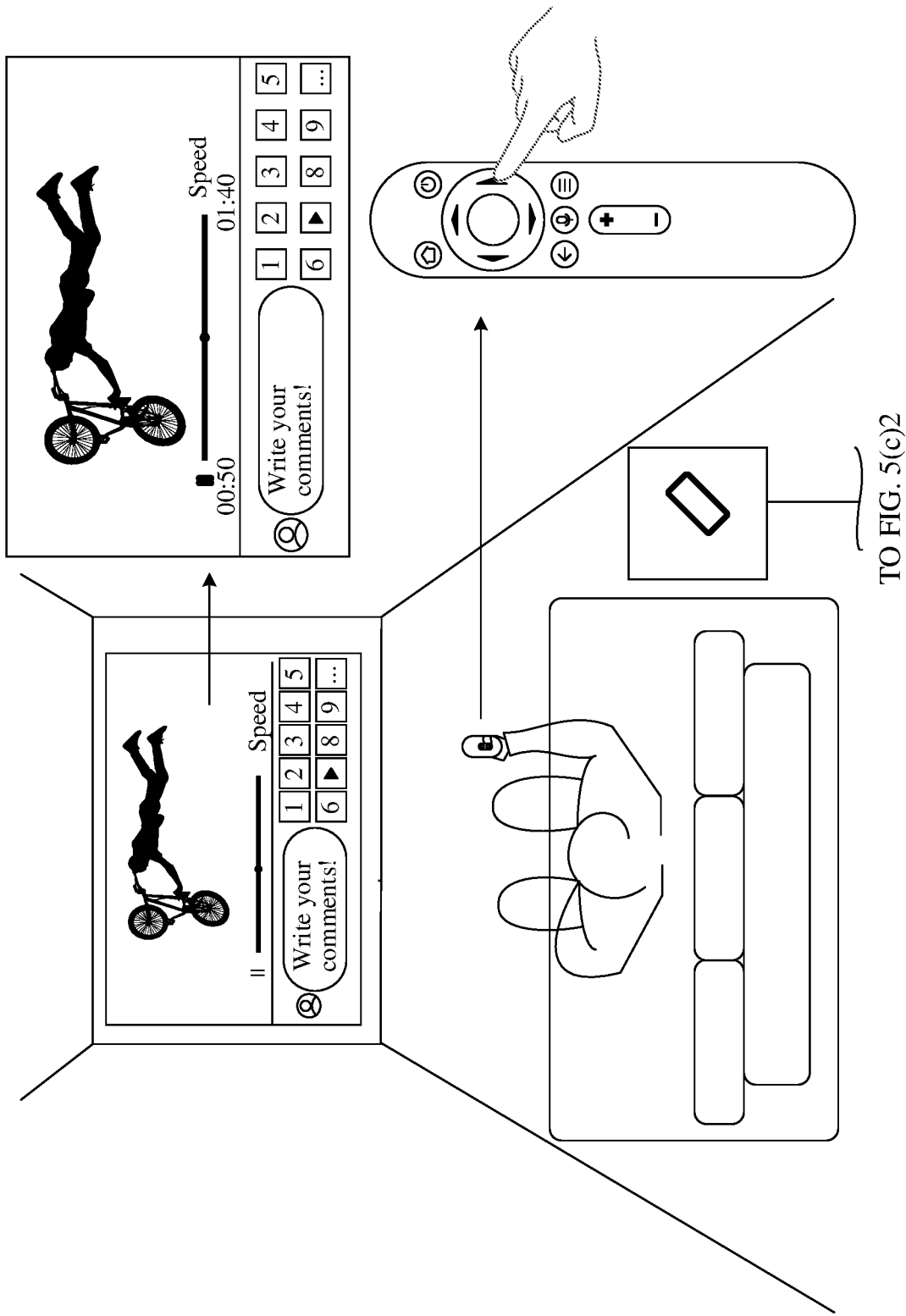
FIG. 5(c)1

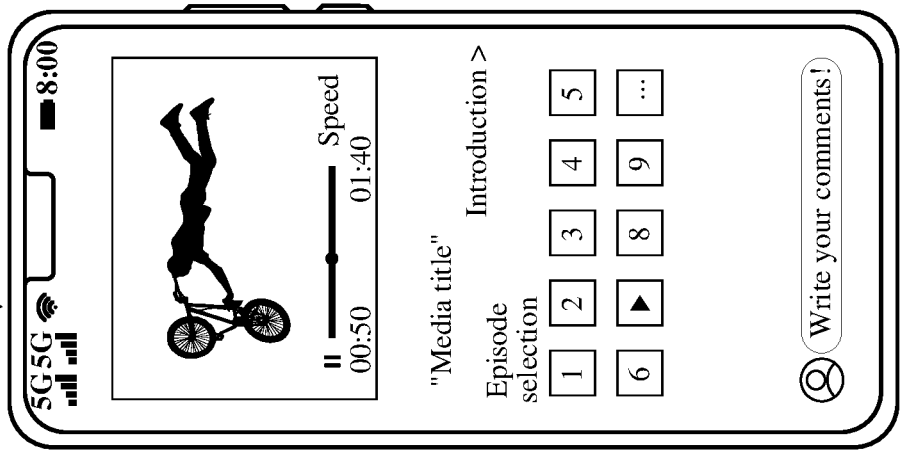
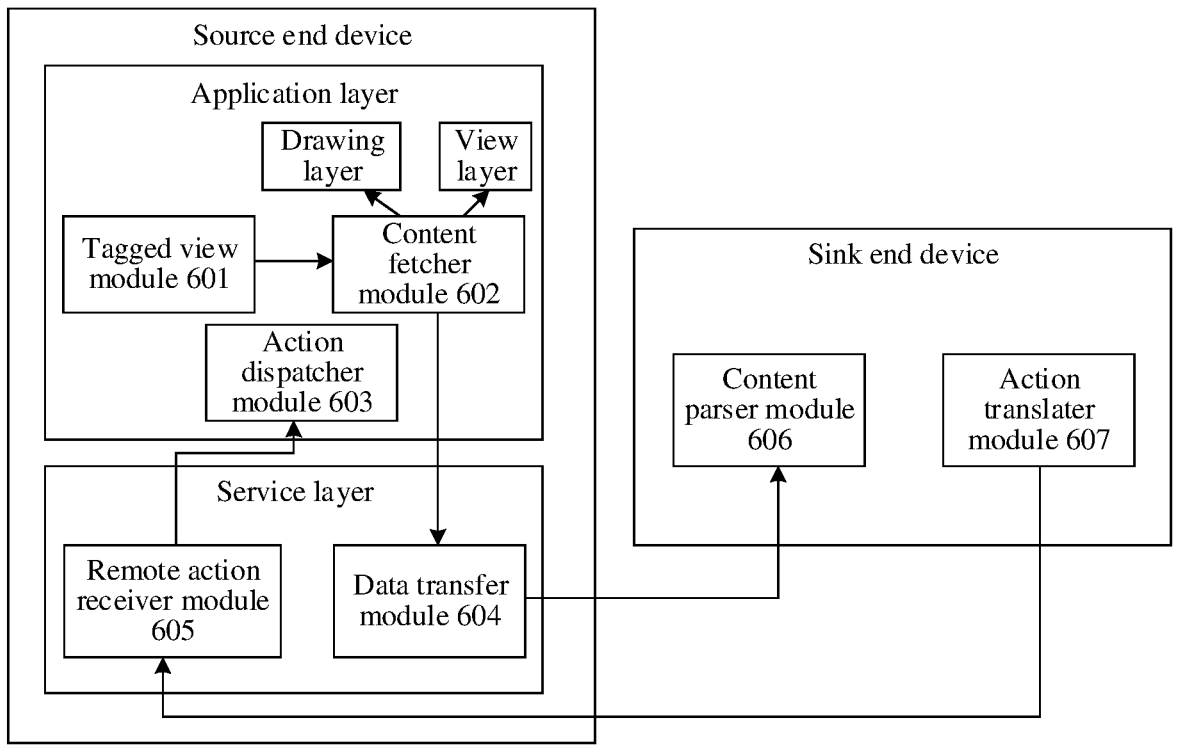
FIG. 6

DISPLAY METHOD, ELECTRONIC DEVICE, AND SYSTEM

CROSS-REFERENCE TO RELATED APPLICATIONS

This application is a national stage of International Application No. PCT/CN2022/083717, filed on Mar. 29, 2022, which claims priority to Chinese Patent Application No. 202110486127.9, filed on Apr. 30, 2021 and Chinese Patent Application No. 202110350010.8, filed on Mar. 31, 2021. All the aforementioned applications are hereby incorporated by reference in their entireties.

TECHNICAL FIELD

This application relates to the terminal field, and more specifically, to a display method, an electronic device, and a system.

BACKGROUND

Currently, a technology used for restoring user interfaces (user interfaces, UIs) between devices is mainly a video projection restoration technology (for example, Miracast). A basic principle of the technology is to encode a picture of a source end device (source end device) into a video and play the video on a client device (sink end device), so that the client device restores a user interface of the source end. This type of UI restoration technology requires a capability (for example, a video decoding capability) of the client device, and cannot be used on a device having no video decoding capability.

SUMMARY

Embodiments of this application provide a display method, an electronic device, and a system. A source end device adds tag information to an interface element on a user interface, and a client device may restore a user interface suitable for the client device by using the tag information of the interface element, without relying on a video decoding capability of the client device. In addition, the client may display a plurality of display interfaces on the source end device by using a screen, and a user does not need to switch between the plurality of display interfaces. This helps improve user experience.

According to a first aspect, a system is provided. The system includes a first electronic device and a second electronic device, and the first electronic device communicates with the second electronic device through a short-range wireless connection. The first electronic device is configured to: in response to receiving a first indication, display a first interface, and send first information to the second electronic device, where the first information includes one or more interface elements on the first interface and tag information of the one or more interface elements on the first interface. The second electronic device is configured to: in response to receiving the first information, display a second interface based on the tag information of the one or more interface elements on the first interface, where the second interface includes a first display window and a second display window, at least some interface elements of the one or more interface elements on the first interface are displayed in the first display window, the second display window is used for display of a display interface associated with a first interface element, and the at least some interface elements include the first interface element.

In this embodiment of this application, after receiving the first indication, the first electronic device (a source end device) may send the one or more interface elements on the first interface and the tag information of the one or more interface elements to the second electronic device (a client device), so that the second electronic device can restore, based on the tag information, an interface suitable for the second electronic device, and a user can experience different interface styles on different devices. This helps improve user experience. The first electronic device does not need to rely on a video encoding capability of the first electronic device when sending the interface element and the tag information of the interface element, and the second electronic device does not need to rely on a video decoding capability of the second electronic device when restoring the interface. In addition, the client may display a plurality of display interfaces (a level-1 page and a level-2 page) on the source end device by using a screen, and the user does not need to switch between the plurality of display interfaces. This helps improve use experience of the user.

In some possible implementations, each interface element of the one or more interface elements in the first information corresponds to tag information of each interface element.

In some possible implementations, the first electronic device is further configured to: before sending the first information to the second electronic device, obtain a plurality of interface elements on the first interface, and adds tag information to the plurality of interface elements.

In some possible implementations, the tag information may be a name of the interface element.

With reference to the first aspect, in some implementations of the first aspect, the second electronic device is specifically configured to display the first display window based on the tag information of the one or more interface elements on the first interface and a first mapping relationship, where the first mapping relationship includes a mapping relationship between display areas of the at least some interface elements and tag information of the at least some interface elements.

In some possible implementations, the first electronic device stores the first mapping relationship. When receiving the first indication, the first electronic device may send the first mapping relationship to the second electronic device in addition to sending the interface element and the tag information of the interface element to the second electronic device.

In some possible implementations, the first electronic device may store a plurality of mapping relationships about the first interface. For example, when the first electronic device (for example, a mobile phone) sends the first mapping relationship to the second electronic device (for example, a notebook computer), the first electronic device (for example, the mobile phone) may send a second mapping relationship to a third electronic device (for example, a smartwatch).

In some possible implementations, the second electronic device may store the first mapping relationship. When receiving the interface element and the tag information that are sent by the first electronic device, the second electronic device may display the first display window based on the first mapping relationship.

In this embodiment of this application, for different client devices, different display interfaces may be restored based on different mapping relationships. For example, for the notebook computer and the smartwatch, display interfaces of different styles may be restored in a same scenario. In this way, the user can experience different interface styles on different types of devices. This helps improve user experience.

With reference to the first aspect, in some implementations of the first aspect, the first interface element on the first interface is associated with a third interface. The first electronic device is further configured to send second information to the second electronic device in response to receiving the first indication. The second information includes one or more interface elements on the third interface and tag information of the one or more interface elements on the third interface. The second electronic device is specifically configured to: in response to receiving the first information and the second information, based on the tag information of the one or more interface elements on the first interface and the tag information of the one or more interface elements on the third interface, display, in the first display window, the at least some interface elements of the one or more interface elements on the first interface, and display, in the second display window, at least some interface elements of the one or more interface elements on the third interface.

In this embodiment of this application, after receiving the first indication, the first electronic device may send the first information and the second information to the second electronic device, so that the second electronic device may separately display the at least some interface elements on the first interface and the at least some interface elements on the third interface in the first display window and the second display window, and the user may simultaneously view the level-1 page and the level-2 page of the application on the second electronic device. Compared with single-screen display of the level-1 page or the level-2 page on the first electronic device, this helps improve user experience.

In some possible implementations, the first interface element may be any interface element on the first interface, or the first interface element may be an interface element in a preset direction on the first interface.

In some possible implementations, the first electronic device may store a mapping relationship between display areas of the at least some interface elements on the third interface and tag information of the at least some interface elements on the third interface. When sending the second information to the second electronic device, the first electronic device may also send the mapping relationship to the second electronic device. The second electronic device may display, in the second display window, the at least some interface elements on the third interface based on the tag information in the second information and the mapping relationship.

In some possible implementations, the second electronic device may store a mapping relationship between display areas of the at least some interface elements on the third interface and tag information of the at least some interface elements on the third interface.

With reference to the first aspect, in some implementations of the first aspect, the first interface element on the first interface is associated with a third interface. The second electronic device is further configured to send first indication information to the first electronic device in response to detecting an input of the user for the first interface element. The first indication information indicates that the second electronic device detects the input of the user for the first interface element. The first electronic device is further configured to send second information to the second electronic device in response to receiving the first indication information. The second information includes one or more interface elements on the third interface and tag information of the one or more interface elements on the third interface. The second electronic device is further configured to: in response to receiving the second information, based on the tag information of the one or more interface elements on the third interface, continue to display, in the first display window, the at least some interface elements of the one or more interface elements on the first interface, and display, in the second display window, at least some interface elements of the one or more interface elements on the third interface.

In this embodiment of this application, when detecting the input of the user for the first interface element, the second electronic device may indicate, to the first electronic device, that the second electronic device detects the input for the first interface element, so that the first electronic device may be triggered to send the second information to the second electronic device. The user may simultaneously view a level-1 page and a level-2 page of an application on the second electronic device. Compared with single-screen display of the level-1 page or the level-2 page on the first electronic device, this helps improve user experience.

With reference to the first aspect, in some implementations of the first aspect, the first electronic device is further configured to: in response to receiving the first indication information, switch from displaying the first interface to displaying the third interface.

In some possible implementations, the first electronic device may continue to display the first interface in response to receiving the first indication information.

With reference to the first aspect, in some implementations of the first aspect, the first interface element on the first interface is associated with a third interface. The first electronic device is further configured to: in response to detecting an input of the user for the first interface element on the first interface, switch from displaying the first interface to displaying the third interface, and send second information to the second electronic device. The second information includes one or more interface elements on the third interface and tag information of the one or more interface elements on the third interface. The second electronic device is further configured to: in response to receiving the second information, based on the tag information of the one or more interface elements on the third interface, continue to display, in the first display window, the at least some interface elements of the one or more interface elements on the first interface, and display, in the second display window, at least some interface elements of the one or more interface elements on the third interface.

In this embodiment of this application, when detecting the input of the user for the first interface element on the first interface, the first electronic device may switch from displaying the first interface to displaying the third interface, and send the second information to the second electronic device. The user may simultaneously view a level-1 page and a level-2 page of an application on the second electronic device. Compared with single-screen display of the level-1 page or the level-2 page on the first electronic device, this helps improve user experience.

With reference to the first aspect, in some implementations of the first aspect, the at least some interface elements of the one or more interface elements on the third interface include a second interface element. The first electronic device is further configured to update the second interface element on the third interface when detecting that the first interface element on the first interface is updated. The first electronic device is further configured to send third information to the second electronic device, where the third information includes an updated first interface element, an updated second interface element, tag information of the first interface element, and tag information of the second interface element. In response to receiving the third information, the second electronic device is further configured to display the updated first interface element in the first display window and the updated second interface element in the second display window based on the tag information of the first interface element and the tag information of the second interface element.

In some possible implementations, in response to an update of the first interface element, the first electronic device may add some new interface elements to the third interface, and send the updated first interface element, the newly added interface elements on the third interface, the tag information of the first interface element, and tag information of the newly added interface elements to the second electronic device, so that the second electronic device can update content in the first display window and the second display window in a timely manner.

With reference to the first aspect, in some possible implementations, the second interface includes a third interface element, and the third interface element is associated with the first interface or a fourth interface element on the third interface. The second electronic device is further configured to send second indication information to the first electronic device in response to detecting an input of the user for the third interface element, where the second indication information indicates that the second electronic device detects the input of the user for the third interface element. The first electronic device is further configured to: in response to receiving the second indication information, update the fourth interface element or perform an operation for the fourth interface element.

In some possible implementations, the first interface or the third interface of the first electronic device does not include the third interface element, and the first electronic device and the second electronic device may associate the third interface element with the fourth interface element in advance. Therefore, when the second electronic device detects the input of the user for the third interface element, the second electronic device may indicate the first electronic device to update the fourth interface element.

In some possible implementations, the third interface element may be a first text input box, and the fourth interface element may be a second text input box.

In some possible implementations, the third interface element may be a first sending control, and the fourth interface element may be a second sending control.

In some possible implementations, when the first electronic device performs the operation for the fourth interface element, the first electronic device may add a fifth interface element to the first interface and/or the third interface. The first electronic device may send the fifth interface element and tag information of the fifth interface element to the second electronic device, so that the second electronic device displays the fifth interface element on the second interface.

With reference to the first aspect, in some implementations of the first aspect, the first interface is a display interface of a social application, the first interface includes one or more chat records, the first interface element is a chat record between the user and a first contact in the one or more chat records, and the display interface associated with the first interface element is a chat interface between the user and the first contact.

With reference to the first aspect, in some implementations of the first aspect, the first interface is a display interface of a shopping application, the first interface includes shopping information of one or more commodities, the first interface element is shopping information of a first commodity in the one or more commodities, and the display interface associated with the first interface element is a shopping details page of the first commodity.

With reference to the first aspect, in some implementations of the first aspect, the first electronic device is further configured to: before sending the first information to the second electronic device, determine that a distance between the first electronic device and the second electronic device is less than or equal to a preset distance.

According to a second aspect, a display method is provided. The method is applied to a first electronic device, and the first electronic device communicates with a second electronic device through a short-range wireless connection. The method includes: The first electronic device receives a first indication; and in response to receiving the first indication, the first electronic device displays a first interface, and sends first information to the second electronic device, where the first information includes one or more interface elements on the first interface and tag information of the one or more interface elements.

With reference to the second aspect, in some implementations of the second aspect, the method further includes: The first electronic device sends information about a first mapping relationship to the second electronic device, where the first mapping relationship is a mapping relationship between a display area of an interface element and the tag information of the interface element.

With reference to the second aspect, in some implementations of the second aspect, the first interface element on the first interface is associated with a third interface. The method further includes: The first electronic device sends second information to the second electronic device in response to receiving the first indication, where the second information includes one or more interface elements on the third interface and tag information of the one or more interface elements on the third interface.

With reference to the second aspect, in some implementations of the second aspect, the first interface element on the first interface is associated with a third interface. The method further includes: The first electronic device receives first indication information sent by the second electronic device, where the first indication information indicates that the second electronic device detects an input of a user for the first interface element; and the first electronic device sends second information to the second electronic device in response to receiving the first indication information, where the second information includes one or more interface elements on the third interface and tag information of the one or more interface elements on the third interface.

With reference to the second aspect, in some implementations of the second aspect, the method further includes: in response to receiving the first indication information, the first electronic device switches from displaying the first interface to displaying the third interface.

With reference to the second aspect, in some implementations of the second aspect, the first interface element on the first interface is associated with a third interface. The method further includes: in response to detecting an input of a user for the first interface element on the first interface, the first electronic device switches from displaying the first interface to displaying the third interface, and sends second information to the second electronic device, where the second information includes one or more interface elements on the third interface and tag information of the one or more interface elements on the third interface.

With reference to the second aspect, in some implementations of the second aspect, the at least some interface elements of the one or more interface elements on the third interface include a second interface element; and the method further includes: The first electronic device updates the second interface element on the third interface when detecting that the first interface element on the first interface is updated; and the first electronic device sends third information to the second electronic device, where the third information includes an updated first interface element, an updated second interface element, tag information of the first interface element, and tag information of the second interface element.

With reference to the second aspect, in some implementations of the second aspect, the second interface includes a third interface element, and the third interface element is associated with the first interface or a fourth interface element on the third interface. The first electronic device receives second indication information sent by the second electronic device, where the second indication information indicates that the second electronic device detects an input of the user for the third interface element. In response to receiving the second indication information, the first electronic device updates the fourth interface element or performs an operation for the fourth interface element.

With reference to the second aspect, in some implementations of the second aspect, the first interface is a display interface of a social application, the first interface includes one or more chat records, the first interface element is a chat record between the user and a first contact in the one or more chat records, and a display interface associated with the first interface element is a chat interface between the user and the first contact.

With reference to the second aspect, in some implementations of the second aspect, the first interface is a display interface of a shopping application, the first interface includes shopping information of one or more commodities, the first interface element is shopping information of a first commodity in the one or more commodities, and a display interface associated with the first interface element is a shopping details page of the first commodity.

With reference to the second aspect, in some implementations of the second aspect, the method further includes: Before sending the first information to the second electronic device, the first electronic device determines that a distance between the first electronic device and the second electronic device is less than or equal to a preset distance.

According to a third aspect, a display method is provided. The method is applied to a second electronic device, and the second electronic device communicates with a first electronic device through a short-range wireless connection. The method includes: The second electronic device receives first information sent by the first electronic device, where the first information includes one or more interface elements on a first interface displayed by the first electronic device and tag information of the one or more interface elements; and in response to receiving the first information, the second electronic device displays a second interface based on the tag information of the one or more interface elements on the first interface, where the second interface includes a first display window and a second display window, at least some interface elements of the one or more interface elements on the first interface are displayed in the first display window, the second display window is used for display of a display interface associated with a first interface element, and the at least some interface elements include the first interface element.

With reference to the third aspect, in some implementations of the third aspect, that the second electronic device displays a second interface based on the tag information of the one or more interface elements includes: The second electronic device displays the second interface based on the tag information of the one or more interface elements and a first mapping relationship, where the first mapping relationship is a mapping relationship between display areas of the at least some interface elements and tag information of the at least some interface elements.

With reference to the third aspect, in some implementations of the third aspect, the first interface element on the first interface is associated with a third interface. The method further includes: The second electronic device receives second information sent by the first electronic device, where the second information includes one or more interface elements on the third interface and tag information of the one or more interface elements on the third interface. That the second electronic device displays a second interface includes: In response to receiving the first information and the second information, based on the tag information of the one or more interface elements on the first interface and the tag information of the one or more interface elements on the third interface, the second electronic device displays, in the first display window, the at least some interface elements of the one or more interface elements on the first interface, and displays, in the second display window, at least some interface elements of the one or more interface elements on the third interface.

With reference to the third aspect, in some implementations of the third aspect, the first interface element on the first interface is associated with a third interface. The method further includes: The second electronic device sends first indication information to the first electronic device in response to detecting an input of a user for the first interface element, where the first indication information indicates that the second electronic device detects the input of the user for the first interface element; the second electronic device receives second information sent by the first electronic device, where the second information includes one or more interface elements on the third interface and tag information of the one or more interface elements on the third interface; and in response to receiving the second information, based on the tag information of the one or more interface elements on the third interface, the second electronic device continues to display, in the first display window, the at least some interface elements of the one or more interface elements on the first interface, and displays, in the second display window, at least some interface elements of the one or more interface elements on the third interface.

With reference to the third aspect, in some implementations of the third aspect, the second interface includes a third interface element, and the third interface element is associated with the first interface or a fourth interface element on the third interface. The method further includes: The second electronic device sends second indication information to the first electronic device in response to detecting an input of the user for the third interface element, where the second indication information indicates that the second electronic device detects the input of the user for the third interface element.

With reference to the third aspect, in some implementations of the third aspect, the first interface is a display interface of a social application, the first interface includes one or more chat records, the first interface element is a chat record between the user and a first contact in the one or more chat records, and the display interface associated with the first interface element is a chat interface between the user and the first contact.

With reference to the third aspect, in some implementations of the third aspect, the first interface is a display interface of a shopping application, the first interface includes shopping information of one or more commodities, the first interface element is shopping information of a first commodity in the one or more commodities, and the display interface associated with the first interface element is a shopping details page of the first commodity.

According to a fourth aspect, an apparatus is provided. The apparatus includes: a receiving unit, configured to receive a first indication; a display unit, configured to display a first interface by a first electronic device in response to receiving the first indication; and a sending unit, configured to send first information to the second electronic device, where the first information includes one or more interface elements on the first interface and tag information of the one or more interface elements.

According to a fifth aspect, an apparatus is provided. The apparatus includes: a receiving unit, configured to receive first information sent by a first electronic device, where the first information includes one or more interface elements on a first interface displayed by the first electronic device and tag information of the one or more interface elements; and a display unit, configured to: in response to receiving the first information, display a second interface based on the tag information of the one or more interface elements on the first interface, where the second interface includes a first display window and a second display window, at least some interface elements of the one or more interface elements on the first interface are displayed in the first display window, the second display window is used for display of a display interface associated with a first interface element, and the at least some interface elements include the first interface element.

According to a sixth aspect, an electronic device is provided, including one or more processors, a memory, and one or more computer programs. The one or more computer programs are stored in the memory, and the one or more computer programs include instructions. When the instructions are executed by the electronic device, the electronic device is enabled to perform the method in any possible implementation of the second aspect.

According to a seventh aspect, an electronic device is provided, including one or more processors, a memory, and one or more computer programs. The one or more computer programs are stored in the memory, and the one or more computer programs include instructions. When the instructions are executed by the electronic device, the electronic device is enabled to perform the method in any possible implementation of the third aspect.

According to an eighth aspect, a computer program product including instructions is provided. When the computer program product runs on a first electronic device, the electronic device is enabled to perform the method according to the second aspect, or when the computer program product runs on a second electronic device, the electronic device is enabled to perform the method according to the third aspect.

According to a ninth aspect, a computer-readable storage medium is provided, including instructions. When the instructions are run on a first electronic device, the electronic device is enabled to perform the method according to the second aspect, or when the instruction are run on a second electronic device, the electronic device is enabled to perform the method according to the third aspect.

According to a tenth aspect, a chip is provided, and is configured to execute instructions. When the chip runs, the chip performs the method according to the second aspect; or the chip performs the method according to the third aspect.

BRIEF DESCRIPTION OF DRAWINGS

FIG. 3($a$)1 to FIG. 3($g$)2 show a group of graphical user interfaces according to an embodiment of this application;

FIG. 4($a$)1 to FIG. 4($c$)2 show another group of graphical user interfaces according to an embodiment of this application;

FIG. 5($a$)1 to FIG. 5($c$)2 show another group of graphical user interfaces according to an embodiment of this application;

FIG. 6 is a schematic block diagram of a system architecture according to an embodiment of this application;

DESCRIPTION OF EMBODIMENTS

The following describes the technical solutions in this embodiment of this application with reference to the accompanying drawings in the embodiments of this application. In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this embodiment of this application, "multiple" or "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this embodiment, unless otherwise specified, "a plurality of" means two or more.

The method provided in this embodiment of this application may be applied to an electronic device, for example, a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in the embodiments of this application.

Figure 1:
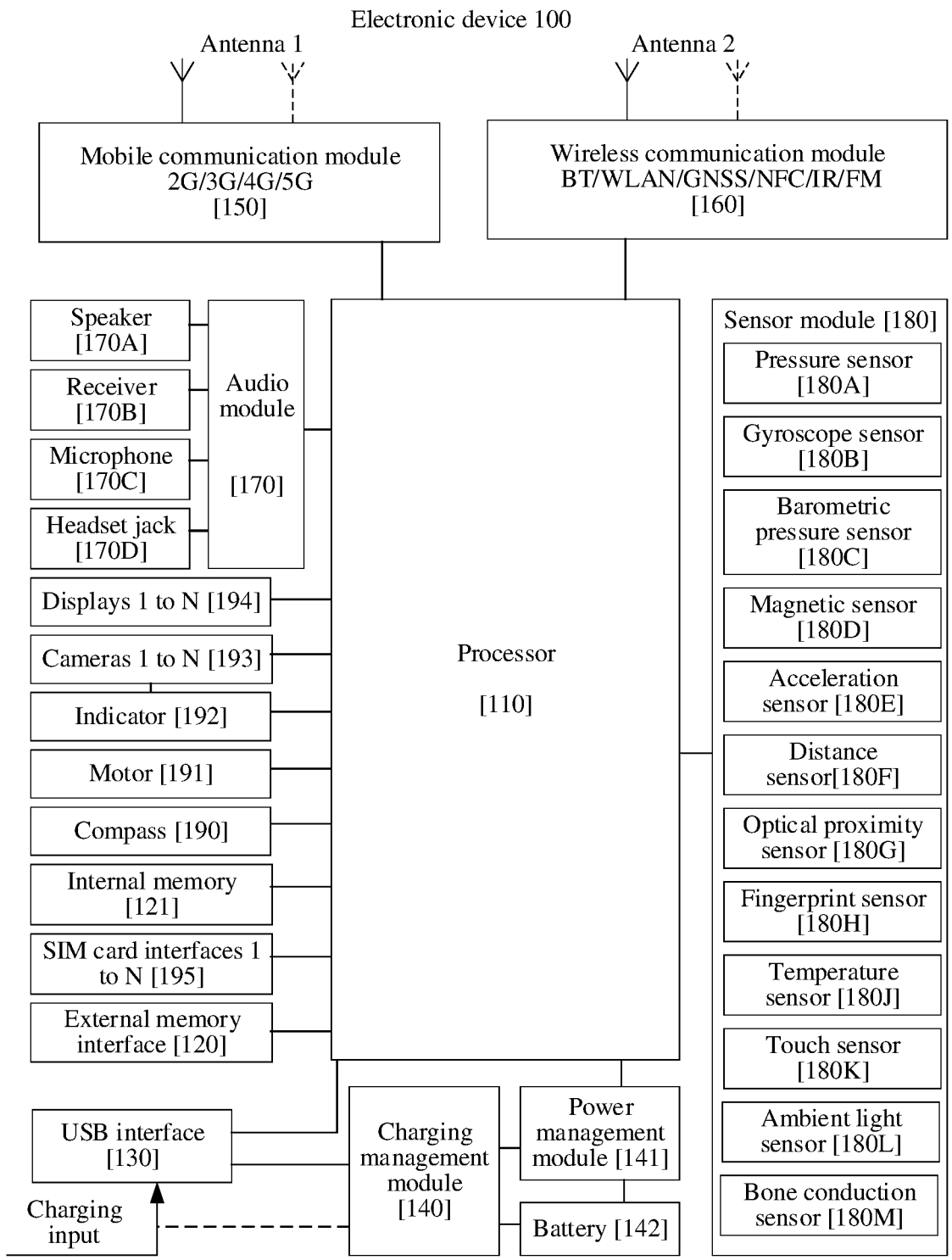
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that, the structure shown in this embodiment of this application does not constitute a specific limitation on the electronic device 100. In some other embodiments of this application, the electronic device 100 may include more or fewer components than the components shown in the figure, or combine some components, or split some components, or use different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus that includes a serial data line (serial data line, SDA) and a serial clock line (serail clock line, SCL). In some embodiments, the processor 110 may include a plurality of groups of I2C buses. The processor 110 may be separately coupled to the touch sensor 180K, a charger, a flash, the camera 193, and the like by using different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and encode an analog signal. In some embodiments, the audio module 170 and the wireless communication module 160 may be coupled through a PCM bus interface. In some embodiments, the audio module 170 may alternatively transfer an audio signal to the wireless communication module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 and the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to peripheral components such as the display 194 and the camera 193. The MIPI interface includes a camera serial interface (camera serial interface, CSI), a display serial interface (display serial interface, DSI), and the like. In some embodiments, the processor 110 communicates with the camera 193 through a CSI interface, to implement a photographing function of the electronic device 100. The processor 110 communicates with the display 194 through a DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, or may be configured to perform data transmission between the electronic device 100 and a peripheral device, or may be configured to connect to a headset to play an audio by using the headset. The interface may be further configured to connect to another electronic device, for example, an AR device.

It may be understood that, an interface connection relationship between the modules shown in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the electronic device 100. When charging the battery 142, the charging management module 140 may further supply power to the electronic device by using the power management module 141.

The power management module 141 is configured to connect the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be reused as a diversity antenna in a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio output device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 100. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into an image visible to a naked eye. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, and N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy and the like.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (such as a sound playing function or an image playing function), and the like. The data storage area may store data (for example, audio data or an address book) created during use of the electronic device 100, and the like. In addition, the internal memory 121 may include a high-speed random access memory, and may further include a non-volatile memory, for example, at least one magnetic disk storage device, a flash memory device, or a universal flash storage (universal flash storage, UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may listen to music or listen to a hands-free call by using the speaker 170A.

The receiver 170B, also referred to as an "earpiece", is configured to convert an audio electrical signal into a sound signal. When the electronic device 100 answers a call or voice information, the voice may be answered by placing the receiver 170B close to an ear.

The microphone 170C, also referred to as a "mike" or a "mic", is configured to convert a sound signal into an electrical signal. When making a call or sending voice information, a user may make a sound by using the mouth close to the microphone 170C, and input a sound signal to the microphone 170C. The electronic device 100 may be provided with at least one microphone 170C. In some other embodiments, two microphones 170C may be disposed in the electronic device 100, to implement a noise reduction function in addition to collecting a sound signal. In some other embodiments, three, four, or more microphones 107C may alternatively be disposed in the electronic device 100, to collect a sound signal, reduce noise, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 180A. The electronic device 100 determines strength of the force based on the change of the capacitance. When a touch operation is performed on the display 194, the electronic device 100 detects strength of the touch operation based on the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a motion posture of the electronic device 100. In some embodiments, an angular velocity of the electronic device 100 around three axes (namely, axes x, y, and z) may be determined through the gyroscope sensor 180B. The gyroscope sensor 180B may be configured to perform image stabilization during photographing. For example, when the shutter is pressed, the gyroscope sensor 180B detects a shake angle of the electronic device 100, and calculates, based on the angle, a distance that needs to be compensated for a lens module, so that the lens cancels the shake of the electronic device 100 through reverse motion, thereby implementing image stabilization. The gyroscope sensor 180B may also be used for navigation and motion-controlled gaming scenarios.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip machine, the electronic device 100 may detect opening and closing of the flip cover based on the magnetic sensor 180D. In this way, a feature, for example, automatic unlocking of the flip cover is set based on a detected open/closed state of a leather case or a detected open/closed state of the flip cover.

The acceleration sensor 180E may detect magnitudes of accelerations of the electronic device 100 in all directions (usually on three axes), may detect magnitude and a direction of gravity when the electronic device 100 is static, may be further configured to identify a posture of the electronic device, and is applied to applications such as landscape/portrait orientation switching and a pedometer.

The distance sensor 180F is configured to measure a distance. The electronic device 100 may measure a distance by using infrared or laser. In some embodiments, in a photographing scenario, the electronic device 100 may perform distance measurement by using the distance sensor 180F, to implement fast focusing.

The optical proximity sensor 180G may include, for example, a light emitting diode (LED) and a photodetector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to the ear for a call, so as to automatically turn off a screen to save power. The optical proximity sensor 180G may also be used in a flip cover mode or a pocket mode to automatically perform screen unlocking or locking.

The ambient light sensor 180L is configured to sense luminance of ambient light. The electronic device 100 may adaptively adjust luminance of the display 194 based on the sensed luminance of the ambient light. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 reduces performance of a processor near the temperature sensor 180J, to reduce power consumption and implement thermal protection. In some other embodiments, when the temperature is lower than another threshold, the electronic device 100 heats the battery 142, to avoid abnormal shutdown of the electronic device 100 caused by a low temperature. In some other embodiments, when the temperature is lower than still another threshold, the electronic device 100 boosts an output voltage of the battery 142, to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided by using the display 194. In some other embodiments, the touch sensor 180K may alternatively be disposed on a surface of the electronic device 100, and is at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a pulse of a human body and receive a blood pressure pulse signal. In some embodiments, the bone conduction sensor 180M may also be disposed in the headset, to combine into a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, may be configured to indicate a charging status and a battery level change, and may also be configured to indicate a message, a missed call, a notification, and the like.

An SIM card interface 195 is configured to connect to an SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be inserted into a same SIM card interface 195 at the same time. Types of the plurality of cards may be the same or may be different. The SIM card interface 195 may also be compatible with different types of SIM cards. The SIM card interface 195 may also be compatible with an external memory card. The electronic device 100 interacts with a network through the SIM card, to implement functions such as talking and data communication. In some embodiments, the electronic device 100 uses an embedded-SIM (embedded-SIM, eSIM) card, namely, an embedded-SIM card. The eSIM card may be embedded into the electronic device 100, and cannot be separated from the electronic device 100.

It should be understood that a telephone card in this embodiment of this application includes but is not limited to a SIM card, an eSIM card, a universal subscriber identity card (universal subscriber identity module, USIM), a universal integrated circuit card (universal integrated circuit card, UICC), and the like.

A software system of the electronic device 100 may use a layered architecture, an event-driven architecture, a microkernel architecture, a micro service architecture, or a cloud architecture. In this embodiment of this application, an Android system with a layered architecture is used as an example to describe a software structure of the electronic device 100.

Figure 2:
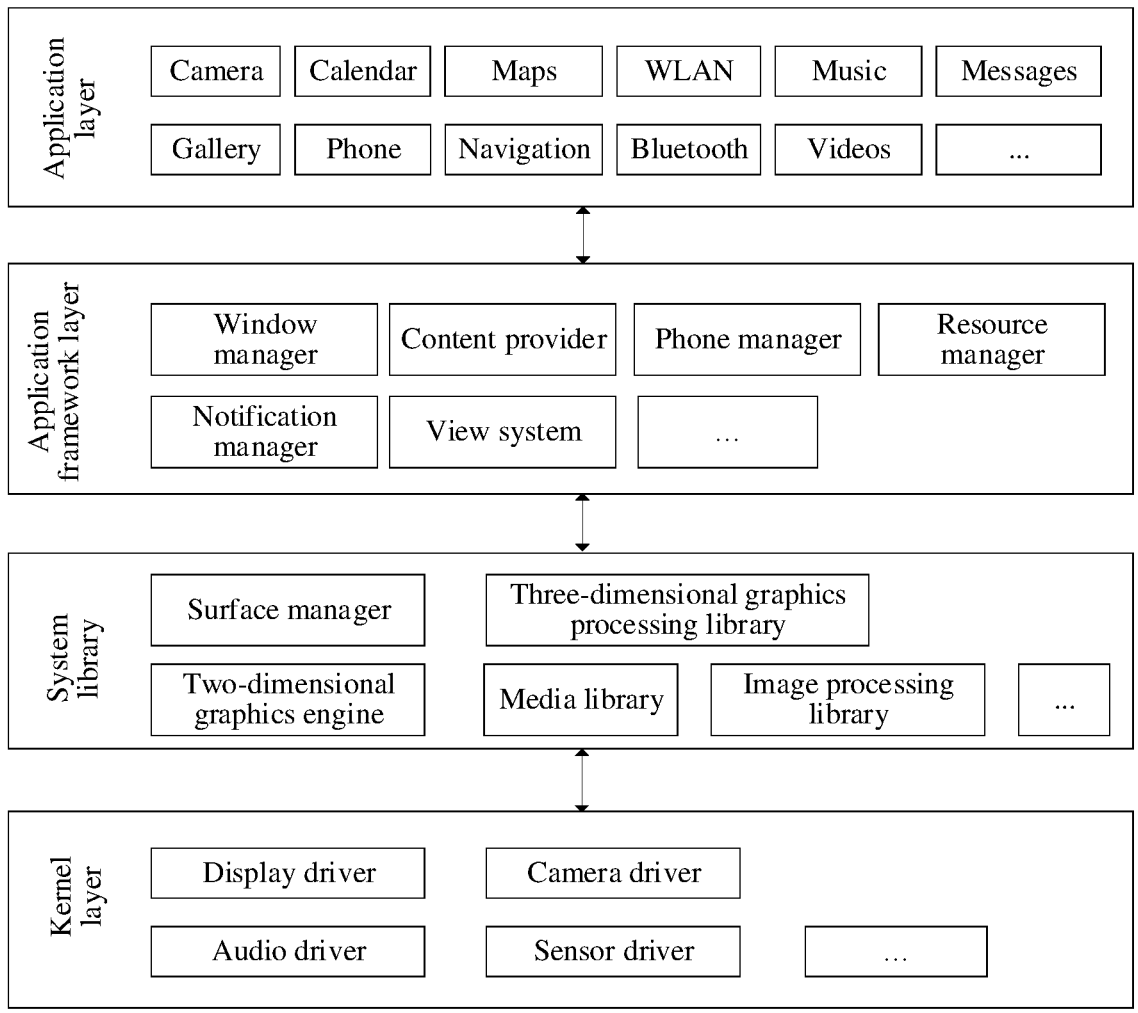
FIG. 2 is a block diagram of a software structure according to an embodiment of this application.

FIG. 2 is a block diagram of the software structure of the electronic device 100 according to an embodiment of this application. In a layered architecture, software may be divided into several layers, and each of the layers has a clear role and task. Layers communicate with each other through software interfaces. In some embodiments, an Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application program layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, capture a screen, and the like.

The content provider is configured to store and obtain data and make the data accessible to an application. The data may include a video, an image, an audio, calls that are made and received, a browsing history, a bookmark, an address book, and the like.

The view system includes visual controls such as a control for displaying a text and a control for displaying an image.

The view system may be configured to construct an application. A display interface may include one or more views. For example, a display interface including a message notification icon may include a view for displaying a text and a view for displaying an image.

The phone manager is configured to provide a communication function of the electronic device 100, for example, management of a call status (including call connection and call disconnection).

The resource manager provides various resources such as localized strings, icons, images, layout files, and video files for an application.

The notification manager enables an application to display notification information in the status bar, and may be configured to convey a notification message. The displayed notification information may disappear after a short pause without user interaction. For example, the notification manager is configured to notify download completion and a message notification. Alternatively, the notification manager may be a notification that appears in the status bar at the top of the system in a form of a chart or a scroll bar text, for example, a notification of an application running in a background, or may be a notification that appears on the screen in a form of a dialog window. For example, text information is prompted in the status bar, a prompt tone is played, the electronic device vibrates, or an indicator blinks.

Android runtime includes a kernel library and a virtual machine. The Android runtime is responsible for scheduling and management of the Android system.

The kernel library includes two parts: a function that needs to be called in language and a kernel library of Android.

The application layer and the application framework layer run in the virtual machine. The virtual machine executes Java files of the application layer and the application framework layer into binary files. The virtual machine is configured to perform functions such as object life cycle management, stack management, thread management, security and exception management, and garbage collection.

The system library may include a plurality of functional modules, for example, a surface manager (surface manager), a media library (media library), a three-dimensional graphics processing library (for example, OpenGL ES), and a 2D graphics engine (for example, SGL).

The surface manager is configured to manage a display subsystem, and provide fusion of 2D and 3D layers for a plurality of applications.

The media library supports playback and recording of a plurality of commonly used audio and video formats, static image files, and the like. The media library supports a plurality of audio and video encoding formats such as MPEG-4, H.264, MP3, AAC, AMR, JPG, and PNG.

The three-dimensional graphics processing library is configured to implement three-dimensional graphics drawing, image rendering, synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be understood that the technical solutions in this embodiment of this application may be applied to systems such as Android, IOS, and HarmonyOS.

FIG. 3(a)1 to FIG. 3(g)2 show a group of graphical user interfaces (graphical user interfaces, GUIs) according to an embodiment of this application.

As shown in FIG. 3(a)1 and FIG. 3(a)2, a mobile phone displays a home screen of the mobile phone, the home screen of the mobile phone includes icons of a plurality of applications, and the plurality of applications include a social application. A notebook computer is located near the mobile phone, and the notebook computer may display a desktop of the notebook computer.

When the notebook computer approaches the mobile phone, the mobile phone and the notebook computer may be networked in a near field wireless connection manner. A networking manner includes but is not limited to access point (access point, AP) networking and peer-to-peer (peer-to-peer, P2P) networking. In AP networking, devices connected to a same AP (for example, a home Wi-Fi router) may communicate with each other by using an AP device, to form many-to-many networking. For example, the mobile phone and the notebook computer may be located under a same home router. When the notebook computer approaches the mobile phone, the mobile phone may calculate a distance between the mobile phone and the notebook computer based on strength of a received signal by using a received signal strength indication (received signal strength indication, RSSI) technology. When the distance is less than or equal to a preset distance, the mobile phone and the notebook computer may perform AP networking.

Wi-Fi direct (Wi-Fi direct): Wi-Fi direct is also referred to as Wi-Fi peer-to-peer (Wi-Fi peer-to-peer, Wi-Fi P2P), and is a peer-to-peer connection manner. Wi-Fi direct enables a plurality of Wi-Fi devices to form a peer-to-peer network (peer-to-peer network, P2P network) without an access point (access point, AP), to communicate with each other. One station (station, STA) may act as a conventional AP, and is referred to as a group owner (group owner, GO). Another STA may be referred to as a group client (group client, GC), and the GC may be connected to the GO like connecting to the AP. One STA may play a role of the GO (that is, act as the AP), and another STA may play a role of the GC. In this embodiment of this application, when a device approaches another device, the device on a left side may be considered as a GO, and the device on a right side may be considered as a GC by default. For example, the mobile phone may be used as a GO, and the notebook computer may be used as a GC. Alternatively, when a device detects a right swipe operation of a user, the device may be used as a GC, and the device may select another device on a left side of the device as a GO, or when a device detects a left swipe operation of a user, the device may be used as a GC, and the device may select another device on a right side of the device as a GO.

To construct a P2P network, an electronic device needs to scan another electronic device by using a P2P protocol. This process is referred to as a discovery phase. After the discovery, establishment of a P2P connection can be triggered. When the notebook computer approaches the mobile phone, the mobile phone may calculate the distance between the mobile phone and the notebook computer based on an RSSI by using the RSSI technology. When the distance is less than or equal to the preset distance, the mobile phone and the notebook computer may perform P2P networking.

A Wi-Fi P2P technology is the basis of an upper-layer service. Currently, P2P applications established on P2P include a Miracast application and a WLAN direct application. In a Miracast application scenario, an electronic device that supports P2P may discover, through scanning, a large-screen device that supports P2P, connect to the large-screen device that supports P2P, and then directly send resources such as a video and an image of the electronic device to the large-screen device for display. The P2P technology greatly enriches Wi-Fi experience.

When the mobile phone detects that the user taps an icon of the social application, the mobile phone and the notebook computer may display GUIs shown in FIG. 3(b)1 and FIG. 3(b)2.

It should be understood that when the distance between the mobile phone and the notebook computer is less than or equal to the preset distance, the mobile phone and the notebook computer may perform networking. For a networking process, refer to the descriptions in the foregoing embodiment. Details are not described herein again.

As shown in FIG. 3(b)1 and FIG. 3(b)2, in response to detecting the operation of tapping the icon of the social application by the user, the mobile phone may display a home page of the social application. The home page of the social application includes a plurality of interface elements, such as a chat record 300 of a group chat (named "family"), a chat record 305 with a contact Mom, a chat record 306 with a contact Sam, and a chat record 307 with a contact Lucy. The chat record 300 of the group chat is used as an example. The chat record includes profile picture information 301 of contacts in the group chat, a name 302 of the group chat, a latest chat record 303 in the group chat, and occurrence time 304 of the latest chat record.

In an embodiment, when the mobile phone determines that the distance between the notebook computer and the mobile phone is less than or equal to the preset distance, the mobile phone may send information of a plurality of interface elements on the currently displayed home page of the social application to the notebook computer. As shown in FIG. 3(b)1 and FIG. 3(b)2, in response to receiving the information about the plurality of interface elements sent by the mobile phone, the notebook computer may display another home page display window 308 of the social application, where an area 3081 and a display area 3082 are displayed in the window 308, and the chat record 300 of the group chat, the chat record 305 with the contact Mom, the chat record 306 with the contact Sam, and the chat record 307 with the contact Lucy are separately displayed in the display area 3081 from top to bottom. The display area 3082 may be used for display of a chat interface between the user and a contact or a group chat including the user.

In an embodiment, when the mobile phone detects that the user starts the social application, if the mobile phone and the notebook computer have been networked, the mobile phone may prompt the user whether to send a display interface of the social application to the notebook computer. When the mobile phone detects an operation that the user determines to send the display interface of the social application to the notebook computer, the mobile phone may send information about the plurality of interface elements on the currently displayed display interface of the social application to the notebook computer.

In an embodiment, an icon associated with a social application may be displayed on a display interface of the notebook computer. When the notebook computer detects an operation of tapping the icon by the user, the notebook computer may send request information to the mobile phone, where the request information is used to request the mobile phone to send the information about the plurality of interface elements on the display interface of the social application to the notebook computer. It should be understood that the icon associated with the social application is displayed on the notebook computer does not indicate that the social application is installed on the notebook computer, and a function of the icon may be to trigger the notebook computer to send the request information to the mobile phone.

In an embodiment, when the notebook computer detects a first operation of the user (for example, clicking a mouse or clicking a key on a keyboard), the notebook computer may send indication information to the mobile phone, where the indication information indicates that the notebook computer detects the first operation of the user. When the mobile phone is currently displaying the display interface of the social application, the mobile phone may send the information about the plurality of interface elements to the notebook computer in response to receiving the indication information.

In an embodiment, the mobile phone may further send a device name (for example, Mate 40) and a user name (for example, Lily) of the mobile phone to the notebook computer. The notebook computer may further prompt, in the window 308, the user that the display interface of the social application is from Mate 40 of Lily.

In an embodiment, in response to receiving the information that is about the plurality of interface elements and that is sent by the mobile phone, the notebook computer may further draw a window minimize control 309 and a window close control 310 in addition to restoring the home page of the social application displayed on the mobile phone. When the notebook computer detects an operation of tapping the control 309 by the user, the notebook computer may minimize the window 308. When the notebook computer detects an operation of tapping the control 310 by the user, the notebook computer may further close the window 308.

In an embodiment, when the notebook computer detects a scale-down operation or a scale-up operation performed by the user on the window 308, the notebook computer may further adjust a size of the window 308.

As shown in FIG. 3(b)1 and FIG. 3(b)2, when the notebook computer detects that the user taps the chat record with the contact Mom, the mobile phone and the notebook computer may display GUIs shown in FIG. 3(c)1 and FIG. 3(c)2.

As shown in FIG. 3(c)1 and FIG. 3(c)2, the notebook computer may send a touch event and tag information of the chat record 305 to the mobile phone in response to detecting that the user taps the chat record with the contact Mom. In response to receiving the touch event and the tag information, the mobile phone may determine that the user taps the chat record with the contact Mom on the notebook computer, so that the mobile phone may display a chat interface between the user and the contact Mom. The chat interface includes a plurality of interface elements, for example, a return control 311, a name 312 of the contact Mom, time information 313 of a latest chat record between the user and the contact Mom, a profile picture 314 of the contact Mom, and content 315 of the latest chat record between the user and the contact Mom. In addition, the mobile phone may further send information about the plurality of interface elements on the chat interface to the notebook computer. The notebook computer may display the plurality of interface elements in the display area 3082 in the window 308 in response to receiving the information that is about the plurality of interface elements and that is sent by the mobile phone.

As shown in FIG. 3(c)1 and FIG. 3(c)2, the notebook computer may display the name 312 of the contact Mom, the time information 313 of the latest chat record between the user and the contact Mom, the profile picture 314 of the contact Mom, and the content 315 of the latest chat record between the user and the contact Mom in the display area 3082 in the window 308. The notebook computer may further draw a text input box 316 in the display area 3082 in response to receiving the information about the plurality of interface elements, where the text input box 316 may be used for text input, and the text input box further includes a voice control 317 and a "Send" control 318.

When the notebook computer detects that the user enters text content "Mom, I'll recommend a good movie to you" in the text input box 316, the notebook computer may send the text content to the mobile phone. The mobile phone may display the text content in a text input box 319 in response to receiving the text content. When the notebook computer detects an operation of tapping the "Send" control 318 by the user, the notebook computer may send a touch event and tag information of the control 318 to the mobile phone. In response to receiving the touch event and the tag information of the control 318, the mobile phone may determine that the user taps the "Send" control on the notebook computer. Therefore, the mobile phone may send the content "Mom, I'll recommend a good movie to you" in the text input box to the contact Mom.

As shown in FIG. 3(*d*)1 to FIG. 3(*d*)3, in response to sending the text content to the contact Mom, the mobile phone may display another chat interface between the user and the contact Mom. Compared with the chat interface displayed by the mobile phone in FIG. 3(*c*)1 and FIG. 3(*c*)2, time information 320 for sending the text content, a profile picture 321 of the user, and content 322 replied by the user are further added the chat interface. In response to completing replying to the message, the mobile phone may further send, to the notebook computer, information about an interface element that is newly added after the interface is updated, for example, the time information 320 for sending the text content, the profile picture 321 of the user, and the content 322 replied by the user. The notebook computer may update content of the display area 3082 in the window 308 in response to receiving the information that is about the plurality of interface elements and that is sent by the mobile phone. As shown in FIG. 3(*d*)1 to FIG. 3(*d*)3, the notebook computer may add the time information 320 for sending the text content, the profile picture 321 of the user, and the content 322 replied by the user to the display area 3082 in the window 308.

When the mobile phone completes replying to the text content, content 3051 of a latest chat in the chat record 305 on the home page of the social application is updated from "Happy Birthday!" to "Mom, I'll recommend a good movie to you", and time information 3052 of the latest chat is updated from "Saturday" to "08:00 a.m.". A sequence of the plurality chat records changes with latest chat time (the chat record between the user and the contact Mom, the chat record of the group chat, the chat record between the user and the contact Sam, and the chat record of the contact Lucy are displayed from top to bottom on the home page of the social application).

It should be understood that, on the home page of the social application displayed by the mobile phone, changes of the interface element 3051 and the interface element 3052 are invisible to the user. In this case, the mobile phone still displays the chat interface between the user and the contact Mom.

In response to a change of an interface element on the home page of the social application, the mobile phone may send information about a plurality of updated interface elements to the notebook computer, for example, the content 3051 of the latest chat in the chat record 305, the time information 3052 of the latest chat, and sequence information of the plurality of chat records. The mobile phone may update the content in the display area 3081 in the window 308 in response to receiving the foregoing information. As shown in FIG. 3(*d*)1 to FIG. 3(*d*)3, the chat record between the user and the contact Mom, the chat record of the group chat, the chat record between the user and the contact Sam, and the chat record between the user and the contact Lucy are respectively displayed in the display area 3081 from top to bottom, and the content 3051 of the latest chat in the chat record 305 in the display area 3081 is updated to "Mom, I'll recommend a good movie to you", and the latest chat time 3051 is updated to "08:00 a.m".

As shown in FIG. 3(*e*)1 to FIG. 3(*e*)3, when the mobile phone receives a message sent by the user Sam (for example, message content is "There is a meeting at 9:00 a.m."), content 3061 of a latest chat in the chat record 306 between the user and the contact Sam on the home page of the social application is updated from "Happy Birthday!" to "There is a meeting at 9:00 a.m.", and time information 3062 of the latest chat is updated from "Saturday" to "08:01 a.m.", and a sequence of the plurality of chat records changes with latest chat time (the chat record between the user and the contact Sam, the chat record between the user and the contact Mom, the chat record of the group chat, and the chat record between the user and the contact Lucy are displayed from top to bottom on the home page of the social application).

It should be understood that, on the home page of the social application displayed by the mobile phone, changes of the interface element 3061 and the interface element 3062 are invisible to the user. In this case, the mobile phone still displays the chat interface between the user and the contact Mom.

In response to a change of an interface element on the home page of the social application, the mobile phone may send information about a plurality of updated interface elements to the notebook computer, for example, the content 3061 of the latest chat in the chat record 306, the time information 3062 of the latest chat, and sequence information of the plurality of chat records. The mobile phone may update the content in the display area 3081 in the window 308 in response to receiving the foregoing information. As shown in FIG. 3(*e*)1 to FIG. 3(*e*)3, the chat record between the user and the contact Sam, the chat record between the user and the contact Mom, the chat record of the group chat, and the chat record of the contact Lucy are respectively displayed in the display area 3081 from top to bottom, and the content 3061 of the latest chat in the chat record 306 in the display area 3081 is updated to "There is a meeting at 9:00 a.m.", and the latest chat time 3062 is updated to "08:01 a.m.".

In response to detecting an operation of tapping the chat record 306 by the user, the notebook computer may send a touch event and tag information of the chat record 306 to the mobile phone. The mobile phone and the notebook computer may display GUIs shown in FIG. 3(*f*)1 and FIG. 3(*f*)2 in response to receiving the touch event and the tag information.

As shown in FIG. 3(*f*)1 and FIG. 3(*f*)2, in response to receiving the touch event and the tag information, the mobile phone may determine that the user taps the chat record with the contact Sam on the notebook computer, so that the mobile phone may display a chat interface between the user and the contact Sam, where the chat interface includes a plurality of interface elements, for example, a name 323 of the contact Sam, time information 324 of a previous chat record between the user and the contact Sam, a profile picture 325 of the contact Sam, content 326 of the previous chat record between the user and the contact Sam, time information 327 of a latest chat record between the user and the contact Sam, the profile picture 328 of the contact Sam, and content 329 of the latest chat record between the user and the contact Sam. In addition, the mobile phone may further send information about the plurality of interface elements on the chat interface to the notebook computer. The notebook computer may display the plurality of interface elements in the display area 3082 in the window 308 in response to receiving the information that is about the plurality of interface elements and that is sent by the mobile phone. As shown in FIG. 3(f)1 and FIG. 3(f)2, the notebook computer may display, in the display area 3082, the name 323 of the contact Sam, the time information 324 of the previous chat record between the user and the contact Sam, the profile picture 325 of the contact Sam, the content 326 of the previous chat record between the user and the contact Sam, the time information 327 of the latest chat record between the user and the contact Sam, the profile picture 328 of the contact Sam, and the content 329 of the latest chat record between the user and the contact Sam.

When the notebook computer detects that the user enters text content "Got it" in the text input box 316, the notebook computer may send the text content to the mobile phone. The mobile phone may display the text content in the text input box 319 in response to receiving the text content. When the notebook computer detects an operation of tapping the "Send" control 318 by the user, the notebook computer may send a touch event and the tag information of the "Send" control 318 to the mobile phone. In response to receiving the touch control event and the tag information of the "Send" control 318, the mobile phone may determine that the user taps the "Send" control on the notebook computer, so that the mobile phone may reply the text content to the user Sam.

As shown in FIG. 3(g)1 and FIG. 3(g)2, when the mobile phone completes replying to the text content, the mobile phone may display another chat interface between the user and the contact Sam. Compared with the chat interface shown in FIG. 3(f)1 and FIG. 3(f)2, profile picture information 330 of the user and content 331 that is just replied by the user are newly added to the chat interface. In response to an update of the chat interface, the mobile phone may send the information about the newly added interface elements (the profile picture information 330 of the user and information about the content 331 that is just replied by the user) to the notebook computer.

In response to receiving the information about the newly added interface elements, the notebook computer may update the content displayed in the display area 3082. Compared with the content displayed in the display area 3082 in FIG. 3(f)1 and FIG. 3(f)2, the profile picture information 330 of the user and the content 331 that is just replied by the user are newly added in the display area 3082 in FIG. 3(g)1 and FIG. 3(g)2.

In this embodiment of this application, the mobile phone may send the plurality of interface elements on the display interface of the social application to the notebook computer, so as to display the window 308 on the notebook computer. The window 308 adapts to a wide screen of the notebook computer. For example, compared with the text input box 319 on the mobile phone, the text input box 316 in the window 308 has a larger area, and is more convenient for the user to perform text input, so that an input of the user is no longer limited by the narrow text input box of the mobile phone. In addition, when replying to a message on the notebook computer, the user may invoke an input method and the text input box of the notebook computer, and the user may perform text input by using the keyboard, so that the user can quickly complete replying to the message. Only single-screen content (for example, the home page of the social application or a chat interface between the user and a contact) can be displayed on the display interface of the mobile phone, and dual-screen content (for example, the home page of the social application and a chat interface between the user and a contact) cannot be displayed on the display interface of the mobile phone. However, the notebook computer side can simultaneously display the home page of the social application and a chat interface between the user and a contact on the screen, so that the user is prevented from switching between the home page of the social application and the chat interface. This helps improve use experience of the user.

FIG. 4(a)1 to FIG. 4(c)2 show another group of GUIs according to an embodiment of this application.

As shown in FIG. 4(a)1 and FIG. 4(a)2, a mobile phone displays a home screen of the mobile phone, the home screen of the mobile phone includes icons of a plurality of applications, and the plurality of applications include a shopping application. A notebook computer is located near the mobile phone, and the notebook computer may display a desktop of the notebook computer. When the mobile phone detects an operation of tapping an icon of the shopping application by a user, the mobile phone and the notebook computer may display GUIs shown in FIG. 4(b)1 and FIG. 4(b)2.

As shown in FIG. 4(b)1 and FIG. 4(b)2, in response to detecting, by the mobile phone, the operation of tapping the icon of the shopping application by the user, the mobile phone may display a home page of the shopping application (or a level-1 page of the shopping application). The display interface includes a plurality of interface elements, for example, a name 401 of the shopping application, an interface element 402 (including a photo 4021 of a commodity 1, a name 4022 of the commodity 1, and price information 4023 of the commodity 1), an interface element 403 (including a photo 4031 of a commodity 2, a name 4032 of the commodity 2, and price information 4033 of the commodity 2), an interface element 404 (including a photo 4041 of a commodity 3, a name 4042 of the commodity 3, and price information 4043 of the commodity 3), and an interface element 405 (including a photo 4051 of a commodity 4, a name 4052 of the commodity 4, and price information 4053 of the commodity 4).

When the mobile phone determines that a distance between the mobile phone and the notebook computer is less than or equal to a preset distance, the mobile phone may send information about the plurality of interface elements (for example, information about the name 401 of the shopping application, the interface element 402, the interface element 403, the interface element 404, and the interface element 405) on the display interface of the shopping application to the notebook computer. In response to receiving the foregoing information, the notebook computer may display a window 406, and display information about the plurality of commodities in a display area 4061 of the window 406. The display window 406 includes a display area 4062, and a details page of a commodity may be displayed in the display area 4062.

When the notebook computer detects an operation that the user clicks to view a details page of the commodity 2, the notebook computer may send a touch event and the tag information of the interface element 403 to the mobile phone. The mobile phone may display a GUI shown in FIG. 4(c)1 and FIG. 4(c)2 in response to receiving the foregoing information sent by the notebook computer.

As shown in FIG. 4(c)1 and FIG. 4(c)2, in response to receiving the touch event and the tag information of the interface element 403 that are sent by the notebook computer, the mobile phone may determine that the notebook computer detects that the user taps the interface element 403. Therefore, the mobile phone may display the details page of the commodity 2 corresponding to the interface element 403. The details page of the commodity 2 includes name information 407 of the commodity 2, a commodity introduction window 408, a play control 409, price information 410 of the commodity 2, an introduction control 411 of the commodity 2, a sharing control 412, express information 413, monthly sales information 414, shipping address information 415, a detailed introduction control 416 of the commodity 2, store information 417, a "Favorites" control 418, an "Add to shopping cart" control 419, and a "Buy now" control 420. In addition, the mobile phone may send information about a plurality of interface elements (for example, information about the commodity introduction window 408, the play control 409, the price information 410 of the commodity 2, the detailed introduction control 416 of the commodity 2, the "Add to shopping cart" control 419, and the "Buy now" control 420) to the notebook computer. The notebook computer may display the commodity introduction window 408, the play control 409, the price information 410 of the commodity 2, the detailed introduction control 416 of the commodity 2, the "Add to shopping cart" control 419, and the "Buy now" control 420 in the display area 4062 in response to receiving the foregoing information sent by the mobile phone.

In this embodiment of this application, when the user performs shopping on the mobile phone, the mobile phone can display only single-screen content (for example, the home page of the shopping application or a details page of a commodity), and cannot display dual-screen content (for example, the home page of the shopping application and a details page of a commodity). The mobile phone may send information about an interface element on the home page of the shopping application and a details page of a commodity to the notebook computer, so that the notebook computer side can simultaneously display the home page of the shopping application and a details page of a commodity by using a display. In this way, the user is prevented from switching between the home page of the shopping application and the details page of the commodity. This helps improve use experience of the user.

FIG. 5(a)1 to FIG. 5(c)2 show another group of GUIs according to an embodiment of this application.

As shown in FIG. 5(a)1 and FIG. 5(a)2, a mobile phone displays a home screen of the mobile phone, the home screen of the mobile phone includes icons of a plurality of applications, and the plurality of applications include a video application. A smart television displays a channel selection interface (the channel selection interface includes a channel 1 to a channel 6). When the mobile phone detects an operation of tapping an icon of the video application by a user, the mobile phone and the notebook computer may display GUIs shown in FIG. 5(b)1 and FIG. 5(b)2.

As shown in FIG. 5(b)1 and FIG. 5(b)2, in response to detecting the operation of tapping the icon of the video application by the user, the mobile phone may display a playing interface of the video application, the playing interface of the video application includes a video playing window 501, a play/pause control 5011, a video playing progress bar 5012, current playing time information 5013, total video time information 5014, a playing speed control 5015, video title information 502, episode information 503, a video introduction control 504, selection controls 505 to 513 of videos from a first episode to a ninth episode, a more video episode control 514, and a comment area 515.

When devices that are networked with the mobile phone include a large screen device (for example, the smart television), the mobile phone may send information about a plurality of interface elements to the smart television, for example, information about the video playing window 501, the play/pause control 5011, the video playing progress bar 5012, the current playing time information 5013, the total video time information 5014, the playing speed control 5015, the selection controls 505 to 513 of videos from the first episode to the ninth episode, the more video episode control 514, and the comment area 515. The smart television may display a GUI shown in FIG. 5(b)1 and FIG. 5(b)2 in response to receiving the foregoing information.

As shown in FIG. 5(c)1 and FIG. 5(c)2, the user may control the smart television by using a remote control. When the smart television detects that the user presses and holds a left key on the remote control, the smart television may determine that the user expects to fast forward video content. The smart television may send indication information to the mobile phone, where the indication information indicates the mobile phone to fast forward the content in the video playing window 501. The mobile phone may fast forward the video content played in the window 501 in response to receiving the indication information, and the mobile phone may send information about an updated window 501, the video playing progress bar 5012, and the current playing time information 5013 on the video playing interface to the smart television.

The smart television may update the video content, the video playing progress bar, and the current playing time information in the window 501 in response to receiving the foregoing information. As shown in FIG. 5(c)1 and FIG. 5(c)2, the video content displayed on the smart television is fast forwarded from a 30th second to a 50th second.

In an embodiment, the video playing progress bar and the play/pause control on the mobile phone may be displayed after the mobile phone detects a tap operation performed by the user in the window 501, to prevent the mobile phone from blocking the video content. However, on the smart television side, these interface elements may be permanently displayed, and the smart television supports the user to control operations such as fast-forward, fast-backward, or episode selection by using a peripheral device (for example, the remote control of the smart television).

In this embodiment of this application, when the user watches a video on the mobile phone, the mobile phone may send information about an interface element on the video playing interface to the smart television, so that the smart television can display content such as the video playing window, the episode selection control, and the comment area. This avoids a case in which the user needs to switch to an episode selection interface to select content of a next episode of after watching an episode, thereby helping improve user experience.

The foregoing describes several groups of GUIs in embodiments of this application with reference to FIG. 3(a)1 to FIG. 5(c)2. The following describes an implementation process of the technical solutions in embodiments of this application with reference to the accompanying drawings.

FIG. 6 is a schematic block diagram of a system architecture according to an embodiment of this application. The system architecture includes a source end device (a source end device) and a client device (a sink end device). The source end device includes an application layer and a service layer. The application layer includes a tagged view (tagged view) module 601, a content fetcher (content fetcher) module 602, and an action dispatcher (action dispatcher) module 603. The service layer includes a data transfer (data transfer) module 604 and a remote action receiver (remote action receiver) module 605.

It should be understood that functions implemented by the tagged view module 601, the content fetcher module 602, and the action dispatcher module 603 may be implemented by the view system at the application framework layer in FIG. 2.

The sink end device includes a content parser (view content parser) module 606 and an action translator (action translator) module 607. The following describes each module in the source end device and the sink end device in detail.

The tagged view module 601 is configured to tag a scenario and an interface element. The chat interface displayed by the mobile phone in FIG. 3(*b*)1 and FIG. 3(*b*)2 is used as an example. The mobile phone may tag the entire interface as a chat (chat) scenario. In the chat scenario, the mobile phone may further divide the interface into a level-1 page and a level-2 page. For example, in the GUI shown by the mobile phone in FIG. 3(*b*)1 and FIG. 3(*b*)2, the display interface of the home page of the social application may be a level-1 page, the display interface of the home page of the social application includes the interface element 305, and the interface element 305 is associated with the chat interface between the user and the contact Mom. The chat interface between the user and the contact Mom may be referred to as a level-2 page.

The tagged view module 601 may also tag a plurality of interface elements on the level-1 page and the level-2 page separately. The source end device may add corresponding tags to the plurality of interface elements, where the tag includes information such as an attribute and a name of the interface element. For example, Table 1 and Table 2 respectively show schematic diagrams of correspondences between interface elements and corresponding tags of the interface elements on the level-1 page and the level-2 page.

TABLE 1

| Interface element | Tag | | | |
|---|---|---|---|---|
| | Group | Attribute | Name | ID |
| Interface element 301 | List 1 | Image view (Image view) | Contact profile picture | 1 |
| Interface element 302 | | Text view (Text view) | Contact name | 2 |
| Interface element 303 | | Text view | Content of a latest chat | 3 |
| Interface element 304 | | Text view | Time information of the latest chat | 4 |
| ... | ... | ... | ... | ... |

It should be understood that the interface element 301 to the interface element 304 shown in Table 1 are all interface elements in the interface element 300. When tagging the interface element, the source end device may tag the interface element 300 and tag the plurality of interface elements in the interface element 300. In addition, the source end device may further associate the interface element 300 with the interface elements 301 to 304.

TABLE 2

| Interface element | Tag | | |
|---|---|---|---|
| | Attribute | Name | ID |
| Interface element 311 | Image view | Return control | 5 |
| Interface element 312 | Text view | Contact name | 6 |
| Interface element 313 | Text view | Time information of a previous chat | 7 |
| Interface element 314 | Image view | Contact profile picture information | 8 |
| Interface element 315 | Text view | Content of the previous chat | 9 |
| ... | ... | ... | ... |

In an embodiment, for the GUI shown by the mobile phone in FIG. 3(*c*)1 and FIG. 3(*c*)2, the mobile phone may further add corresponding tags to the keyboard, the voice control, the text input box, and the "Send" control on the interface.

The shopping interface displayed by the mobile phone in FIG. 4(*b*)1 and FIG. 4(*b*)2 is used as an example. The mobile phone may tag the entire interface as a shopping scenario. In the shopping scenario, the mobile phone may further divide the interface into a level-1 page and a level-2 page. For example, in the GUI shown by the mobile phone in FIG. 4(*b*)1 and FIG. 4(*b*)2, the display interface of the home page of the shopping application may be a level-1 page, the display interface of the home page of the shopping application includes the interface element 403, and the interface element 403 is associated with a display interface of the details page of the commodity 2. The display interface of the details page of the commodity 2 is referred to as a level-2 page.

For example, Table 3 and Table 4 respectively show schematic diagrams of correspondences between interface elements and corresponding tags of the interface elements on the level-1 page and the level-2 page.

TABLE 3

| Interface element | Tag | | | |
|---|---|---|---|---|
| | Group | Attribute | Name | ID |
| Interface element 401 | None | Text view | Name of the shopping application | 10 |
| Interface element 4021 | List 1 | Image view | Image information of the commodity 1 | 11 |
| Interface element 4022 | | Text view | Name of the commodity 1 | 12 |
| Interface element 4023 | | Text view | Price information of the commodity 1 | 13 |
| Interface element 4031 | List 2 | Image view | Image information of the commodity 2 | 14 |
| Interface element 4032 | | Text view | Name of the commodity 2 | 15 |
| Interface element 4033 | | Text view | Price information of the commodity 2 | 16 |
| Interface element 4041 | List 3 | Image view | Image information of the commodity 3 | 17 |
| Interface element 4042 | | Text view | Name of the commodity 3 | 18 |
| Interface element 4043 | | Text view | Price information of the commodity 3 | 19 |
| Interface element 4051 | List 4 | Image view | Image information of the commodity 4 | 20 |
| Interface element 4052 | | Text view | Name of the commodity 4 | 21 |
| Interface element 4053 | | Text view | Price information of the commodity 4 | 22 |
| ... | ... | ... | ... | ... |

It should be understood that the interface element 4021 to the interface element 4023 shown in Table 3 are all interface elements in the interface element 402. When tagging the interface element, the source end device may tag the interface element 402 and tag the plurality of interface elements in the interface element 402. In addition, the source end device may further associate the interface element 402 with the interface element 4021 to the interface element 4023.

TABLE 4

| Interface element | Tag Attribute | Tag Name | Tag ID |
| --- | --- | --- | --- |
| Interface element 407 | Text view | Name of the commodity 2 | 23 |
| Interface element 408 | Image view | Image information of the commodity 2 | 24 |
| Interface element 409 | Image view | Tap to play control | 25 |
| Interface element 410 | Text view | Price information of the commodity 2 | 26 |
| Interface element 411 | Image view | Introduction control of the commodity 2 | 27 |
| Interface element 412 | Image view | Sharing control | 28 |
| Interface element 413 | Text view | Express information | 29 |
| Interface element 414 | Text view | Monthly sales information | 30 |
| Interface element 415 | Text view | Shipping address information | 31 |
| Interface element 416 | Image view | Detailed introduction control of the commodity 2 | 32 |
| Interface element 417 | Image view | Store information | 33 |
| Interface element 418 | Image view | "Favorites" control | 34 |
| Interface element 419 | Image view | "Add to shopping cart" control | 35 |
| Interface element 420 | Image view | "Buy now" control | 36 |
| ... | ... | ... | ... |

The video playing interface displayed by the mobile phone in FIG. 5(b)1 and FIG. 5(b)2 is used as an example. The mobile phone may tag the entire interface as a video playing scenario. For example, Table 5 is a schematic diagram of a correspondence between interface elements and tags corresponding to the interface elements.

TABLE 5

| Interface element | Tag Attribute | Tag Name | Tag ID |
| --- | --- | --- | --- |
| Interface element 501 | Image view | Video playing window | 37 |
| Interface element 5011 | None | Play/Pause control | 38 |
| Interface element 5012 | None | Video playing progress bar | 39 |
| Interface element 5013 | Text view | Current playing time information | 40 |
| Interface element 5014 | Text view | Total video time information | 41 |
| Interface element 5015 | Text view | Play speed control | 42 |
| Interface element 502 | Text view | Title information of a video | 43 |
| Interface element 503 | Text view | Episode selection information | 44 |
| Interface element 504 | Text view | Video introduction control | 45 |
| Interface elements 505 to 513 | Text view | Selection controls of videos from a first episode to a ninth episode | 46 to 54 |
| Interface element 514 | Text view | More video episode selection control | 55 |
| Interface element 515 | Image view | Comment area | 56 |
| ... | ... | ... | ... |

It should be understood that the foregoing Table 1 to Table 5 are merely examples, and the interface element and the tag information corresponding to the interface element may alternatively correspond to each other in another manner. This embodiment of this application is not limited thereto.

The content fetcher module 602 is configured to: fetch an interface element, and send the extracted interface element to the data transfer module 604 of the service layer. The chat scenario shown in FIG. 3(b)1 and FIG. 3(b)2 is used as an example. The content fetcher module 602 of the source end device may fetch the chat record 300 of the group chat (named "Family"), the chat record 305 with the contact Mom, the chat record 306 with the contact Sam, and the chat record 307 with the contact Lucy.

Manners of fetching the interface element by the content fetcher module 602 include but are not limited to the following manners.

Manner 1

Figure 7:
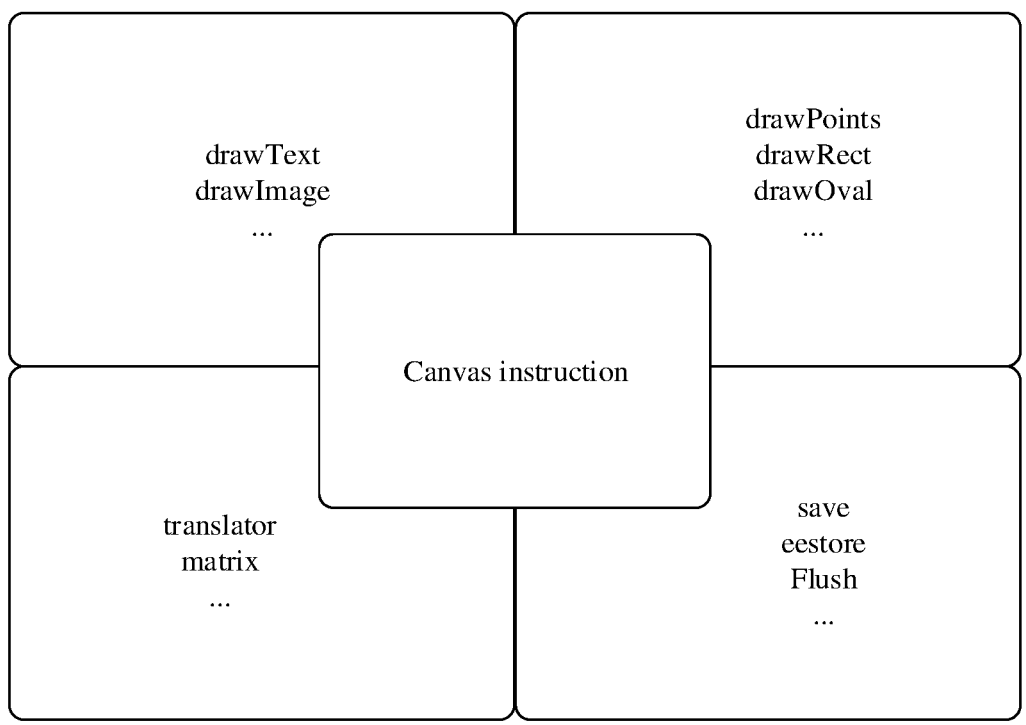
FIG. 7 is a schematic diagram of a drawing instruction according to an embodiment of this application.

An interface element is fetched from an instruction of a drawing layer. The instruction of the drawing layer includes all information about restoration of each interface element. FIG. 7 is a schematic diagram of drawing instructions. There are more than 40 drawing instructions, where two types of instructions, drawText and drawImage, have specific content. The source end device may fetch content of interface elements from the two types of instructions.

Manner 2

An interface element is fetched from a view (view) layer (or control layer). A control TextView in Android is used as an example. A developer can invoke an interface setText of TextView to set a to-be-displayed text. In this embodiment of this application, the source end device may record the set text, to complete fetching of an interface element whose attribute is TextView. Similarly, the developer may also invoke an interface setImage of ImageView to set to-be-displayed image information. The source end device may record the set image information, to complete fetching of an interface element whose attribute is ImageView.

It should be understood that, as shown in FIG. 6, the application layer may include a drawing layer and the view layer (or control layer), and the drawing layer and the view layer may implement interface display on the source end. The view layer may provide, for the developer, an interface element for establishing an interface, for example, TextView or ImageView. The developer may set a text style, a text size, a text thickness, and the like through an interface (for example, setText) provided by TextView. The content fetcher module 602 may directly complete fetching of an interface element at the view layer. Alternatively, an interface element provided by the view layer may be converted into an instruction, for example, drawText and drawImage, at the drawing layer, and the content fetcher module 602 may also fetch the interface element at the drawing layer by using the instruction, for example, drawText and drawImage.

Manner 3

A developer of an application may customize content. For example, the developer may set content in a format <key, value> for a plurality of interface elements included on an interface, so that the source end device may fetch an interface element having content in the format.

The data transfer module 604 may send a scenario name (for example, a music scenario or a chat music) on a display interface of the source end and information about a tagged interface element (including tag information of the interface element and the interface element extracted by the content fetcher module 602) to the content parser module 606 of the sink end device.

In an embodiment, the source end device may send a BLE data packet to the sink end device, where the BLE data packet may carry the interface element and the tag information of the interface element. The BLE data packet includes a protocol data unit (protocol data unit, PDU). The interface element and the tag information of the interface element may be carried in a service data (service data) field in the PDU, or may be carried in a manufacturer specific data (manufacturer specific data) field in the PDU. For example, a payload (payload) of the service data field may include a plurality of bits, where the plurality of bits include an extensible bit. The source end device and the sink end device may agree on content of an extensible bit.

For example, for a graphic interface element (ImageView), the source end device may perform image encoding on the graphic interface element by using an image encoding technology, and use a first bit (where the first bit may include one or more bits) to carry data obtained through image encoding. In addition, the source end device may encode tag information of the graphic interface element. For example, the graphic interface element is the interface element 301 in Table 1, and the tag information of the interface element 301 may be the name "Contact profile picture". The source end device may encode the tag information in an encoding manner, for example, GBK, ISO8859-1, or Unicode (for example, UTF-8 or UTF-16), and use a second bit (where the second bit may include one or more bits) to carry data obtained through encoding. The source end device may associate the first bit with the second bit. After receiving the BLE data packet, the sink end device may decode the data in the first bit by using an image decoding technology, to obtain the interface element 301. In addition, the sink end device may further decode information in the second bit, to obtain the tag information "Contact profile picture" of the interface element 301.

For another example, for a text interface element (TextView), the source end device may encode the text interface element by using an encoding manner, for example, GBK, ISO8859-1, or Unicode (for example, UTF-8 or UTF-16), and use a third bit (where the third bit may include one or more bits) to carry data obtained through image encoding. In addition, the source end device may encode tag information of the text interface element. For example, the text interface element is the interface element 303 in Table 1, and the tag information of the interface element 303 may be the name "Content of a latest chat". The source end device may encode the tag information in an encoding manner, for example, GBK, ISO8859-1, or Unicode (for example, UTF-8 or UTF-16), and use a fourth bit (where the fourth bit may include one or more bits) to carry data obtained through encoding. The source end device may associate the third bit with the fourth bit. After receiving the BLE data packet, the sink end device may decode the data in the third bit by using a corresponding decoding technology, to obtain the interface element 303. In addition, the sink end device may further decode information in the fourth bit, to obtain the tag information "Content of a latest chat" of the interface element 303.

It should be understood that, for interface elements that do not belong to a graphic interface element or a text interface element, such as the video playing progress bar and an on/off control, the source end device may convert these interface elements and the on/off control into character strings, so that the source end device may also encode these interface elements and tag information of the interface elements in an encoding manner, for example, GBK, ISO8859-1, or Unicode (for example, UTF-8 or UTF-16).

In an embodiment, in addition to sending the interface element and the tag information of the interface element to the sink end device, the source end device may further send scenario information corresponding to the interface element to the sink end device. For example, for the GUIs shown in FIG. 3(*a*)1 to FIG. 3(*g*)2, the BLE data packet sent by the mobile phone to the notebook computer may further carry scenario information "Chat". For an implementation process in which the source end adds the scenario information to the BLE data packet, refer to a process in which the source end device adds the tag information to the BLE data packet. Details are not described herein again.

In an embodiment, the tag information may be a name or an ID. For example, for the interface element 301, the source end device and the sink end device may agree that a name corresponding to an interface element whose ID is 1 is "Contact profile picture", and may agree that a name corresponding to an interface element whose ID is 2 is "Contact name".

In an embodiment, the source end device may send a user datagram protocol (user datagram protocol, UDP) data packet to the sink end device, where the UDP data packet may carry the interface element and the tag information of the interface element. The UPD packet includes a data part of an IP datagram. The data part of the IP datagram may include an extensible bit. The source end device and the sink end device may agree on an extensible bit. Therefore, the source end device may use the extensible bit to carry the interface element and the tag information of the interface element.

In an embodiment, the source end device may send a transmission control protocol (transmission control protocol, TCP) data packet to the sink end device, where the TCP data packet may carry the interface element and the tag information of the interface element. The TCP data packet includes a TCP header and a TCP data part, and the notification information may be carried in the TCP data part. For example, the TCP data part may include a plurality of bits, where the plurality of bits include an extensible bit. Therefore, the source end device may use the extensible bit to carry the interface element and the tag information of the interface element. Specifically, for an information transfer process of an interface element, for example, a graphic interface element, a text interface element, a progress bar, and an on/off control, refer to the descriptions in the foregoing embodiments. Details are not described herein again.

The content parser (view content parser) module 606 of the sink end device is configured to parse a received data packet after receiving the data packet sent by the data transfer module 604 of the source end device, to obtain one or more interface elements and tag information of the one or more interface elements. In an embodiment, the sink end device may further obtain current scenario information.

Figure 8:
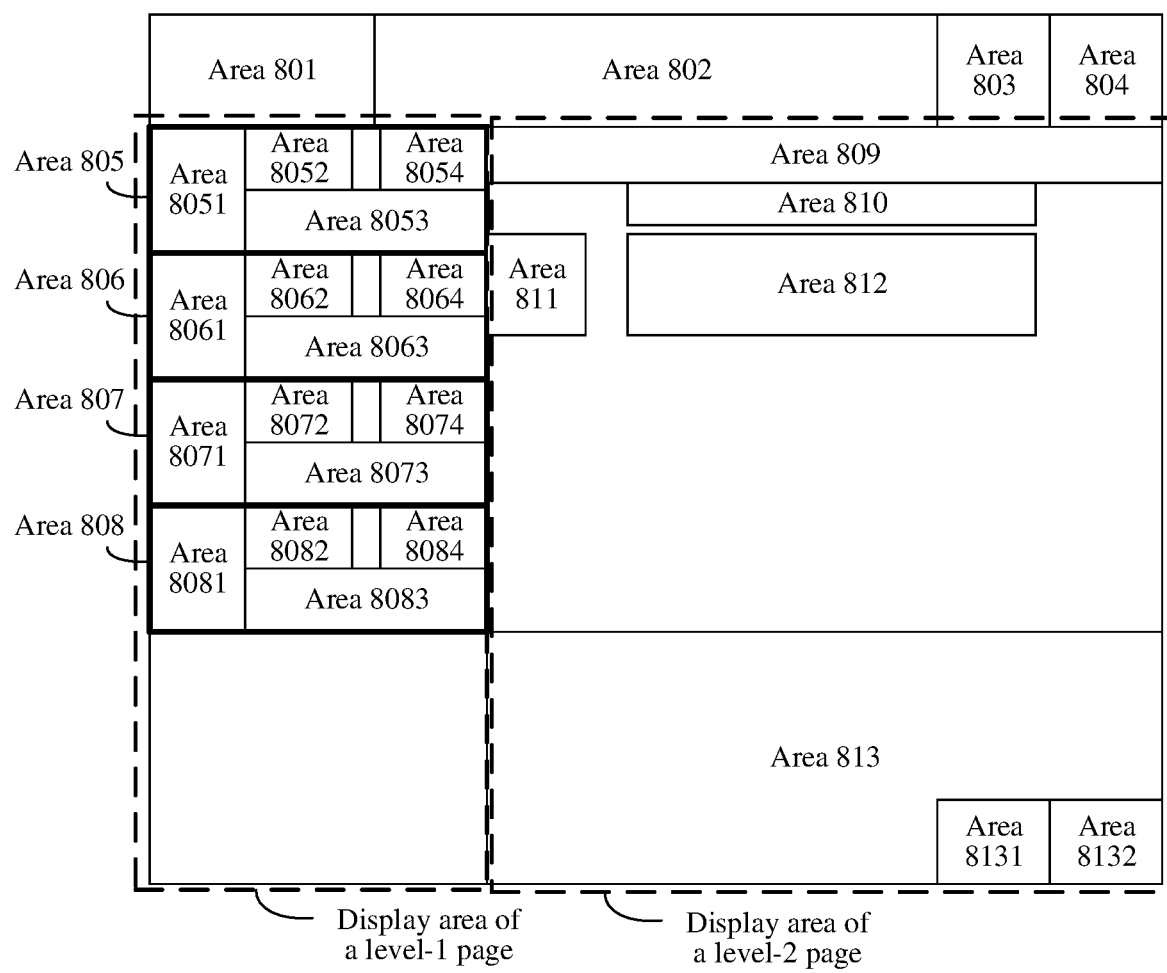
FIG. 8 is a schematic diagram of distribution of areas of interface elements in a chat scenario according to an embodiment of this application.
Figure 9:
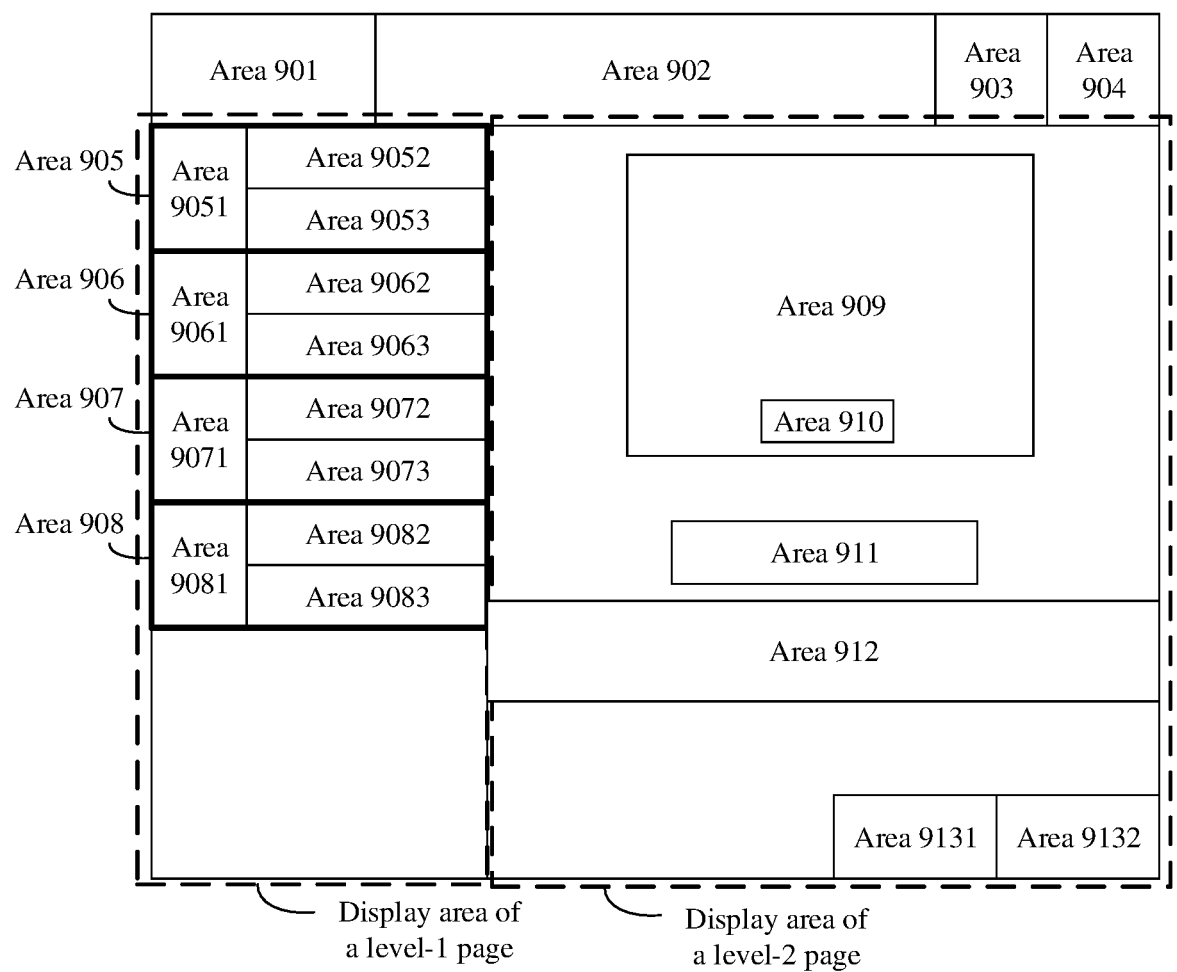
FIG. 9 is a schematic diagram of distribution of areas of interface elements in a shopping scenario according to an embodiment of this application.

The sink end device stores correspondences between a display area of an interface element and tag information of the interface element in different scenarios. FIG. 8 and FIG. 9 respectively output schematic diagrams of distribution of areas of interface elements in a chat scenario and a shopping scenario.

For example, FIG. 8 is a schematic diagram of distribution of areas of interface elements in the chat scenario stored by the sink end device. A name of a social application may be displayed in an area 801, information about the source end device may be displayed in an area 802, a minimization control may be displayed in an area 803, a window close control may be displayed in an area 804, and a first group of chat records may be displayed in an area 805. The area 805 may further include a plurality of sub-areas. For example, a profile picture of a contact may be displayed in an area 8051, a name of the contact may be displayed in an area 8052, content of a latest chat between a user and the contact may be displayed in an area 8053, and implementation information of the latest chat between the user and the contact may be displayed in an area 8054. By analogy, a second group of chat records, a third group of chat records, and a fourth group of chat records may be displayed in areas 806 to 808.

In an embodiment, in FIG. 8, the sink end device may display four chat records in a display area of a level-1 interface, and a home page (or a level-1 page) of the social application displayed by the source end device may include more (for example, six) chat records. When sending an interface element on the level-1 page to the sink end device, the source end device may select information about first four chat records.

In an embodiment, when detecting that the user starts the social application and does not open a chat interface with a contact, in addition to sending a plurality of interface elements on the level-1 page and tag information of the plurality of interface elements on the level-1 page to the sink end device, the source end device may send a plurality of interface elements on a level-2 page and tag information of the plurality of interface elements on the level-2 page to the sink end device. The level-2 page may be a display interface associated with an interface element on the level-1 page (or an interface element in the plurality of interface elements on the level-1 page sent by the source end device to the sink end device). For example, as shown in FIG. 3(b)1 and FIG. 3(b)2, in addition to sending the plurality of interface elements on the home page of the social application and the tag information of the plurality of interface elements to the notebook computer, the mobile phone may further send, to the notebook computer, interface elements on a chat interface of a group (a group name is "Family") that is recently contacted with the user. After receiving the foregoing information, the notebook computer may display a plurality of chat records on the home page of the social application in the display area 3081 of the window 308, and may further display the chat interface of the group in the display area 3082. In this way, the notebook computer does not need to request the plurality of interface elements on the group chat interface from the mobile phone when detecting that the user taps a chat record of the group. When the mobile phone starts the social application, the mobile phone may directly send a plurality of interface elements on a level-1 page and a level-2 page and tag information of the plurality of interface elements on the level-1 page and the level-2 page to the notebook computer. This helps improve user experience.

The content parser module may place an interface element into the display area of the level-1 page based on each interface element in the level-1 page and tag information corresponding to each interface element that are obtained through parsing. For example, after the notebook computer obtains the interface elements 301 to 304 through parsing, the notebook computer may place the interface element 301 (which is named the contact profile picture in the tag information) into the area 8051, the notebook computer may place the interface element 302 (which is named the contact name in the tag information) into the area 8052, the notebook computer may place the interface element 303 (which is named the content of a latest chat in the tag information) into the area 8053, and the notebook computer may place the interface element 304 (which is named the time information of the latest chat in the tag information) into the area 8054. Similarly, the notebook computer may display, in the area 806 to 808, a plurality of interface elements in the chat record 305 to 307 based on tag information of the plurality of interface elements in the interface elements 305 to 307 and a correspondence between the display areas and the tag information.

The content parser module may place an interface element into the display area of the level-2 page based on each interface element in the level-2 page and tag information corresponding to each interface element that are obtained through parsing. For example, the notebook computer receives a plurality of interface elements in the level-2 page and tag information of the plurality of interface elements. After obtaining the interface elements 312 to 315 and the tag information of the interface elements 312 to 315 through parsing, the notebook computer may place the interface element 312 (which is named the contact name in the tag information) in an area 809, the notebook computer places the interface element 313 (which is named the time information of a previous chat in the tag information) in an area 810, the notebook computer places the interface element 314 (which is named the contact profile picture information in the tag information) in an area 811, and the notebook computer places the interface element 315 (which is named the content of the previous chat in the tag information) in an area 812. In addition, the notebook computer may further draw a text input box in a display area 813, draw a voice control in an area 8131, and draw a "Send" control in an area 8132.

In an embodiment, the sink end device may distinguish the interface element belonging to the level-1 interface from the interface element belonging to the level-2 interface based on the tag information of the interface elements.

In an embodiment, for interface elements with same tag information, such as the contact profile picture, the contact name, the content of the latest chat, and the time information of the latest chat, the interface elements appear on both the level-1 interface and the level-2 interface, and the sink end device may determine whether the interface elements are interface elements on the level-1 interface or interface elements on the level-2 interface based on whether the interface elements are included in one interface element. For example, if the interface elements 301 to 304 are included in the interface element 300, the sink end device may determine that the interface elements 301 to 304 are interface elements belonging to the level-1 interface. If the interface elements 312 to 315 are not included in any interface element, the sink end device may determine that the interface elements 312 to 315 are interface elements belonging to the level-2 interface.

For example, FIG. 9 is a schematic diagram of distribution of areas of interface elements in the shopping scenario stored by the sink end device. A name of a shopping application may be displayed in an area 901, information about the source end device may be displayed in an area 902, a minimization control may be displayed in an area 903, a window close control may be displayed in an area 904, and information about a first commodity on a level-1 page may be displayed in an area 905. The area 905 may further include a plurality of sub-areas. For example, image information of a commodity 1 may be displayed in an area 9051, a name of the commodity 1 may be displayed in an area 9052, and price information of the commodity 1 may be displayed in an area 9053. Similarly, information about a second commodity to a fourth commodity on the level-1 page is displayed in areas 906 to 908.

The content parser module may place an interface element into a display area of the level-1 page based on each interface element in the level-1 page and tag information corresponding to each interface element that are obtained through parsing. For example, after obtaining the interface elements 4021 to 4023 through parsing, the notebook computer may place the interface element 4021 (which is named the image information of the commodity 1 in the tag information) into the area 9051, the notebook computer may place the interface element 4022 (which is named the name of the commodity 1 in the tag information) into the area 9052, and the notebook computer may place the interface element 4023 (which is named the price information of the commodity 1 in the tag information) into the area 9053. Similarly, the notebook computer may display the interface elements 4031 to 4053 in the areas 906 to 908 based on tag information of a plurality of interface elements in the interface elements 4031 to 4053 and a correspondence between the display areas and the tag information.

The content parser module may place an interface element into the display area of the level-2 page based on each interface element in the level-2 page and tag information corresponding to each interface element that are obtained through parsing. For example, the notebook computer receives a plurality of interface elements in the level-2 page and tag information of the plurality of interface elements. After obtaining the interface elements 408 to 410, 416, and 419 to 420 and the tag information of the interface elements 408 to 410, 416, and 419 to 420 through parsing, the notebook computer may place the interface element 408 (which is named the image information of the commodity 2 in the tag information) into an area 909, the notebook computer places the interface element 409 (which is named the click play control in the tag information) into an area 910, the notebook computer places the interface element 410 (which is named the price information of the commodity 2 in the tag information) into an area 911, the notebook computer places the interface element 416 (which is named the detailed introduction control of the commodity 2 in the tag information) into an area 912, the notebook computer places the interface element 419 (which is named the "Add to shopping cart" control in the tag information) into an area 9131, and the notebook computer places the interface element 420 (which is named the "Buy now" control in the tag information) into an area 9132.

It should be understood that the correspondences between the display areas of the interface elements and the tag information of the interface elements in FIG. 8 and FIG. 9 are merely examples. This is not limited in this embodiment of this application.

The action translator module 607 is configured to: when the sink end device detects a touch event (for example, a click event for a control), send the corresponding event and tag information of an interface element corresponding to the event to the remote action receiver module 605 of the source end device.

In an embodiment, after the action translator module 607 of the sink end detects a click event of the user on a first interface element, the sink end device may send a BLE data packet to the source end device. The BLE data packet includes type information of the event and tag information of the first interface element. The BLE data packet includes a protocol data unit, and the interface element and the tag information of the interface element may be carried in a service data field in the PDU, or may be carried in a manufacturer specific data field in the PDU. For example, a payload of the service data field may include a plurality of bits, where the plurality of bits include an extensible bit. The source end device and the sink end device may agree on content of an extensible bit. For example, the sink end device is the notebook computer. When some extensible bits are 00, it indicates that a type of the event is selecting the first interface element. When some extensible bits are 01, it indicates that a type of the event is right-clicking after the first interface element is selected. For another example, the sink end device may encode the tag information corresponding to the first interface element in an encoding manner, for example, GBK, ISO8859-1, or Unicode (for example, UTF-8 or UTF-16), and use one or more extensible bits to carry data obtained through encoding. After parsing the BLE data packet, the source end device may learn the type of the event and the tag information of the corresponding interface element, to learn that the sink end device detects the corresponding event on the first interface element.

After receiving the event sent by the action translator module 607, the remote action receiver module 605 may send the received information to the action dispatcher module 603. The action dispatcher module 603 may find the corresponding interface element based on the tag information of the interface element, and determine, based on the type of the event, a specific operation performed by the user on the interface element on the sink end device. Therefore, the action dispatcher module 603 may update an interface element on a current display interface.

For example, as shown in FIG. 3(*b*)1 and FIG. 3(*b*)2, when the notebook computer detects an input of the user for the interface element 305, the notebook computer may send a type of an event (a click event) and the tag information of the interface element 305 to the mobile phone. In response to receiving the foregoing information, the mobile phone may determine that the user performs a click operation on the notebook computer on the chat record between the user and the contact Mom, so that the mobile phone may switch from displaying the home page of the social application to displaying the chat interface between the user and the contact Mom. In addition, the mobile phone may send, to the notebook computer, the plurality of interface elements on the chat interface between the user and the contact Mom and the tag information of the plurality of interface elements.

In an embodiment, if the one or more interface elements include a second interface element, and a status of the second interface element is updated in real time, after the first electronic device sends the one or more interface elements and the tag information of the one or more interface elements to the second electronic device, the first electronic device may send an updated second interface element and tag information of the updated second interface element to the second electronic device in real time after detecting that the status of the second interface element is updated. The interface element 5013 shown in FIG. 5(*b*)1 and FIG. 5(b)2 is used as an example. The video is being played to the $30^{th}$ second. When the video is played to a $31^{st}$ second, the mobile phone may send an updated interface element 5013 ("00:13") and tag information of the updated interface element 5013 to the smart television. In this way, after receiving the updated interface element 5013 and the tag information of the updated interface element 5013, the smart television may update content of the currently played lyrics. Similarly, the interface element 5012 on the interface is also updated in real time. When a status of the progress bar is updated, the mobile phone may send an updated interface element 5012 and tag information to the smart television in real time, so that the smart television can update the status of the progress bar in real time.

In an embodiment, as shown in FIG. 3(c)1 and FIG. 3(c)2, when the notebook computer detects, in the text input box 316, that the user enters the text content "Mom, I'll recommend a good movie to you", the notebook computer may send the text content and the tag information of the text input box to the mobile phone. For example, the notebook computer may send a BLE data packet to the mobile phone, and the text content and the tag information of the text input box may be carried in a service data field in a PDU. The notebook computer may encode the text content and the tag information of the text input box by using an encoding manner, for example, GBK, ISO8859-1, or Unicode (for example, UTF-8 or UTF-16), and use an extensible bit of the service data field to carry data obtained through encoding. After receiving the BLE data packet, the mobile phone may decode the data in the extensible bit, to obtain the text content and the tag information of the text input box, so that the mobile phone may place the text content in the text input box 319 of the mobile phone for display.

When the notebook computer detects an operation of clicking the "Send" control 318 by the user, the notebook computer may send a type of a corresponding event and the tag information of the control 318 to the mobile phone. For a specific sending process, refer to the descriptions in the foregoing embodiment. Details are not described herein again. After receiving the type of the event and the tag information of the control 318, the mobile phone may determine that the notebook computer detects that the user clicks the "Send" control. Therefore, the mobile phone can complete sending of the content in the text input box 319.

It should be understood that, in this embodiment of this application, the text input box 316 may be drawn by the notebook computer. The notebook computer and the mobile phone may agree on the tag information of the text input box 316, the voice control 317, and the "Send" control 318 in advance. In this way, after receiving the content sent by the notebook computer, the mobile phone may learn an operation performed by the user on the notebook computer.

In an embodiment, as shown in FIG. 5(c)1 and FIG. 5(c)2, when the smart television detects an operation of clicking the left key by the user on the remote control, the smart television may determine that the user expects to fast forward the video. The smart television may send tag information of a fast-forward control to the mobile phone in response to detecting the foregoing operation. In response to receiving the tag information of the fast-forward control sent by the smart television, the mobile phone may determine that the smart television detects a fast-forward operation performed by the user on the video, so that the mobile phone may fast-forward the video content in the window 501. In addition, the mobile phone may send updated image information in the window 501, the updated interface elements 5012 and 5013, and the tag information of the updated interface elements 5012 and 5013 to the smart television. The smart television may update the video content, the video playing progress bar, and the current playing time information in response to receiving the updated interface elements and the tag information of the interface elements.

It should be understood that, for an information transfer process between the smart television and the remote control, refer to an implementation process in a conventional technology. In this embodiment of this application, the smart television and the mobile phone may agree on tag information of some controls (for example, a fast-forward control, a fast-backward control, a first episode selection control, and a second episode selection control). In this case, when the smart television identifies an intention of the user through an input of the remote control, the smart television may send corresponding tag information to the mobile phone, so that the mobile phone may perform a corresponding operation based on the tag information. Further, after the mobile phone completes the corresponding operation, if some interface elements on the display interface are updated, the mobile phone may further send updated interface elements and tag information of the updated interface elements to the smart television. Therefore, the smart television may display the updated interface elements.

It should be further understood that, for an implementation process between the mobile phone, the notebook computer, and a peripheral device (for example, a mouse and the keyboard) of the notebook computer, refer to the implementation process between the mobile phone, the smart television, and the peripheral device (for example, the remote control) of the smart television. Details are not described herein again.

Figure 10:
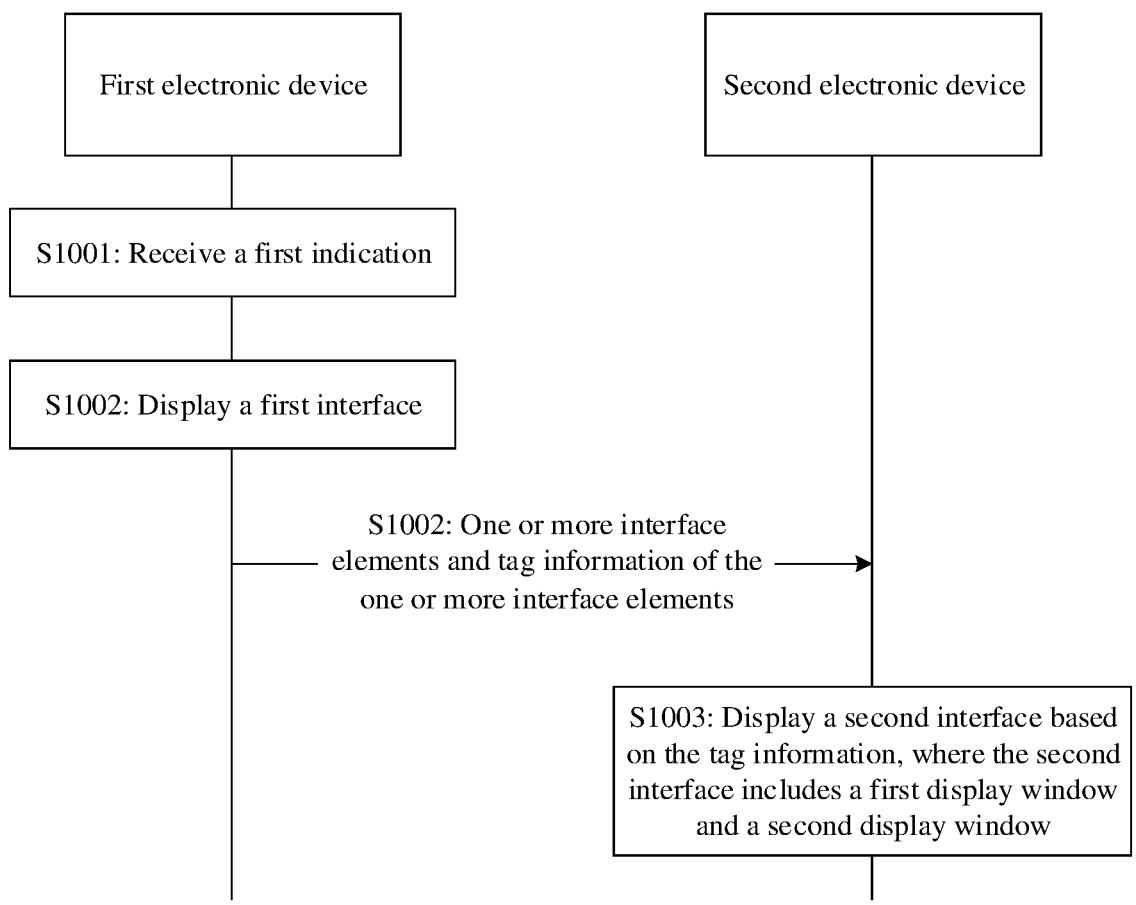
FIG. 10 is a schematic flowchart of a display method according to an embodiment of this application.

FIG. 10 is a schematic flowchart of a display method 1000 according to an embodiment of this application. The method 1000 may be performed by a first electronic device and a second electronic device. The first electronic device may be the foregoing source end device, and the second electronic device may be the foregoing sink end device. The method 1000 includes the following steps.

S1001: The first electronic device receives a first indication.

In an embodiment, the first indication may indicate that the first electronic device detects an operation that a user starts a first application.

In an embodiment, the first indication may be indication information sent by the second electronic device and received by the first electronic device, and the indication information indicates the first electronic device to send an interface element on a first interface to the second electronic device. For example, the second electronic device may send the indication information to the first electronic device when detecting that the user taps an icon associated with the first application.

S1002: In response to receiving the first indication, the first electronic device displays the first interface, and sends one or more interface elements and tag information of the one or more interface elements to the second electronic device, where the first interface includes one or more interface elements.

For example, as shown in FIG. 3(b)1 and FIG. 3(b)2, the first electronic device may be the mobile phone, the first interface may be the display interface of the social application, and the display interface of the social application includes the interface element 300 to the interface element 307.

It should be understood that, for a process in which the first electronic device sends the one or more interface elements and the tag information of the one or more interface elements to the second electronic device, refer to the description ins the foregoing embodiments. Details are not described herein again.

In an embodiment, when a distance between the first electronic device and the second electronic device is less than or equal to a preset distance, the first electronic device may prompt the user to send one or more interface elements on the first interface to the second electronic device for display. The first electronic device may send the one or more interface elements and the tag information of the one or more interface elements to the second electronic device in response to an operation that the user determines to send the interface element on the first interface to the second electronic device.

In an embodiment, when the first electronic device determines that devices that are networked with the first electronic device include an electronic device supporting display of one or more interface elements, the first electronic device may send the one or more interface elements and the tag information of the one or more interface elements to the second electronic device. For example, after displaying the first interface, the first electronic device may send a query request to a device that is networked with the first electronic device, where the query request is used to query whether the device that receives the query request supports display of one or more interface elements. If the devices that are networked with the first electronic device include the second electronic device and the second electronic device supports display of one or more interface elements, the second electronic device may send an acknowledgement (ACK) to the first electronic device, so that the first electronic device learns that the second electronic device supports display of one or more interface elements.

For example, the first electronic device may send a BLE data packet to the second electronic device, where the BLE data packet may carry the query request. The BLE data packet includes a PDU, and the query request may be carried in a service data field in the PDU, or may be carried in a manufacturer specific data field in the PDU. For example, a payload of the service data field may include a plurality of bits, where the plurality of bits include an extensible bit. The first electronic device and the second electronic device may agree on content of an extensible bit. For example, when an extensible bit is 1, the second electronic device may learn that the first electronic device requests to query whether the second electronic device supports display of one or more interface elements.

If the second electronic device supports display of one or more interface elements, the second electronic device may send the BLE data packet to the first electronic device. For example, when an extensible bit in the BLE data packet is 1, the first electronic device may learn that the second electronic device supports display of one or more interface elements.

In an embodiment, if each of a plurality of devices that are networked with the first electronic device supports display of the one or more interface elements, the first electronic device may further prompt the user to send the one or more interface elements to a device for display. For example, each of the second electronic device and a third electronic device in the devices that are networked with the first electronic device supports display of one or more interface elements, and the first electronic device may prompt the user to send the one or more interface elements to the second electronic device or the third electronic device for display. The first electronic device may send the one or more interface elements and the tag information of the one or more interface elements to the second electronic device in response to an operation of selecting the second electronic device by the user.

In an embodiment, the first indication may alternatively be request information from the second electronic device. For example, a display interface of the second electronic device may include an icon of an application. After the second electronic device detects an operation of tapping the icon by the user, the second electronic device may send request information to the first electronic device, where the request information is used to request information about one or more interface elements on a display interface of the application.

It should be understood that, that the display interface of the second electronic device includes an icon of an application does not mean that the application is installed on the second electronic device. The second electronic device detects that the user taps the icon to trigger the second electronic device to send request information to the first electronic device, where the request information is used to request the first electronic device to send icons of one or more applications on the display interface of the application to the second electronic device.

For example, the second electronic device may send a BLE data packet to the first electronic device in response to detecting an operation of tapping the icon of the first application (for example, a music application or a chat application) by the user. For example, when an extensible bit in the BLE data packet is 1, the first electronic device may learn that the second electronic device requests the first electronic device for information of one or more interface elements on a display interface of the first application.

In an embodiment, after the first electronic device and the second electronic device are networked, the second electronic device may send a query request to the first electronic device, where the query request is used to request to query whether the first application is installed on the first electronic device. For example, the second electronic device may send a BLE data packet to the first electronic device, where the BLE data packet may carry the query request. A payload of a service data field in the BLE data packet may include a plurality of bits, where the plurality of bits include an extensible bit. The first electronic device and the second electronic device may agree on content of an extensible bit. For example, when an extensible bit is 1, the first electronic device may learn that the second electronic device requests to query whether the first application is installed on the first electronic device. If the first application is installed on the first electronic device, the first electronic device may send an acknowledgement (ACK) to the second electronic device, so that the second electronic device may learn that the first application is installed on the first electronic device. Then, if the second electronic device detects an operation of tapping the icon of the first application by the user, the second electronic device may send the request information to the first electronic device.

S1003: In response to receiving the first information, the second electronic device displays a second interface based on the tag information of the one or more interface elements on the first interface, where the second interface includes a first display window and a second display window, at least some interface elements of the one or more interface elements on the first interface are displayed in the first display window, the second display window is used for display of a display interface associated with a first interface element, and the at least some interface elements include the first interface element.

In an embodiment, after receiving the one or more interface elements and the tag information of the one or more interface elements, the second electronic device may display the second interface based on the tag information of the one or more interface elements. For example, the second electronic device may select, based on the tag information, an interface element corresponding to tag information with a high priority level for display. The GUIs shown in FIG. 3(c)1 and FIG. 3(c)2 are used as an example. The mobile phone may send the interface elements 311 to 315 and 319 and the tag information of the interface elements 311 to 315 and 319 to the second electronic device, and the second electronic device may store priority information of the tag information (for example, a sequence of priorities are sequentially the contact name, the time information of the previous chat, the contact profile picture information, and the content of the previous chat). In this case, the second electronic device may display the interface elements 312 to 315 based on the priority information and the tag information of the interface elements 311 to 315 and 319.

In an embodiment, the second electronic device displays the at least some interface elements of the one or more interface elements based on a first mapping relationship and the tag information of the one or more interface elements, where the first mapping relationship is a mapping relationship between display areas of the one or more interface elements and the tag information of the one or more interface elements.

In an embodiment, the first mapping relationship may be stored in the first electronic device. When sending the interface element and the tag information to the second electronic device, the first electronic device may also send the first mapping relationship to the second electronic device.

In an embodiment, for a same scenario (for example, a chat scenario), the first electronic device may store different mapping relationships for different devices. For example, the first electronic device is the mobile phone. The mobile phone may store a first mapping relationship and a second mapping relationship, where the first mapping relationship is a mapping relationship between a display area of an interface element and tag information of the interface element in a notebook computer, and the second mapping relationship is a mapping relationship between a display area of an interface element and tag information of the interface element in a tablet computer. For different sink end devices, the mobile phone may send different interface elements and tag information of the interface elements.

In an embodiment, the first mapping relationship may alternatively be stored in the second electronic device. When receiving the interface element and the tag information from the first electronic device, the second electronic device may display the second interface based on the tag information of the interface element and the first mapping relationship.

In an embodiment, the second electronic device may store mapping relationships between display areas of interface elements and tag information of the interface elements in different scenarios. For example, as shown in FIG. 8 and FIG. 9, the sink end device may store mapping relationships between different areas and tag information of different interface elements in the chat scenario and the shopping scenario. After the second electronic device receives the one or more interface elements and the tag information of the one or more interface elements from the first electronic device, the sink end device may select, based on the tag information of the one or more interface elements, at least some interface elements of the one or more interface elements for display.

In an embodiment, the first electronic device may send all tagged interface elements on the first interface and tag information of the tagged interface elements to the second electronic device. After receiving all the tagged interface elements and the tag information of the tagged interface elements, the second electronic device may select, based on the first mapping relationship, some or all of the interface elements for display.

Optionally, the first interface element on the first interface is associated with a third interface. The first electronic device is further configured to send second information to the second electronic device in response to receiving the first indication. The second information includes one or more interface elements on the third interface and tag information of the one or more interface elements on the third interface. The second electronic device is specifically configured to: in response to receiving the first information and the second information, based on the tag information of the one or more interface elements on the first interface and the tag information of the one or more interface elements on the third interface, display, in the first display window, the at least some interface elements of the one or more interface elements on the first interface, and display, in the second display window, at least some interface elements of the one or more interface elements on the third interface.

For example, as shown in FIG. 3(b)1 and FIG. 3(b)2, when the mobile phone detects the operation of starting the social application by the user, the mobile phone may send one or more interface elements on the home page of the social application (including one or more chat records), the tag information of the one or more interface elements, and one or more interface elements on the chat interface between the user and a contact (for example, the user and the contact Mom) to the second electronic device. Therefore, the second electronic device may separately display, in the window 3081 and the window 3082, at least some interface elements of the home page of the social application and at least some interface elements on the chat interface between the user and the contact. In this way, the second electronic device can display the chat interface between the user and the contact Mom in the window 3082 without a need to detect, by the first electronic device, that the user taps the interface element 305, or detect, by the second electronic device, an operation that the user taps the interface element 305. This reduces user operations, and helps improve user experience.

In this embodiment of this application, after receiving the first indication, the first electronic device may send the first information and the second information to the second electronic device, so that the second electronic device may separately display the at least some interface elements on the first interface and the at least some interface elements on the third interface in the first display window and the second display window, and the user may simultaneously view a level-1 page and a level-2 page of the application on the second electronic device. Compared with single-screen display of the level-1 page or the level-2 page on the first electronic device, this helps improve user experience.

Optionally, the first interface element may be any interface element on the first interface, or the first interface element may be an interface element in a preset direction on the first interface.

For example, the first interface element may be the interface element 300, 305, 306, or 307.

Optionally, the first electronic device may store a mapping relationship between display areas of the at least some interface elements on the third interface and tag information of the at least some interface elements on the third interface. When sending the second information to the second electronic device, the first electronic device may also send the mapping relationship to the second electronic device. The second electronic device may display, in the second display window, the at least some interface elements on the third interface based on the tag information in the second information and the mapping relationship.

Optionally, the second electronic device may store a mapping relationship between display areas of the at least some interface elements on the third interface and tag information of the at least some interface elements on the third interface.

Optionally, the first interface element on the first interface is associated with a third interface. The second electronic device is further configured to send first indication information to the first electronic device in response to detecting an input of the user for the first interface element. The first indication information indicates that the second electronic device detects the input of the user for the first interface element. The first electronic device is further configured to send second information to the second electronic device in response to receiving the first indication information. The second information includes one or more interface elements on the third interface and tag information of the one or more interface elements on the third interface. The second electronic device is further configured to: in response to receiving the second information, based on the tag information of the one or more interface elements on the third interface, continue to display, in the first display window, the at least some interface elements of the one or more interface elements on the first interface, and display, in the second display window, at least some interface elements of the one or more interface elements on the third interface.

For example, as shown in FIG. 3(c)1 and FIG. 3(c)2, when the notebook computer detects an operation of tapping the interface element 305 by the user, the notebook computer may indicate, to the mobile phone, that the notebook computer detects that the user taps the interface element 305, so that the mobile phone sends one or more interface elements on the chat interface between the user and the contact Mom and tag information of the one or more interface elements to the notebook computer. Therefore, the notebook computer may display, in the window 3082, at least some interface elements on the chat interface between the user and the contact Mom.

In this embodiment of this application, when detecting the input of the user for the first interface element, the second electronic device may indicate, to the first electronic device, that the second electronic device detects the input for the first interface element, so that the first electronic device may be triggered to send the second information to the second electronic device. The user may simultaneously view the level-1 page and the level-2 page of the application on the second electronic device. Compared with single-screen display of the level-1 page or the level-2 page on the first electronic device, this helps improve user experience.

Optionally, the processor is further configured to: in response to receiving the first indication information, switch from displaying the first interface to displaying the third interface.

For example, as shown in FIG. 3(c)1 and FIG. 3(c)2, after the mobile phone receives an indication of the notebook computer (where the notebook computer indicates, to the mobile phone, that the notebook computer detects an operation of tapping the interface element 305 by the user), the mobile phone may switch from displaying the home page of the social application to displaying the chat interface between the user and the contact Mom.

Optionally, the first electronic device may continue to display the first interface in response to receiving the first indication information.

Optionally, the first interface element on the first interface is associated with a third interface. The first electronic device is further configured to: in response to detecting an input of the user for the first interface element on the first interface, switch from displaying the first interface to displaying the third interface, and send second information to the second electronic device. The second information includes one or more interface elements on the third interface and tag information of the one or more interface elements on the third interface. The second electronic device is further configured to: in response to receiving the second information, based on the tag information of the one or more interface elements on the third interface, continue to display, in the first display window, the at least some interface elements of the one or more interface elements on the first interface, and display, in the second display window, at least some interface elements of the one or more interface elements on the third interface.

For example, as shown in FIG. 3(b)1 and FIG. 3(b)2, when detecting an operation of tapping the interface element 305 by the user, the mobile phone may switch from displaying the home page of the social application to displaying the chat interface between the user and the contact Mom, and send one or more interface elements on the chat interface between the user and the contact Mom and tag information of the one or more interface elements to the notebook computer. Therefore, the notebook computer may display, in the window 3082, at least some interface elements on the chat interface between the user and the contact Mom.

In this embodiment of this application, when detecting the input of the user for the first interface element on the first interface, the first electronic device may switch from displaying the first interface to displaying the third interface, and send the second information to the second electronic device. The user may simultaneously view the level-1 page and the level-2 page of the application on the second electronic device. Compared with single-screen display of the level-1 page or the level-2 page on the first electronic device, this helps improve user experience.

Optionally, the at least some interface elements of the one or more interface elements on the third interface include a second interface element. The first electronic device updates the second interface element on the third interface when detecting that the first interface element on the first interface is updated. The first electronic device sends third information to the second electronic device, where the third information includes an updated first interface element, an updated second interface element, tag information of the first interface element, and tag information of the second interface element. In response to receiving the third information, the second electronic device displays the updated first interface element in the first display window and the updated second interface element in the second display window based on the tag information of the first interface element and the tag information of the second interface element.

For example, as shown in FIG. 3(c)1 and FIG. 3(c)2, if the mobile phone receives a message sent by the contact Mom, the mobile phone may display the recently received message on the chat interface between the user and the contact Mom, and the mobile phone may also update information on the home page of the social application (for example, rearrange a plurality of chat records, and update latest chat content in the interface element 305). The mobile phone may send an updated interface element on the home page of the social application, tag information of the updated interface element, a newly added interface element on the chat interface between the user and the contact Mom, and tag information of the newly added interface element to the notebook computer, so that the notebook computer may display the updated interface element in the window 3081 and display the newly added interface element in the window 3082.

Optionally, in response to an update of the first interface element, the first electronic device may add some new interface elements to the third interface, and send the updated first interface element, the newly added interface elements on the third interface, the tag information of the first interface element, and tag information of the newly added interface elements to the second electronic device, so that the second electronic device can update content in the first display window and the second display window in a timely manner.

Optionally, the second interface includes a third interface element, and the third interface element is associated with the first interface or a fourth interface element on the third interface. The second electronic device is further configured to send second indication information to the first electronic device in response to detecting an input of the user for the third interface element, where the second indication information indicates that the second electronic device detects the input of the user for the third interface element. The first electronic device is further configured to: in response to receiving the second indication information, update the fourth interface element or perform an operation for the fourth interface element.

For example, as shown in FIG. 3(c)1 and FIG. 3(c)2, when the notebook computer detects that the user enters content in the text input box 316, the notebook computer may send the content and the tag information of the text input box to the mobile phone, so that the mobile phone can synchronously display the content in the text input box 319.

For example, as shown in FIG. 3(d)1 to FIG. 3(d)3, when the notebook computer detects an operation of clicking the "Send" control 318 by the user, the notebook computer may indicate, to the mobile phone, that the notebook computer detects an input of the user for the "Send" control. After receiving the indication, the mobile phone may perform an operation of sending the content in the text input box.

Optionally, the first interface or the third interface of the first electronic device does not include the third interface element, and the first electronic device and the second electronic device may associate the third interface element with the fourth interface element in advance. Therefore, when the second electronic device detects the input of the user for the third interface element, the second electronic device may indicate the first electronic device to update the fourth interface element.

For example, the third interface element may be the text input box 316, and the fourth interface element may be the text input box 319.

For example, the third interface element may be the "Send" control 318, and the fourth interface element may be the "Send" control on the chat interface that is between the user and the contact Mom and that is displayed on the mobile phone.

For example, when the first electronic device performs the operation for the fourth interface element, the first electronic device may add a fifth interface element to the first interface and/or the third interface. The first electronic device may send the fifth interface element and tag information of the fifth interface element to the second electronic device, so that the second electronic device displays the fifth interface element on the second interface.

For example, after the mobile phone performs the operation of sending the content in the text input box 319, the mobile phone may display the newly added interface elements 320 to 322 on the interface. The mobile phone may send the newly added interface elements 320 to 322 to the notebook computer, so that the notebook computer displays the newly added interface elements 320 to 322 in the window 3082.

In an embodiment, the first electronic device may store information about an interface element required in a scenario. In this way, the first electronic device may send, to the second electronic device, the interface element that needs to be displayed by the second electronic device and tag information of the interface element. For example, after the first electronic device and the second electronic device are networked, the second electronic device may send, to the first electronic device, information about an interface element required in a first scenario. The second electronic device may send a BLE data packet to the first electronic device, where the BLE data packet may include information about the first scenario and the information about the interface element required in the first scenario. A payload of a service data field in the BLE data packet may include a plurality of bits, where the plurality of bits include an extensible bit. The first electronic device and the second electronic device may agree on content of an extensible bit. For example, the second electronic device may encode the information about the first scenario (for example, a music scenario) in an encoding manner, for example, GBK, ISO8859-1, or Unicode (for example, UTF-8 or UTF-16), and may encode tag information of the interface element required in the first scenario in an encoding manner, for example, GBK, ISO8859-1, or Unicode (for example, UTF-8 or UTF-16), to use one or more extensible bits to carry data obtained through encoding. After receiving the BLE data packet, the first electronic device may decode the BLE data packet to learn the tag information of the interface element required by the second electronic device in the first scenario. In this way, after receiving the first indication, the first electronic device may send, to the second electronic device, the interface element required by the second electronic device and the tag information of the interface element.

Figure 11:
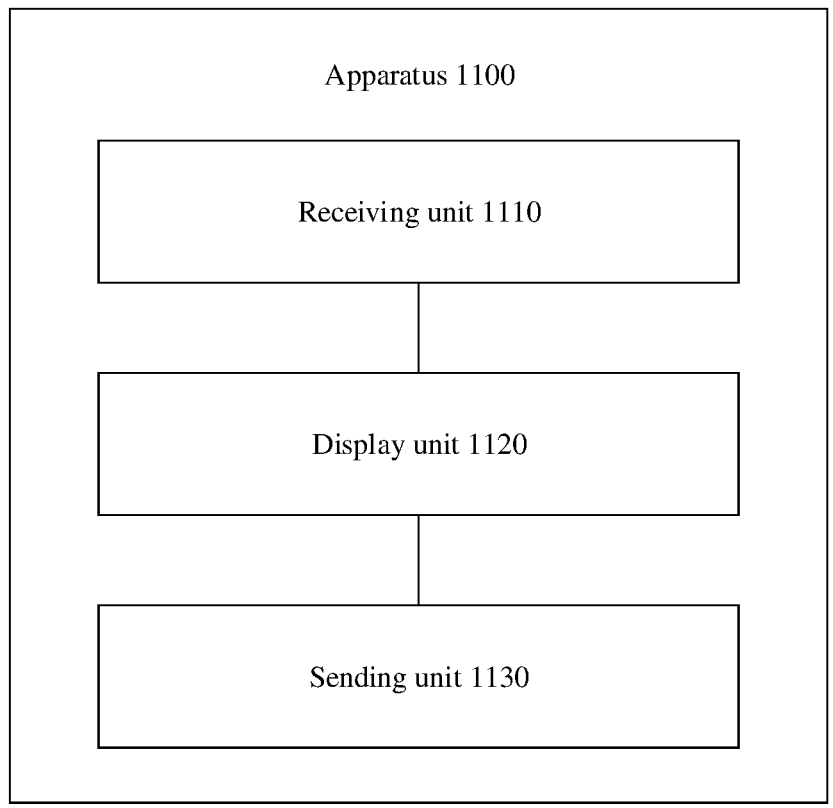
FIG. 11 is a schematic diagram of a structure of an apparatus according to an embodiment of this application.

FIG. 11 is a schematic block diagram of an apparatus 1100 according to an embodiment of this application. The apparatus 1100 may be disposed in the first electronic device in FIG. 10. The apparatus 1100 includes: a receiving unit 1110, configured to receive a first indication; a display unit 1120, configured to display a first interface by the first electronic device in response to receiving the first indication; and a sending unit 1130, configured to send first information to the second electronic device, where the first information includes one or more interface elements on the first interface and tag information of the one or more interface elements.

Figure 12:
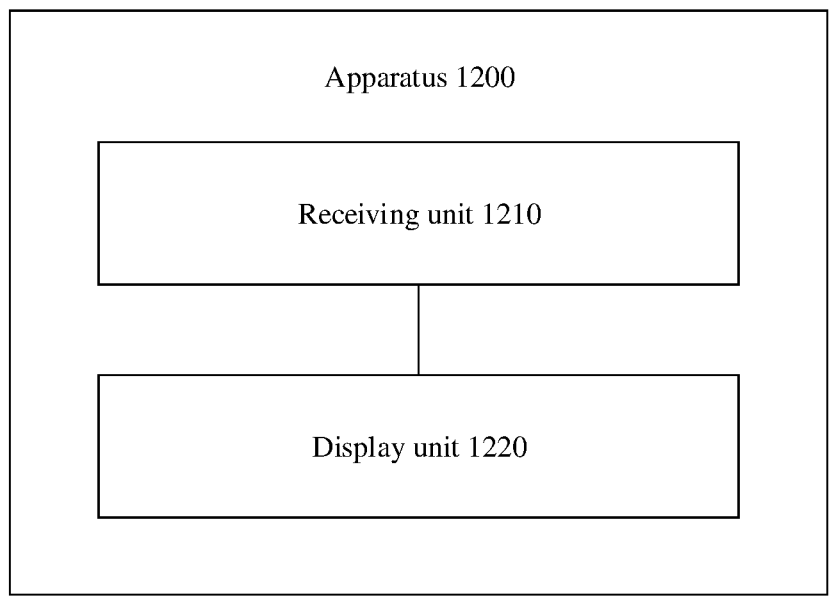
FIG. 12 is a schematic diagram of a structure of another apparatus according to an embodiment of this application.

FIG. 12 is a schematic block diagram of an apparatus 1200 according to an embodiment of this application. The apparatus 1200 may be disposed in the second electronic device in FIG. 10. The apparatus 1200 includes: a receiving unit 1210, configured to receive first information sent by a first electronic device, where the first information includes one or more interface elements on a first interface displayed by the first electronic device and tag information of the one or more interface elements; and a display unit 1220, configured to: in response to receiving the first information, display a second interface based on the tag information of the one or more interface elements on the first interface, where the second interface includes a first display window and a second display window, at least some interface elements of the one or more interface elements on the first interface are displayed in the first display window, the second display window is used for display of a display interface associated with a first interface element, and the at least some interface elements include the first interface element.

Figure 13:
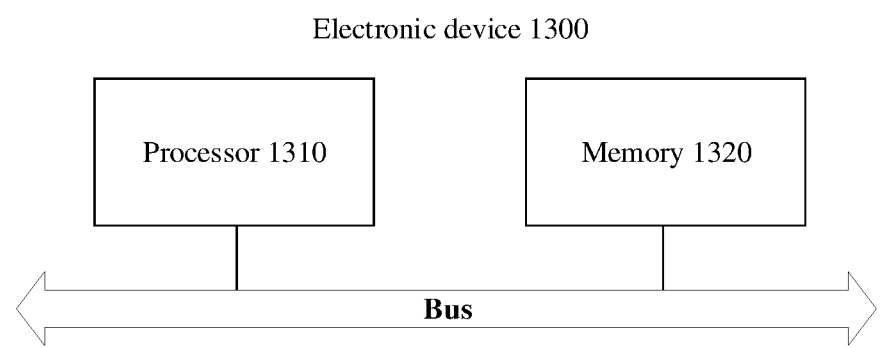
FIG. 13 is a schematic diagram of a structure another an electronic device according to an embodiment of this application.

FIG. 13 is a schematic diagram of a structure of an electronic device 1300 according to an embodiment of this application. As shown in FIG. 13, the electronic device includes one or more processors 1310 and one or more memories 1320. The one or more memories 1320 store one or more computer programs, and the one or more computer programs include instructions. When the instructions are run by the one or more processors 1310, a first electronic device or a second electronic device is enabled to perform the technical solutions in the foregoing embodiments.

An embodiment of this application provides a system, including a first electronic device and a second electronic device. The system is configured to perform the technical solutions in the foregoing embodiments. An implementation principle and a technical effect thereof are similar to those in the foregoing method-related embodiments. Details are not described herein again.

An embodiment of this application provides a computer program product. When the computer program product runs on a first electronic device (or the notebook computer in the foregoing embodiments), the first electronic device is enabled to perform the technical solutions in the foregoing embodiments. An implementation principle and a technical effect of the system are similar to those in the foregoing method-related embodiments. Details are not described herein again.

An embodiment of this application provides a computer program product. When the computer program product runs on a second electronic device (or the mobile phone in the foregoing embodiments), the second electronic device is enabled to perform the technical solutions in the foregoing embodiments. An implementation principle and a technical effect thereof are similar to those in the foregoing method-related embodiments. Details are not described herein again.

An embodiment of this application provides a readable storage medium. The readable storage medium includes instructions. When the instructions are run on a first electronic device (or the notebook computer in the foregoing embodiments), the first electronic device is enabled to perform the technical solutions in the foregoing embodiments. Implementation principles and technical effects thereof are similar. Details are not described herein again.

An embodiment of this application provides a readable storage medium. The readable storage medium includes instructions. When the instructions are run on a second electronic device (or the mobile phone in the foregoing embodiments), the second electronic device is enabled to perform the technical solutions in the foregoing embodiments. Implementation principles and technical effects thereof are similar. Details are not described herein again.

An embodiment of this application provides a chip. The chip is configured to execute instructions. When the chip runs, the technical solutions in the foregoing embodiments are performed. Implementation principles and technical effects thereof are similar. Details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a specific working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of embodiments of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of embodiments of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A system, comprising:
a first electronic device; and
a second electronic device, wherein the first electronic device communicates with the second electronic device through a short-range wireless connection;
wherein the first electronic device is configured to: in response to receiving a first indication, display one or more interface elements on a first interface and send first information to the second electronic device, wherein the first information comprises the one or more interface elements on the first interface and tag information of the one or more interface elements on the first interface; and
wherein the second electronic device is configured to: in response to receiving the first information, display a second interface based on the tag information of the one or more interface elements on the first interface, wherein the second interface comprises a first display window and a second display window, at least a subset of the one or more interface elements on the first interface is displayed in the first display window, a display interface associated with a first interface element is displayed in the second display window, and the subset of the one or more interface elements on the first interface comprises the first interface element; and
wherein the first display window comprising the first interface element and the second display window comprising the display interface associated with the first interface element are displayed simultaneously in the second interface by the second electronic device.

2. The system according to claim 1, wherein:
the first interface element on the first interface is associated with a third interface;
the first electronic device is further configured to send second information to the second electronic device in response to receiving the first indication, wherein the second information comprises one or more interface elements on the third interface and tag information of the one or more interface elements on the third interface; and
the second electronic device is specifically configured to: in response to receiving the first information and the second information, based on the tag information of the one or more interface elements on the first interface and the tag information of the one or more interface elements on the third interface, display, in the first display window, at least the subset of the one or more interface elements on the first interface, and display, in the second display window, at least a subset of the one or more interface elements on the third interface.

3. The system according to claim 2, wherein:
the subset of the one or more interface elements on the third interface comprises a second interface element;
the first electronic device is further configured to update the second interface element on the third interface when detecting that the first interface element on the first interface is updated;
the first electronic device is further configured to send third information to the second electronic device, wherein the third information comprises an updated first interface element, an updated second interface element, tag information of the updated first interface element, and tag information of the updated second interface element; and
the second electronic device is further configured to: in response to receiving the third information, display the updated first interface element in the first display window and display the updated second interface element in the second display window based on the tag information of the updated first interface element and the tag information of the updated second interface element.

4. The system according to claim 2, wherein:
the second interface comprises a third interface element, and the third interface element is associated with the first interface or a fourth interface element on the third interface;
the second electronic device is further configured to send second indication information to the first electronic device in response to detecting an input of a user for the third interface element, wherein the second indication information indicates that the second electronic device detects the input of the user for the third interface element; and
the first electronic device is further configured to: in response to receiving the second indication information, update the fourth interface element or perform an operation on the fourth interface element.

5. The system according to claim 1, wherein:
the first interface element on the first interface is associated with a third interface;
the second electronic device is further configured to send first indication information to the first electronic device in response to detecting an input of a user for the first interface element, wherein the first indication information indicates that the second electronic device detects the input of the user for the first interface element;
the first electronic device is further configured to send second information to the second electronic device in response to receiving the first indication information, wherein the second information comprises one or more interface elements on the third interface and tag information of the one or more interface elements on the third interface; and
the second electronic device is further configured to: in response to receiving the second information, based on the tag information of the one or more interface elements on the third interface, continue to display, in the first display window, the subset of interface elements of the one or more interface elements on the first interface, and display, in the second display window, at least a subset of the one or more interface elements on the third interface.

6. The system according to claim 5, wherein the first electronic device is further configured to: in response to receiving the first indication information, switch from displaying the first interface to displaying the third interface.

7. The system according to claim 1, wherein the second electronic device is specifically configured to display the first display window based on the tag information of the one or more interface elements on the first interface and a first mapping relationship, wherein the first mapping relationship comprises a mapping relationship between display areas of the subset of the one or more interface elements on the first interface and tag information of the subset of the one or more interface elements on the first interface.

8. The system according to claim 1, wherein:
the first interface element on the first interface is associated with a third interface;
the first electronic device is further configured to: in response to detecting an input of a user for the first interface element on the first interface, switch from displaying the first interface to displaying the third interface, and send second information to the second electronic device, wherein the second information comprises one or more interface elements on the third interface and tag information of the one or more interface elements on the third interface; and
the second electronic device is further configured to: in response to receiving the second information, based on the tag information of the one or more interface elements on the third interface, continue to display, in the first display window, the subset of the one or more interface elements on the first interface, and display, in the second display window, at least a subset of the one or more interface elements on the third interface.

9. The system according to claim 1, wherein the first interface is a display interface of a social application, the first interface comprises one or more chat records, the first interface element is a chat record between a user and a first contact in the one or more chat records, and the display interface associated with the first interface element is a chat interface between the user and the first contact.

10. The system according to claim 1, wherein the first interface is a display interface of a shopping application, the first interface comprises shopping information of one or more commodities, the first interface element is shopping information of a first commodity in the one or more commodities, and the display interface associated with the first interface element is a shopping details page of the first commodity.

11. The system according to claim 1, wherein the first electronic device is further configured to: before sending the first information to the second electronic device, determine that a distance between the first electronic device and the second electronic device is less than or equal to a preset distance.

12. A first electronic device, comprising:
at least one processor; and
a memory coupled to the at least one processor and configured to store programming instructions that, when executed by the at least one processor, cause the first electronic device to:
receive a first indication;
in response to receiving the first indication, display a first interface and send first information to a second electronic device, wherein the first information comprises one or more interface elements on the first interface and tag information of the one or more interface elements, and wherein a first interface element on the first interface is associated with a third interface; and
send second information to the second electronic device in response to receiving the first indication, wherein the second information comprises one or more interface elements on the third interface and tag information of the one or more interface elements on the third interface.

13. The first electronic device according to claim 12, wherein the programming instructions, when executed by the at least one processor, further cause the electronic device to:
send information about a first mapping relationship to the second electronic device, wherein the first mapping relationship is a mapping relationship between a display area of an interface element and tag information of the interface element.

14. The first electronic device according to claim 12, wherein at least a subset of the one or more interface elements on the third interface comprises a second interface element; and the programming instructions, when executed by the at least one processor, further cause the electronic device to:
update the second interface element on the third interface when detecting that the first interface element on the first interface is updated; and
send third information to the second electronic device, wherein the third information comprises an updated first interface element, an updated second interface element, tag information of the updated first interface element, and tag information of the updated second interface element.

15. The first electronic device according to claim 12, wherein a second interface comprises a third interface element, and the third interface element is associated with the first interface or a fourth interface element on the third interface; and the programming instructions, when executed by the at least one processor, further cause the electronic device to:
receive second indication information sent by the second electronic device, wherein the second indication information indicates that the second electronic device detects an input of a user for the third interface element; and
in response to receiving the second indication information, update the fourth interface element or perform an operation on the fourth interface element.

16. The first electronic device according to claim 12, wherein the first interface is a display interface of a social application, the first interface comprises one or more chat records, the first interface element is a chat record between a user and a first contact in the one or more chat records, and a display interface associated with the first interface element is a chat interface between the user and the first contact; or
wherein the first interface is a display interface of a shopping application, the first interface comprises shopping information of one or more commodities, the first interface element is shopping information of a first commodity in the one or more commodities, and a display interface associated with the first interface element is a shopping details page of the first commodity.

17. The first electronic device according to claim 12, wherein the programming instructions, when executed by the at least one processor, further cause the electronic device to:
before sending the first information to the second electronic device, determine that a distance between the first electronic device and the second electronic device is less than or equal to a preset distance.

18. A first electronic device, comprising:
at least one processor; and
a memory coupled to the at least one processor and configured to store programming instructions that, when executed by the at least one processor, cause the first electronic device to:
receive a first indication; and
in response to receiving the first indication, display a first interface and send first information to a second electronic device, wherein the first information comprises one or more interface elements on the first interface and tag information of the one or more interface elements, wherein a first interface element on the first interface is associated with a third interface;

receive first indication information sent by the second electronic device, wherein the first indication information indicates that the second electronic device detects an input of a user for the first interface element; and send second information to the second electronic device in response to receiving the first indication information, wherein the second information comprises one or more interface elements on the third interface and tag information of the one or more interface elements on the third interface.

19. The first electronic device according to claim 18, wherein the programming instructions that, when executed by the at least one processor, further cause the electronic device to:

in response to receiving the first indication information, switch from displaying the first interface to displaying the third interface.

\* \* \* \* \*